(12) United States Patent
Mcvey

(10) Patent No.: US 10,600,179 B2
(45) Date of Patent: Mar. 24, 2020

(54) IMAGE ANALYSIS FOR DETERMINING CHARACTERISTICS OF GROUPS OF INDIVIDUALS

(71) Applicant: Catherine G. Mcvey, Graham, NC (US)

(72) Inventor: Catherine G. Mcvey, Graham, NC (US)

(*) Notice: Subject to any disclaimer, the term of this patent is extended or adjusted under 35 U.S.C. 154(b) by 0 days.

(21) Appl. No.: 15/414,365

(22) Filed: Jan. 24, 2017

(65) Prior Publication Data

US 2017/0262980 A1  Sep. 14, 2017
US 2018/0211379 A9  Jul. 26, 2018

Related U.S. Application Data

(63) Continuation of application No. 13/672,612, filed on Nov. 8, 2012, now Pat. No. 9,552,637, which is a
(Continued)

(51) Int. Cl.
*G06K 9/00* (2006.01)
*G06T 7/00* (2017.01)
*G06K 9/62* (2006.01)

(52) U.S. Cl.
CPC ........ *G06T 7/0012* (2013.01); *G06K 9/00281* (2013.01); *G06K 9/627* (2013.01);
(Continued)

(58) Field of Classification Search
None
See application file for complete search history.

(56) References Cited

U.S. PATENT DOCUMENTS 2,594,696 A   4/1952   Strudwick
3,714,399 A   1/1973   Cataland
(Continued)

FOREIGN PATENT DOCUMENTS

NZ              570714         1/2010
WO     WO-2003048372         6/2003
(Continued)

OTHER PUBLICATIONS

Facial phenotypes—phenotypes, Algridge et al., Molecular autism, Oct. 14, 2011, pp. 1-9.*
(Continued)

*Primary Examiner* — Jayesh A Patel
(74) *Attorney, Agent, or Firm* — Blank Rome LLP

(57) ABSTRACT

Embodiments include methods for predicting one or more characteristics of an individual, such as a human or non-human animal, by applying computational methods to image(s) of the individual to generate one or more metrics indicative of the characteristics. Embodiments determine predictors of characteristics by creating a sample library of individuals, determining facial measurements for each individual, determining relationships between facial measurements and additional library data, and selecting predictors from these relationships. Embodiments include methods for predicting characteristics of individuals not in the library. Embodiments include methods for predicting characteristics of groups using predicted characteristics of individuals. Embodiments determine suitability of a pair of individuals (from the same or different species) for a particular purpose, task, or relationship based on characteristics of individuals. Other embodiments determine the compatibility of an individual with a group of other individuals. Embodiments include systems, devices, and computer-readable media comprising one or more of these methods.

13 Claims, 40 Drawing Sheets

Related U.S. Application Data continuation-in-part of application No. 13/467,889, filed on May 9, 2012, now Pat. No. 10,482,317, which is a continuation-in-part of application No. 13/467,869, filed on May 9, 2012, now Pat. No. 9,104,906.

(60) Provisional application No. 61/616,234, filed on Mar. 27, 2012, provisional application No. 61/484,126, filed on May 9, 2011.

(52) U.S. Cl.
CPC ............... G06T 2207/20081 (2013.01); G06T 2207/30201 (2013.01)

(56) References Cited

U.S. PATENT DOCUMENTS

| | | | |
|---|---|---|---|
| 3,999,041 A | 12/1976 | Scofield | |
| 4,260,646 A | 4/1981 | Farrell et al. | |
| 4,745,472 A | 5/1988 | Hayes | |
| 5,412,420 A | 5/1995 | Ellis | |
| 5,576,949 A | 11/1996 | Scofield et al. | |
| 5,944,598 A | 8/1999 | Tong et al. | |
| 6,081,607 A | 6/2000 | Mori et al. | |
| 6,549,289 B1 | 4/2003 | Ellis | |
| 6,722,980 B2 | 4/2004 | Stronach | |
| 6,820,003 B2 | 11/2004 | Ueno | |
| 7,027,054 B1 | 4/2006 | Cheiky et al. | |
| 7,110,572 B1 | 9/2006 | Benn | |
| 7,257,258 B2 | 8/2007 | Ruff, Jr. | |
| 7,374,536 B1 | 5/2008 | Taylor | |
| 7,374,596 B2 | 5/2008 | Omori et al. | |
| 7,399,220 B2 | 7/2008 | Kriesel et al. | |
| 7,792,379 B2 | 9/2010 | Andres del Valle | |
| 7,953,690 B2 | 5/2011 | Luo et al. | |
| 8,036,429 B2 | 10/2011 | Doyle, II | |
| 8,061,302 B2 | 11/2011 | Seder | |
| 8,064,694 B2 | 11/2011 | Yen et al. | |
| 8,351,656 B2 * | 1/2013 | Spicola .................. A01K 29/00 356/4.03 | |
| 8,483,446 B2 | 7/2013 | Demarais et al. | |
| 8,538,126 B2 | 9/2013 | Peacock et al. | |
| 8,588,482 B1 | 11/2013 | Baluja et al. | |
| 8,738,117 B2 | 5/2014 | Jimenez-Acquarone | |
| 8,755,570 B2 | 6/2014 | Gomas et al. | |
| 9,098,898 B2 * | 8/2015 | McVey .................. G06T 7/0012 |
| 9,104,906 B2 * | 8/2015 | McVey .................. G06K 9/52 |
| 9,355,329 B2 * | 5/2016 | McVey .................. G06K 9/4642 |
| 9,552,637 B2 * | 1/2017 | McVey .................. G06T 7/0012 |
| 9,922,243 B2 * | 3/2018 | McVey .................. G06K 9/4642 |
| 2002/0142816 A1 | 10/2002 | Stronach | |
| 2003/0171878 A1 | 9/2003 | Frudakis | |
| 2004/0208343 A1 | 10/2004 | Golden et al. | |
| 2005/0011466 A1 | 1/2005 | Doyle | |
| 2005/0030184 A1 | 2/2005 | Victor | |
| 2005/0053277 A1 | 3/2005 | Liu et al. | |
| 2007/0110281 A1 | 5/2007 | Jurk | |
| 2007/0127781 A1 | 6/2007 | Stewart | |
| 2007/0127786 A1 | 6/2007 | Hiraizumi et al. | |
| 2007/0127787 A1 | 6/2007 | Castleman et al. | |
| 2008/0137919 A1 | 6/2008 | Kozakaya et al. | |
| 2008/0175464 A1 | 7/2008 | Brett et al. | |
| 2008/0212828 A1 | 9/2008 | Ishida et al. | |
| 2008/0249835 A1 | 10/2008 | Angell et al. | |
| 2008/0298643 A1 | 12/2008 | Lawther et al. | |
| 2009/0091798 A1 | 4/2009 | Lawther et al. | |
| 2009/0156414 A1 | 6/2009 | Harrison | |
| 2009/0185723 A1 | 7/2009 | Kurtz et al. | |
| 2009/0252423 A1 | 10/2009 | Zhu et al. | |
| 2010/0074465 A1 | 3/2010 | Schneemann | |
| 2010/0131525 A1 | 5/2010 | Mahan, Jr. et al. | |
| 2010/0142762 A1 | 6/2010 | Morita | |
| 2010/0172579 A1 | 7/2010 | Reid et al. | |
| 2010/0179874 A1 | 7/2010 | Higgins et al. | |
| 2010/0179878 A1 | 7/2010 | Dawson et al. | |
| 2010/0191541 A1 | 7/2010 | Prokoski | |
| 2010/0215271 A1 | 8/2010 | Dariush et al. | |
| 2010/0224140 A1 | 9/2010 | Bareket et al. | |
| 2010/0266159 A1 | 10/2010 | Ueki et al. | |
| 2010/0322507 A1 | 12/2010 | Gunaratne | |
| 2011/0064331 A1 | 3/2011 | Andres del Valle | |
| 2011/0136086 A1 | 6/2011 | Saul et al. | |
| 2011/0206246 A1 | 8/2011 | Wolf et al. | |
| 2011/0243416 A1 | 10/2011 | Gregory et al. | |
| 2011/0257507 A1 | 10/2011 | Gregory et al. | |
| 2012/0020518 A1 | 1/2012 | Taguchi | |
| 2012/0308121 A1 | 12/2012 | Datta et al. | |
| 2013/0039548 A1 | 2/2013 | Nielsen et al. | |
| 2014/0050384 A1 | 2/2014 | Schmidt et al. | |

FOREIGN PATENT DOCUMENTS

| | | | | |
|---|---|---|---|---|
| WO | WO-2010127023 A1 * | 11/2010 | ............. | A01K 29/00 |
| WO | WO-2011063819 | 6/2011 | | |
| WO | WO 2011063819 A1 * | 6/2011 | ........... | G06T 3/0093 |
| WO | WO-2011063819 A1 * | 6/2011 | ........... | G06T 3/0093 |
| WO | WO-2011143711 A1 | 11/2011 | | |

OTHER PUBLICATIONS

Facial phenotypes—phenotypes, Algridge et al., Molecular autism, Oct. 14, 2011, pp. 1-12.*

In your face—players, Carre et al., Proceddings of the royal soc. 2008, pp. 2651-2656.*

Facial phenotypes—phenotypes, Algridge et al., Molecular autism, Oct. 14, 2011, pp. 1-9 (Year: 2011).*

Facial phenotypes—phenotypes, Algridge et al., Molecular autism, Oct. 14, 2011, pp. 1-12 (Year: 2011).*

In your face—players, Carre et al., Proceddings of the royal soc. 2008, pp. 2651-2656 (Year: 2008).*

Aldridge et al., "Facial phenotypes—correlated with clinical phenotypes," *Molecular Autism*, Oct. 14, 2011, pp. 1-9.

Angkustsiri et al., "Minor Physical Anomalies in Children with Autism Spectrum Disorders," *Autism* 2011, pp. 746-760.

Bregovic et al., "A New Method for the Design of Two-Channel Perfect-Reconstruction Linear-Phase Fir Filter Banks," *IEEE*, May 2000, pp. 639-642.

Carre et al., "In your face: facial metrics predict aggressive behaviour in the laboratory and in varsity professional hockey players," *Proc. R. Soc. B*, 275 (2008):26551-2656, Print.

Cheung et al., "MRI Study of Minor Physical Anomaly in Childhood Autism Implicates Aberrant Neurodevelopment in Infancy," *PLoS ONE*, Jun. 2011, vol. 6, Issue 6, pp. 1-7, e20246 (downloaded from www.plosone.org).

Cowboy, Maverick, "Hair Whorls and Temperament," *The Cowboy & Horse Insider*, N.p., Jun. 12, 2009, Web. Jul. 26, 2014. <http://cowboytech.blogspot.com/2009/06/hair-whorls-and-temperament.htm/.

Crystalinks article [online] "Face Analysis Physignomy," Oct. 18, 2006 (retrieved on Sep. 6, 2013]. Retrieved from the internet: <URL: http://web.archie.org/web/20061018161604/http://www.crystalinks.com/facial_analysis.html>.

Darwin, C., "The Variation of Animals and Plants under Domestication," (2nd ed.) (New York: D. Appleton & Co. 1920).

Deutsch, C. et al., Abstract, "Embryologically-Derived Measures of Dysmorphology Among AGRE Multiplex Autism Probands," *International Meeting for Autism Research*, 2011.

FAS Diagnostic & Prevention Network website. [online] FAS Facial Features: The 3 Diagnostic Facial Features of FAS, Feb. 3, 2005 (retrieved on Sep. 6, 2013]. Retrieved from the Internet: <URL:http://web/archive.org/web/20050203013523/http://epts.washington.edu/fasdpn/htmls/fas-face-htm>.

Fergus, Kathleen, article [online], "Features of Down syndrome: An Overview of the features and Characteristics of People with Down Syndrome," Feb. 2, 2009 [retrieved on Sep. 6, 2013]. Retrieved from the Internet: <URL: http://web.archive.org/web/20090202055230/http://downsyndrome.about.com /od/featuresofdownsyndrome/a/featurelong_ro.htm>.

(56) References Cited

OTHER PUBLICATIONS

Firestone et al., "Minor Physical Anomalies and Behavior in Children: A Review," *Journal of Autism and Developmental Disorders*, vol. 13, No. 4, 1983, pp. 411-425.
Hamm et al., "Automated Facial Action Coding System for Dynamic Analysis of Facial Expressions in Neuropsychiatric Disorders," *J. Neurosci. Methods*, Sep. 15, 2011: 200(2): 237-256, https://www.ncbi.nlm.nih.gov/pmc/articles/PMC3402717/.
Harden, et al., "An MRI Study of Minor Physical Anomalies in Autism," *J. Autism Dev. Disord* (2006) 36:607-611.
Jaslow, Ryan, "Children with autism have distinct facial features: Study," Mar. 26, 2012 (retrieved on Sep. 6, 2013). Retrieved from the Internet <URL: http://www.cbsnews.com/8301-50473_162-20123858-10391704/children-with-autism-have-distinct-facial-features-study>.
Kamenskaya et al., "Recognition of Psychological Characteristics from Face," *Metody Informatyki Stosowanej*, nr Jan. 2008, pp. 59-73.
Kirmizibayrak et al., "Digital Analysis and Visualization of Swimming Motion," *The International Journal of Virtual Reality*, 2011, 10(3):9-16.
Kukekova et al., "Fox Farm Experiment: Hunting for Behavioral Genes," Весмнuk BOTuC, vol. 12, No. 1/2, 2008, pp. 50-62.
Lainhart et al., "Head Circumference and Height in Autism: A Study by the Collaborative Program of Excellence in Autism," American Journal of Medical Genetics Part A, 2006, 104A:2257-2274.
Moon, Sophia, "Do your Facial Features Detorming Your Personality?" Jun. 25, 2007, retrieved on Sep. 6, 20136]. Retrieved from the Internet. <URL: http://voices.yahoo.com/do-facial-features-determine-personality-401479.html>.
Ozgen et al., "Minor physical anomalies in autism: a meta-analysis," *Molecular Psychiatry*, (2008) pp. 1-8.
Ploeger et al., "The Association Between Autism and Errors in Early Embryogenesis: What is the Causal Mechanism?" *Biol. Psychiatry*, 2009, pp. 1-6.
Randle et al., "The Relationship Between Facial Hair Whorls and temperament in Lundy Ponies," Rep. Lundy Field Soc., 52 (2002), pp. 67-83.
Rodier et al., "Minor Malformations and Physical Measurements in Autism: Data From Nova Scotia," *Teratology*, 55:319-325 (1997).
Santos et al., "Using Nonlinear Models to Describe Height Growth Curves in Pantaneiro Horses," *Pesq. agropec. bras.*, 34.7 (1999) pp. 1133-1138.
"Take the Pet Personals quiz to find real pets that fit your lifestyle" by Joan, published Mar. 8, 2010 at https://www.petfinder.com/blog/2010/03/find_your_furkeeps_soul_mate_w/.
Taylor, Kimberly Hayes, "Autistic children have distinct facial features, study suggest," (retrieved on Sep. 6, 2013). Retrieved from the Internet: <URL: http://www.abcnews.com/health/autistic-children-have-distinct-facial-features-study-suggests-1C5436758?franchiseSlug=healthmain>.
Tomkins et al., "Hair Whorles in the Dog (*Canis familiaris*). I. Distribution," *The Anatomical Record*, 293 (2010] pp. 338-350.
Tripi et al., "Minor physical anomalies in children with autism spectrum disorder," *Early Human Development* (2008) 84, pp. 217-223.
Trut, Lyudmila N., "Early Canid Domestication: The Farm-Fox Experiment," *American Scientist*, vol. 87, Mar.-Apr. 1999, pp. 165-169.
University of Missouri article (online) "Is it autism? Facial features that show disorder," Oct. 31, 2012 (retrieved on Sep. 6, 2013). Retrieved from the Internet: URL: http://web.archive.org/web/20121031143726.http://www.cbsnews.com/2300-204-162-10009911.html>.
Wikipedia website (online), "Childhood Autism Rating Scale," Apr. 14, 2008 (retrieved on Sep. 5, 2013). Retrieved from the Internet: <URL: http://web.archive.orq/web/20080414094636/http://n.wikipedia.org/wiki/Childhood_Autism_Rating_Scale>.
PCT/US2012/037103 International Search Report, dated Dec. 28, 2012.
PCT/US2012/064178 International Search Report, dated Mar. 26, 2013.

\* cited by examiner

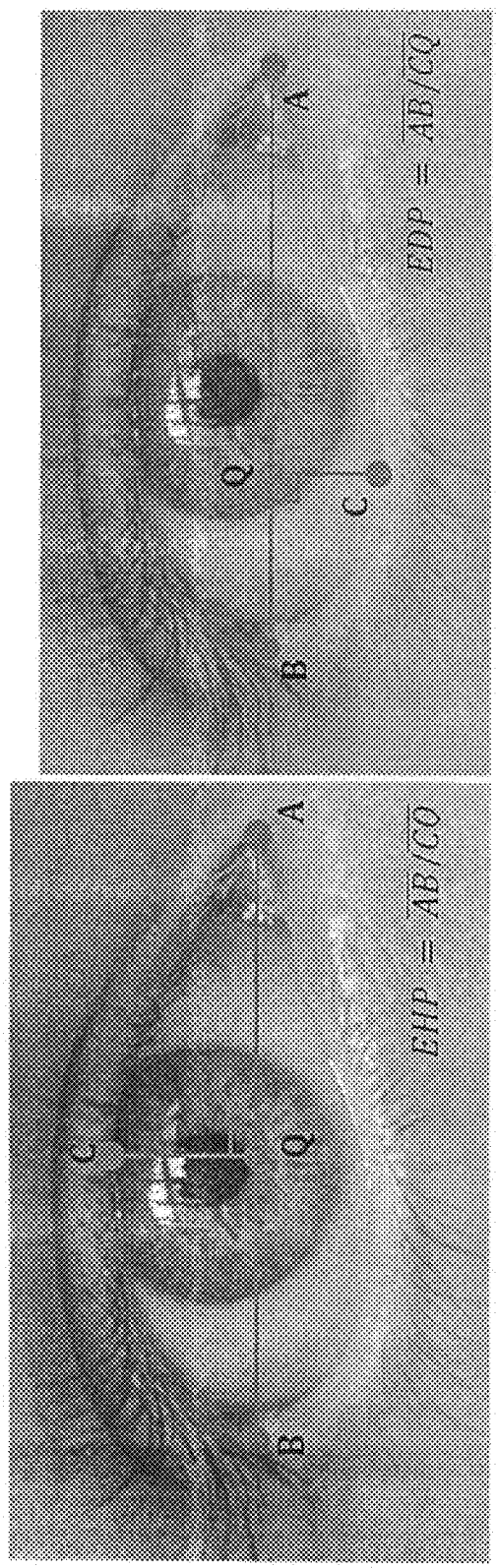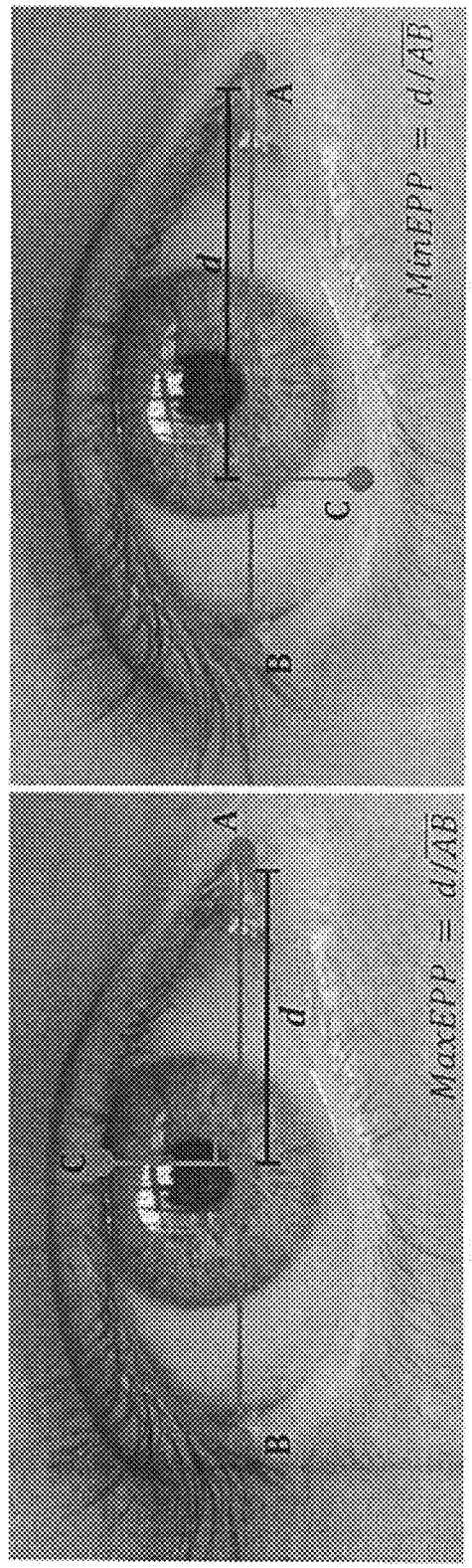
Fig. 1A  Fig. 1B  Fig. 1C  Fig. 1D

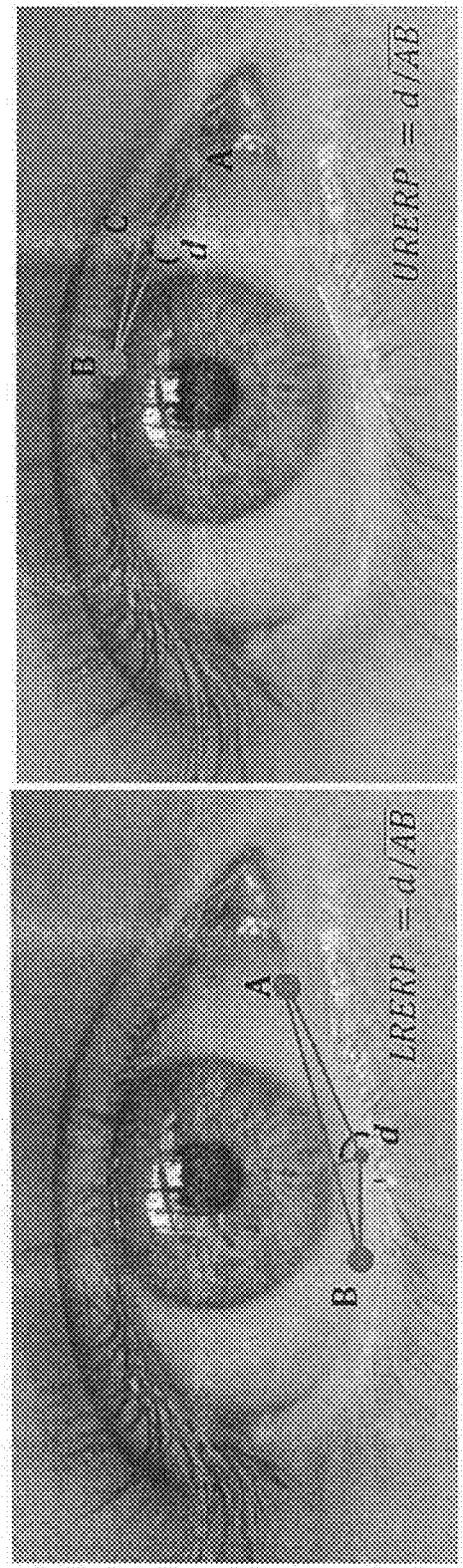
Fig. 1J
Fig. 1I
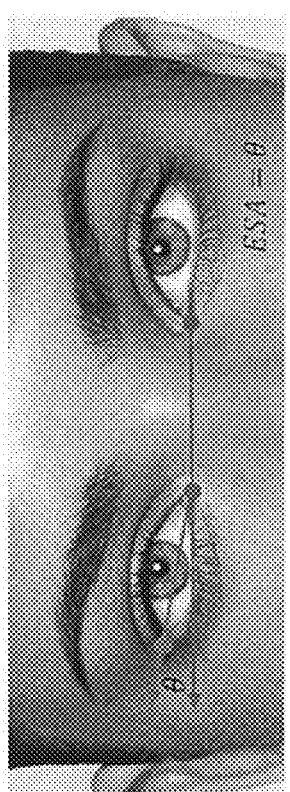
Fig. 1L
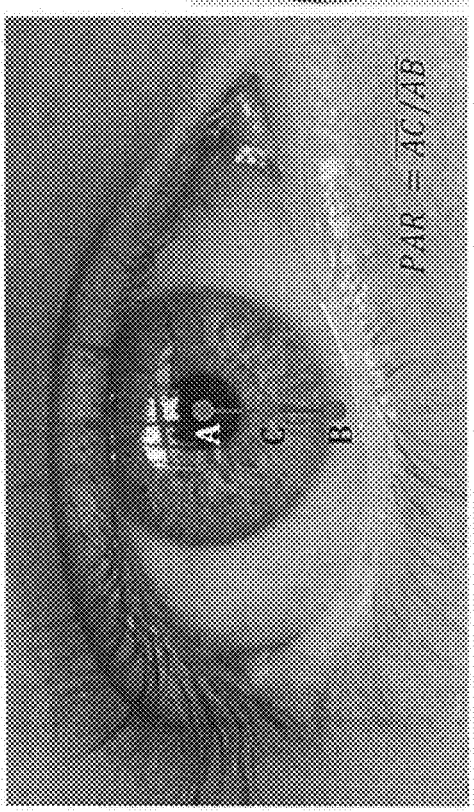
Fig. 1K

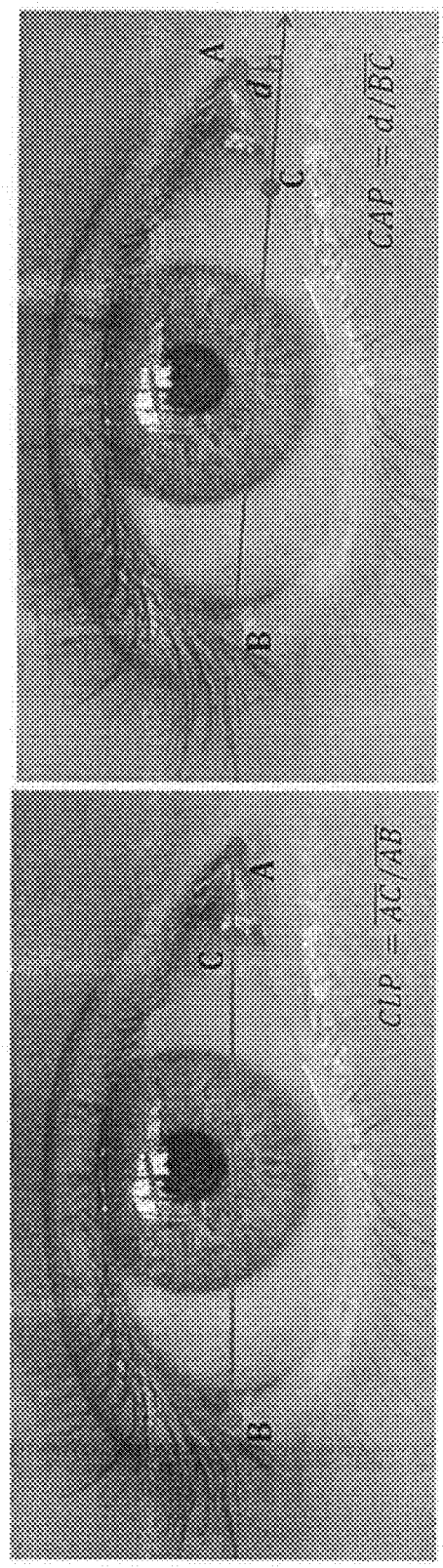
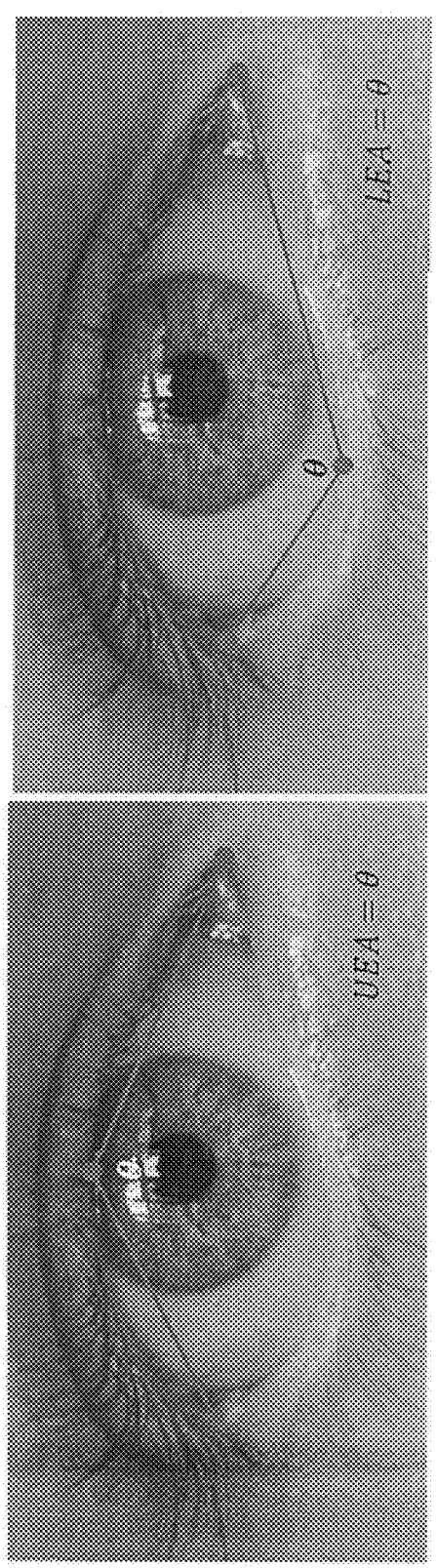
Fig. 1O
Fig. 1P
Fig. 1Q
Fig. 1R

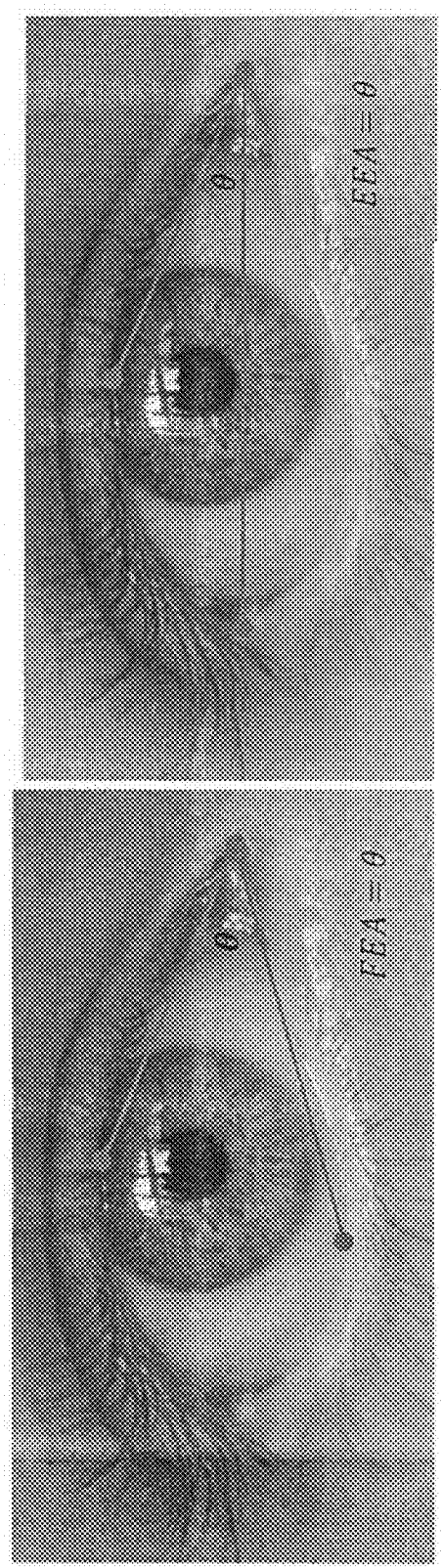
Fig. 1T
Fig. 1S
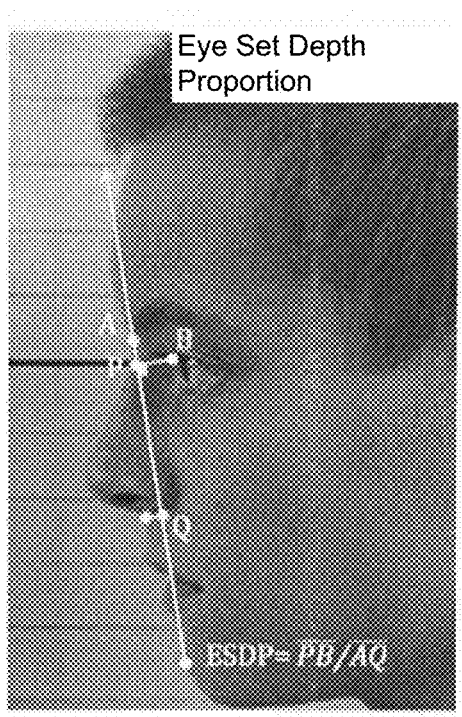
Eye Set Depth Proportion
Fig. 1V
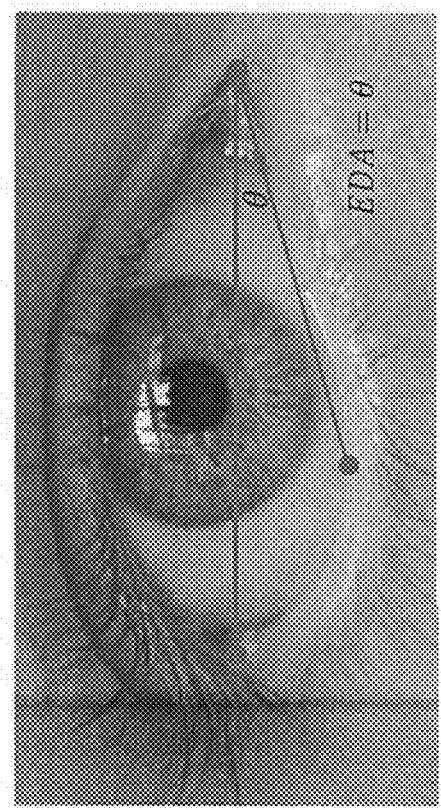
Fig. 1U $$FLP = \frac{\overline{CD}}{\overline{AB}} * 100$$

$$MFP = \frac{\overline{BC}}{\overline{AC}} * 100$$

$ULPP = \overline{CQ}/\overline{AB}$ $LLPP = \overline{CQ}/\overline{AB}$ $ULTP = \overline{CQ}/\overline{AB}$ $LLTP = \overline{CQ}/\overline{AB}$ LLMPP= $\overline{AB}/\overline{AQ}$ ULMPP= $\overline{AB}/\overline{AQ}$

LLA= θ

ULA= θ

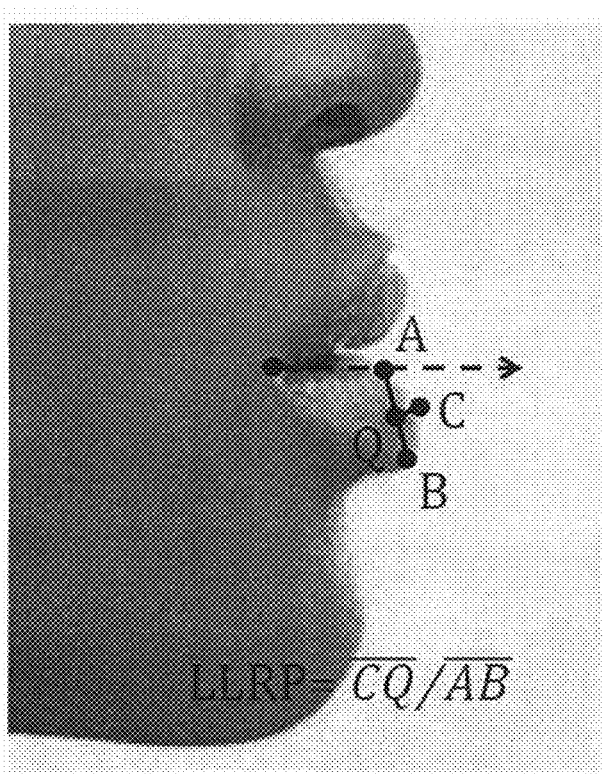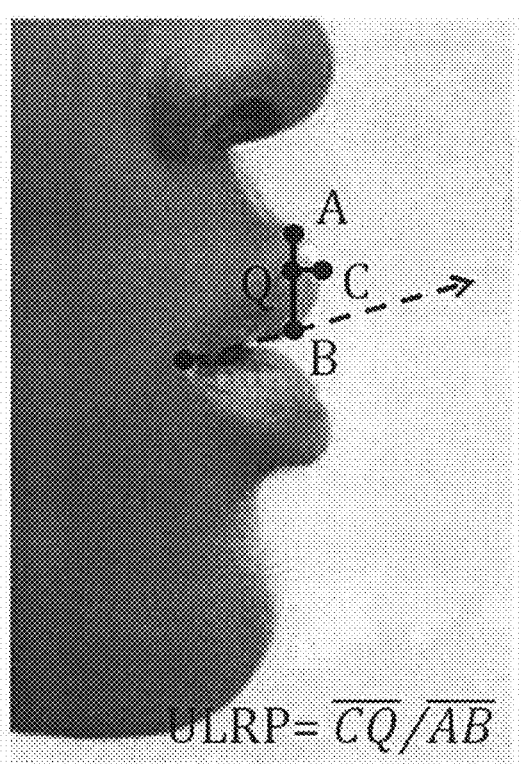
Fig. 3I
Fig. 3J
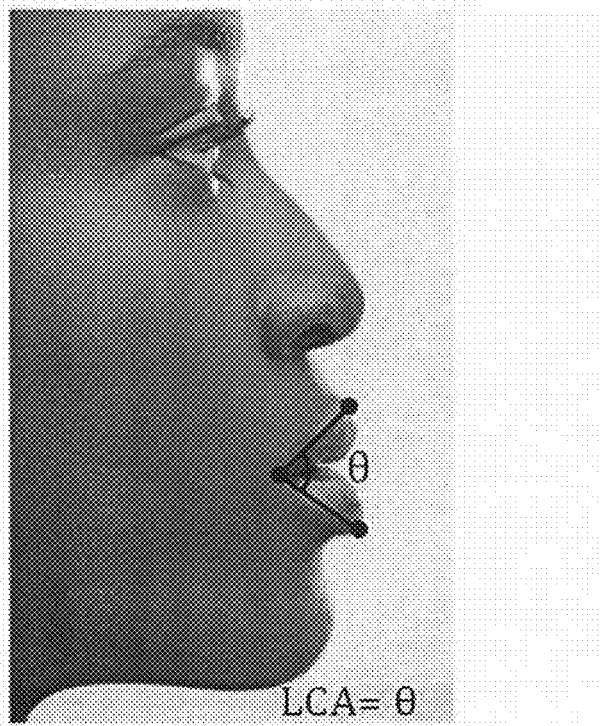
Fig. 3K $CRP = \overline{CQ}/\overline{AB}$ Lambiomental Inflexion Proportion $LIP = \overline{CQ}/\overline{AB}$ Chin Height Proportion $CHP = \dfrac{\overline{BC}}{\overline{AB}} * 100$ Jowl Depth Angle

JDA = θ

$$\text{LAP} = \frac{\overline{BQ}}{\overline{AP}}$$

$$\text{LLP} = \frac{d2}{d1 + d2}$$

$$\text{INDP} = \frac{\overline{CQ}}{\overline{AB}}$$

$$\text{TPP} = \frac{\overline{CD}}{\overline{AB}}$$

$$\text{TMPP} = \frac{\overline{AD}}{\overline{AB}}$$

$$\text{APP} = \frac{\overline{DB}}{\overline{AC}}$$

$$\text{AMPP} = \frac{\overline{AC}}{\overline{AB}}$$

$$\text{CIP} = \frac{\overline{DB}}{\overline{AC}}$$

Upper Concha Separation Angle $$\text{CIP} = \frac{\overline{CD}}{\overline{AB}}$$

Ear Tip Length Proportion $$\text{ETLP} = \frac{\overline{AC}}{\overline{AB}}$$

Upper Concha Separation Angle $$\text{CIP} = \frac{\overline{CD}}{\overline{AB}}$$

Ear Roundness Proportion $$\text{ERP} = \frac{\overline{CQ}}{\overline{AB}}$$

Crus Helix Angle

CHA = Θ

Tubercle Proportion $$TP = \frac{\overline{CQ}}{\overline{AB}}$$

Helix Thickness Proportion $$HTP = \frac{\overline{BC}}{\overline{CQ}}$$

Lobule Inflexion Proportion $$LIP = \frac{\overline{CQ}}{\overline{AB}}$$

IMAGE ANALYSIS FOR DETERMINING CHARACTERISTICS OF GROUPS OF INDIVIDUALS

CROSS-REFERENCE TO RELATED APPLICATIONS

This application is a continuation application of U.S. patent application Ser. No. 13/672,612, filed on Nov. 8, 2012, which is a continuation-in-part of U.S. application Ser. No. 13/467,869, entitled "Image Analysis for Determining Characteristics of Animals," and a continuation-in-part of U.S. application Ser. No. 13/467,889, entitled "Image Analysis for Determining Characteristics of Humans," both of which were filed May 9, 2012. U.S. application Ser. No. 13/672,612 also claims priority to U.S. Provisional Application Ser. No. 61/484,126, entitled "Image Analysis for Determining Characteristics of Animals," which was filed May 9, 2011 and U.S. Provisional Application Ser. No. 61/616,234, entitled "Image Analysis for Determining Characteristics of Animals," which was filed Mar. 27, 2012, the content of these applications are incorporated herein by reference.

This application incorporates by reference U.S. application Ser. No. 13/672,627 entitled "Image Analysis for Determining Characteristics of Individuals" filed on Nov. 8, 2012 by the same inventor and U.S. application Ser. No. 13/672,657 entitled "Image Analysis for Determining Characteristics of Pairs of Individuals" filed on Nov. 8, 2012 by the same inventor.

TECHNICAL FIELD

The disclosure herein relates to the objective determination of a characteristic of an individual, such as a human or non-human animal, by applying computational methods to one or more images of the individual to generate one or more metrics indicative of the characteristic of interest. It also relates to the determining the degree to which particular groups of two or more individuals are suitable for a particular purpose, task, or relationship.

BACKGROUND

Animal domestication can be thought of as developing a mutually useful relationship between animals and humans. Over the past 12,000 years, humans have learned to control their access to food and other necessities of life by changing the behaviors and natures of wild animals. All of today's domesticated animals—including dogs, cats, cattle, oxen, llamas, sheep, goats, camels, geese, horses, chickens, turkeys, and pigs—started out as wild animals but were changed over the centuries and millennia into animals that are tamer, quieter, and generally more cognitively suited to a lifestyle of coexistence with humans. Today people benefit from domesticated animal in many ways including keeping cattle in pens for access to milk and meat and for pulling plows, training dogs to be guardians and companions, teaching horses to adapt to the plow or take a rider, and changing the lean, nasty wild boar into the fat, friendly pig.

When individuals are looking to breed animals, they look for certain traits in purebred stock that are valued for a particular purpose, or may intend to use some type of crossbreeding to produce a new type of stock with different, and, it is presumed, superior abilities in a given area of endeavor. For example, to breed chickens, a typical breeder intends to receive eggs, meat, and new, young birds for further reproduction. Thus, the breeder has to study different breeds and types of chickens and analyze what can be expected from a certain set of characteristics before he or she starts breeding them. On the other hand, purebred breeding aims to establish and maintain stable traits that animals will pass to the next generation. By "breeding the best to the best," employing a certain degree of inbreeding, considerable culling, and selection for "superior" qualities, one could develop a bloodline superior in certain respects to the original base stock.

As first noted by Charles Darwin, domesticated animals are known to share a common set of physical characteristics, sometimes referred to as the domestication phenotype. C. Darwin, THE VARIATION OF ANIMALS AND PLANTS UNDER DOMESTICATION ($2^{nd}$ ed.) (New York: D. Appleton & Co., 1883). They are often smaller, with floppier ears and curlier tails than their untamed ancestors. Their coats are sometimes spotted while their wild ancestors' coats are solid. One long-term study demonstrating this phenomenon has been ongoing since 1958 at the Institute of Cytology and Genetics in Novosibirsk, Russia. In this study, scientists have successfully demonstrated that, through careful selective breeding for tamability, wild Siberian silver foxes acquire both the behavioral and appearance traits of domesticated dogs. See, e.g., L. Trut, *Early Canid Domestication: The Fox Farm Experiment*, 87 AMERICAN SCIENTIST 160-69 (March-April 1999). This highly conserved combination of psychological and morphological changes during the process of domestication is seen to varying degrees across a remarkably wide range of species, from horses, dogs, pigs, and cows to some non-mammals like chickens and even a few fish. However, in no other species has this relationship between behavior and anatomical features been more widely noted than in the horse.

Relationships also exist in humans between physiological feature sets (i.e., phenotypes) and certain cognitive functions and/or personality traits. During progressive stages of human embryonic growth, development of the brain and face remains intimately connected through both genetic signaling and biomechanical/biochemical mechanisms. The face develops from populations of cells originating from the early neural crest, with cells from the neural tube gradually shifting to form the prominences of the face. Differentiation of these early cells is closely regulated through intricate genetic signaling mechanisms, with the brain essentially serving as the platform on which the face grows. As these two structures continue to grow and develop during the later embryonic stages, their phenotypes remain closely linked as complex genetic hierarchies regulate patterns of cross talk between molecules, cells, and tissues.

SUMMARY

Embodiments comprise a method for measuring an individual, such as a human or non-human animal, to determine one or more characteristics of the individual, comprising receiving one or more digital images representing the individual, storing the images in a computer memory, adding a plurality of reference points to the stored digital images, and computing one or more metrics relating to the characteristic of the individual using the reference points. Other embodiments comprise a method for determining a characteristic of an individual based on a set of metrics related to the individual, comprising selecting one or more metrics from the set of metrics, calculating a combined metric using the selected metrics, and determining the characteristic of the individual based on the value of the combined metric. Other embodiments comprise computer systems that implement one or more of the above methods.

Other embodiments include a method for predicting a human characteristic comprising, for each of a plurality of individuals, storing one or more digital images representing the individual in a memory operably connected to a digital computer; annotating the one or more digital images with a plurality of reference points; associating at least one other data value about the individual with the one or more digital images representing the individual; computing, with the digital computer, one or more metrics using the plurality of reference points. The method further comprises selecting a combination of the one or more metrics for predicting the human characteristic. In some embodiments, the selecting step further comprises determining one or more relationships between the one or more metrics and the at least one other data value for the plurality of individuals and the combination is selected based on the one or more relationships. Other embodiments comprise systems and computer-readable media embodying these methods.

Other embodiments include a method for determining a characteristic of an individual human based on one or more metrics related to the individual, comprising storing one or more digital images representing the individual in a memory operably connected to a digital computer; annotating the one or more digital images with a plurality of reference points; computing, with the digital computer, the one or more metrics using the plurality of reference points; and predicting the characteristic of the individual based on the one or more metrics. In some embodiments, the predicting step further comprises computing a combined metric based on a predetermined function of the one or more metrics and predicting the characteristic based on the combined metric. In some embodiments, predicting the one or more characteristics of the individual based on the one or more metrics comprises computing one or more indicators used for predicting the one or more characteristics. Depending on embodiment, the one or more indicators may comprise one or more primary indicators, one or more secondary indicators, one or more tertiary indicators, and/or one or more suitability indicators. Other embodiments comprise systems and computer-readable media embodying these methods.

Other embodiments include a method for predicting one or more characteristics of a group of two or more individuals comprising, for each of the individuals within the group, storing one or more digital images representing the individual in a memory operably connected to a digital computer; annotating the one or more digital images with a plurality of reference points; computing, with the digital computer, one or more metrics using the plurality of reference points; and predicting one or more characteristics of the individual based on the one or more metrics. The method further comprises predicting the one or more characteristics of the group of individuals based on the predicted one or more characteristics of the individual comprising the group. Some embodiments further comprise determining a strategy relating to the group of individuals based on the predicted one or more characteristics of the group. Some embodiments further comprise computing one or more combined metrics, each based on a predetermined function of the one or more metrics, and predicting the one or more characteristics of an individual based on the one or more combined metrics. In some embodiments, the group comprises a pair of individuals, and predicting the one or more characteristics of the pair based on the one or more metrics comprises computing one or more indicators used for predicting the one or more characteristics. In some embodiments, the one or more indicators may comprise one or more individual indicators (e.g., principal, secondary, and/or tertiary indicators) and one or more pairwise indicators related to a pair of individuals. Other embodiments comprise systems and computer-readable media embodying these methods.

Other embodiments include a method for determining a characteristic of a subject (e.g., a human), comprising calculating two or more ratios based upon metrics related to a subject's head, wherein distances or angles between reference points on the subject's head are used; predicting, using a computer and computations, a characteristic of the subject wherein the two or more ratios are used and wherein data about a group of subjects are referenced; and providing the predicted characteristic to an output device. Other embodiments comprise systems and computer-readable media embodying these methods.

Other embodiments include a method for choosing a combination of two individuals for a particular task, comprising computing one or more metrics related to one individual; computing one or more metrics related to each of a plurality of second individuals; computing a combination characteristic related to the combination of the first individual with each of the plurality of second individuals, based on at least a portion of the one or more metrics related to the first individual and at least a portion of the one or more metrics related to each of the plurality of second individuals; and determining the combination of the first individual and one of the plurality of second individuals based on the computed combination characteristics. Depending on embodiment, the first individual may be a human or non-human animal and all of the plurality of second individuals may be humans or members of the same non-human animal species. Other embodiments comprise systems and computer-readable media embodying these methods.

DESCRIPTION OF THE DRAWINGS

The detailed description will refer to the following drawings, wherein like numerals refer to like elements, and wherein:

FIG. 1A shows facial descriptor measurement Eye Height Proportion (EHP);

FIG. 1B shows facial descriptor measurement Eye Depth Proportion (EDP);

FIG. 1C shows facial descriptor measurement Maximal Eye Point Proportion (MaxEPP);

FIG. 1D shows facial descriptor measurement Minimal Eye Point Proportion (MinEPP);

FIG. 1I shows facial descriptor measurement Upper Rostral Eye Roundness Proportion (URERP);

FIG. 1J shows facial descriptor measurement Lower Rostral Eye Roundness Proportion (LRERP);

FIG. 1K shows facial descriptor measurement Pupilary Area Ratio (PAR), which is the area the area covered by the pupil when maximally dilated, characterized by radially striated bands around the area when not fully dilated;

FIG. 1L shows facial descriptor measurement Eye Set Angle (ESA);

FIG. 1O shows facial descriptor measurement Caruncle Length Proportion (CLP);

FIG. 1P shows facial descriptor measurement Caruncle Angular Proportion (CAP);

FIG. 1Q shows facial descriptor measurement Upper Eye Angle (UEA);

FIG. 1R shows facial descriptor measurement Lower Eye Angle (LEA);

FIG. 1S shows facial descriptor measurement Front Eye Angle (FEA);

FIG. 1T shows facial descriptor measurement Eye Elevation Angle (EEA);

FIG. 1U shows facial descriptor measurement Eye Depression Angle (EDA);

FIG. 1V shows facial descriptor measurement Eye Set Depth Proportion (ESDP);

FIG. 3I shows facial descriptor measurement Lower Lip Roundness Proportion (LLRP);

FIG. 3J shows facial descriptor measurement Upper Lip Roundness Proportion (ULRP);

FIG. 3K shows facial descriptor measurement Lip Convergence Angle (LCA);

DETAILED DESCRIPTION

Various methods for using metrics, such as facial measurements, associated with the physical form of an individual, such as a human or other animal, to predict a characteristic including behavior, suitability, or potential are described. Also, the methods described are useful for grouping, pairing, or matching of individuals for various purposes, both within a species and across species.

The biological mechanism relied upon in the disclosed embodiments was first proposed in the ground-breaking 1999 Russian study entitled "Early Canid Domestication: The Fox Farm Experiment." Using an extensive breeding program of wild silver foxes (vulpes vulpes), this study showed that selective breeding can be used to alter the innate personality traits or cognitive characteristics of a line of domesticated animals. More particularly, this study demonstrated that endocrine or hormone changes are significantly correlated with both the personality trait changes and a predictable suite of morphological changes, most predominantly in the structures of the face.

Figure 8:
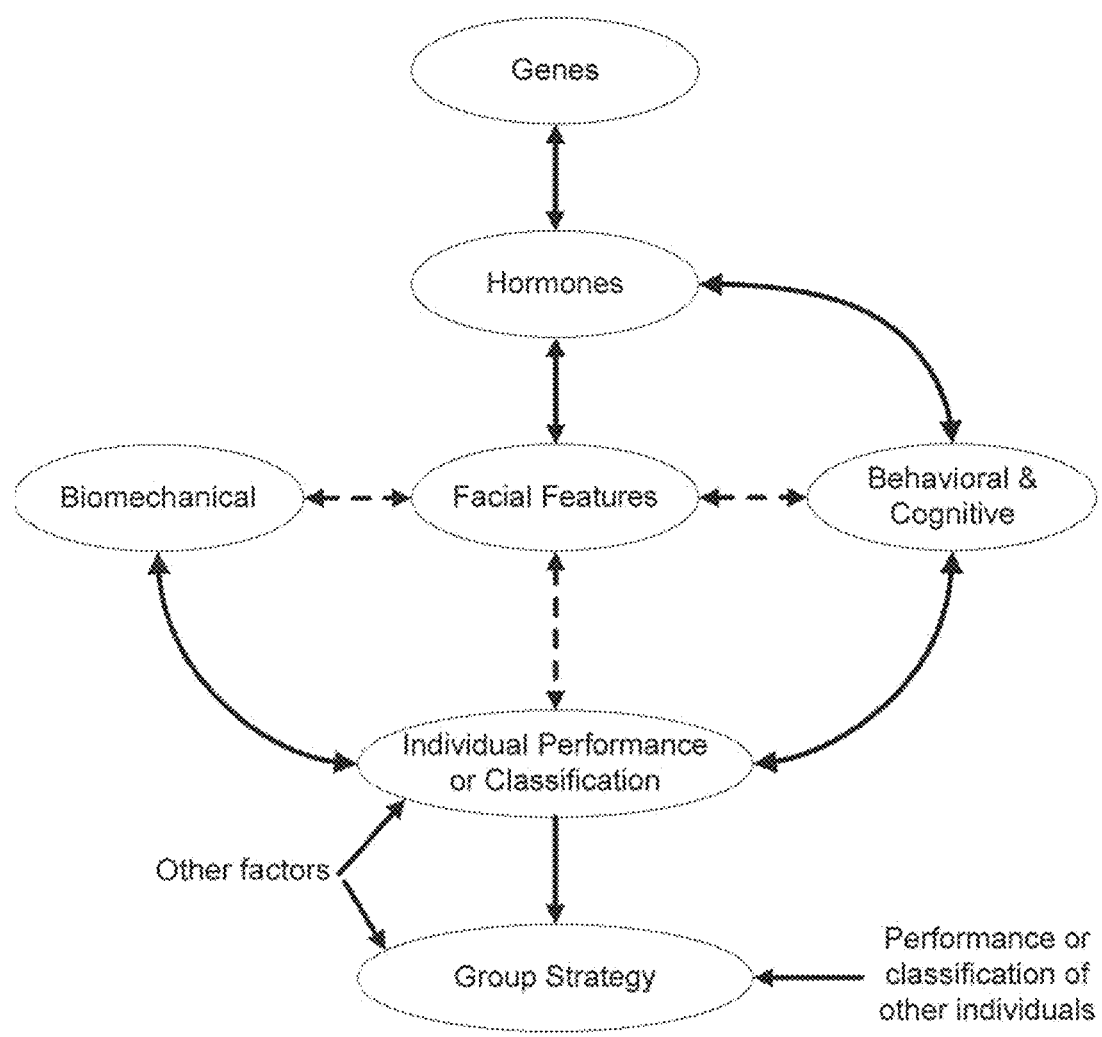
FIG. 8 shows various relationships between genes, hormones, behavior, and facial features of an individual, such as a human or other animal.

As illustrated graphically in FIG. 8, the innate personality of an animal originates in its genetic composition. Genes dictate the basal levels of neurologically active hormones that control the behavior of an animal, such serotonin, which inhibits aggression. Genes also dictate the timing of the release of these hormones, such as corticosteroids (stress response) that control the windows of postnatal cognitive and social development in young animals. The cognitive framework of an animal is thus determined from a combination of these innate personality traits provided by this genetically controlled endocrine makeup—the so-called "nature effect"—and the stimuli and experiences that the animal was subject to during development—the so-called "nurture effect." When viewed in the context of the animal's current environment, this cognitive framework dictates its behavioral performance, which may be defined in such terms as cognitive suitability to a specific task, success in performing a specific task, likelihood of displaying a specific type or pattern of behavioral responses, or, when compared against the personality types of its conspecifics, performance of an individual in group situations.

As mentioned above, variation in the basal levels of neurologically active hormones and in particular the timing of their release windows during development account not only for differences in innate personality among animals of the same species, but also for variability in morphology, particularly of the face. This direct correlation between the facial structure and endocrine composition of an animal subsequently allows for quantifiable features of an animal's face to be correlated with and used as a proxy for predicting variability in the innate behavior of individual animals as a function of their neurochemical makeup. Variations in facial structure may also be used to predict the behavior and performance of an animal as a result of the variations in the degree of functionality that they allow, in terms such as field of vision, auditory acquisition, oxygen intake, feed intake, etc.

Various facial recognition and image matching techniques will mathematically model an animal's face and allow the prediction of behavior and performance. While these embodiments are effective, the processes and techniques of facial recognition and image matching are generally computationally intensive. Therefore, trigonometric modeling is used by some embodiments. Combinations of facial/shape recognition, image matching and trigonometric modeling may be used to predict behavior and performance.

Since the domestication phenotype is common across many species of animals, embodiments described herein are applicable to a broad range of individuals, both mammals and non-mammals, including humans, donkeys, cattle, oxen, llamas, sheep, goats, turkey, geese, dogs, foxes, cats, ferrets, camels, geese, chickens, pigs, fish, etc. For example, embodiments described herein may be used to predict certain characteristics of humans via methods employing facial descriptor measurements. During progressive stages of human embryonic growth, development of the brain and face remains intimately connected through both genetic signaling and biomechanical/biochemical mechanisms. The face develops from populations of cells originating from the early neural crest, with cells from the neural tube gradually shifting to form the prominences of the face. Differentiation of these early cells is closely regulated through intricate genetic signaling mechanisms, with the brain essentially serving as the platform on which the face grows. As these two structures continue to grow and develop during the later embryonic stages, their phenotypes remain closely linked as complex genetic hierarchies regulate patterns of cross talk between molecules, cells, and tissues.

Figure 1F:
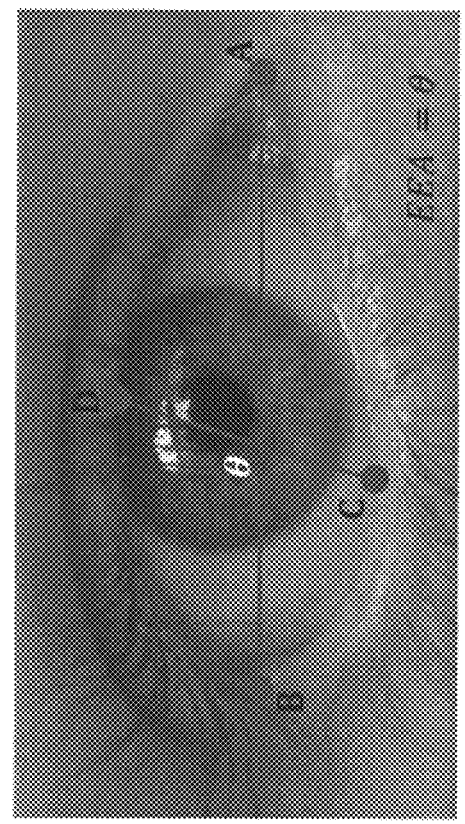
FIG. 1F shows facial descriptor measurement Eye Extrema Angle (EEA)
Figure 1H:
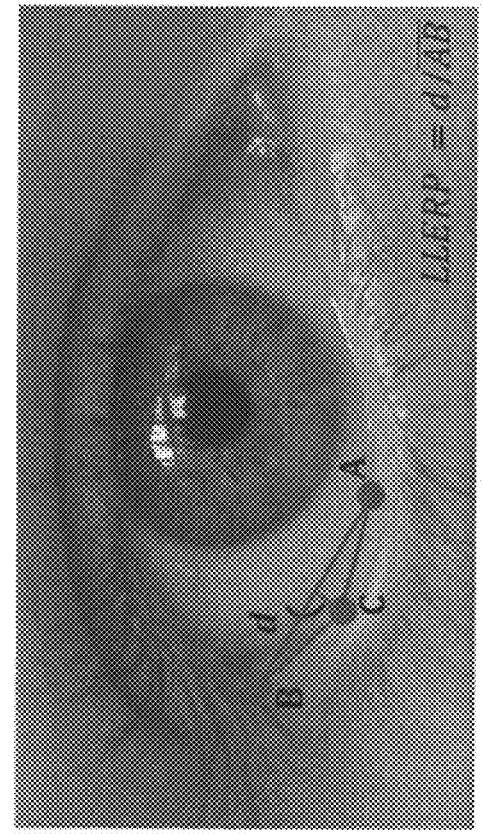
FIG. 1H shows facial descriptor measurement Lower Lateral Eye Roundness Proportion (LLERP)
Figure 1E:
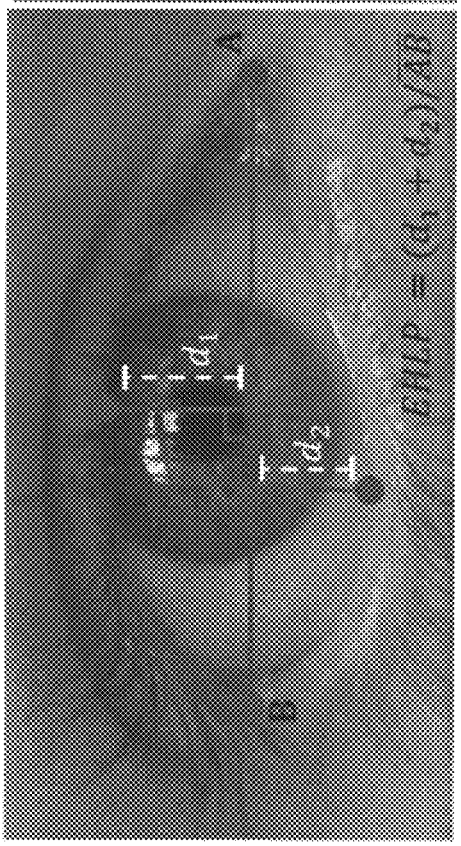
FIG. 1E shows facial descriptor measurement Eye Height to Length Proportion (EHLP)
Figure 1G:
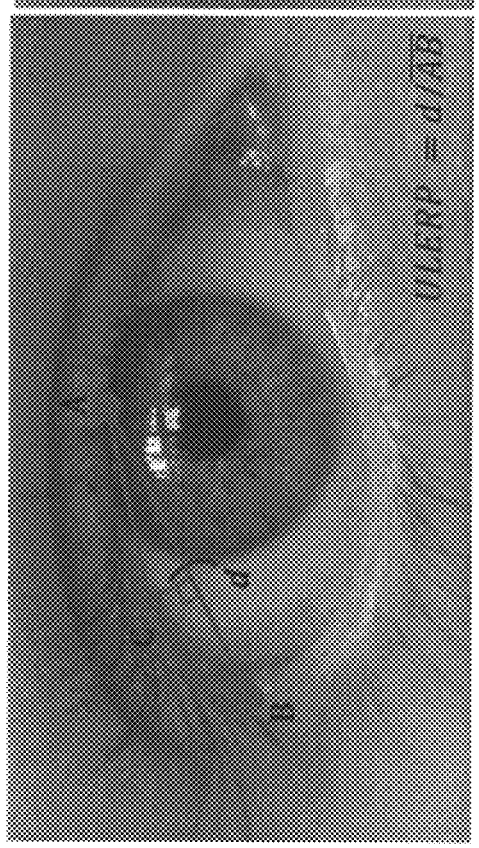
FIG. 1G shows facial descriptor measurement Upper Lateral Eye Roundness Proportion (ULERP)
Figure 1M:
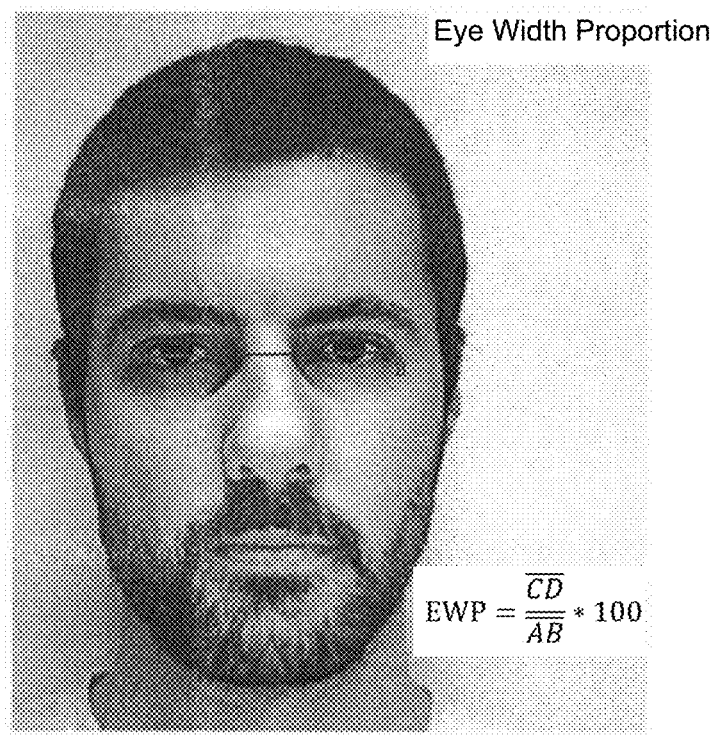
FIG. 1M shows facial descriptor measurement Eye Width Proportion (EWP)
Figure 1N:
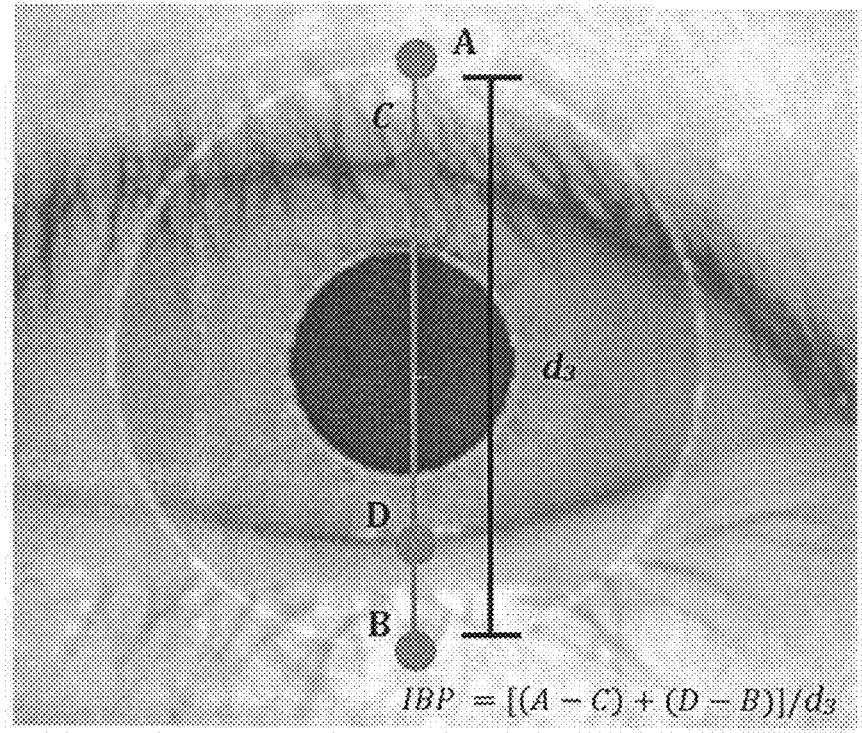
FIG. 1N shows facial descriptor measurement Iris Boundary Proportion (IBP)
Figure 2A:
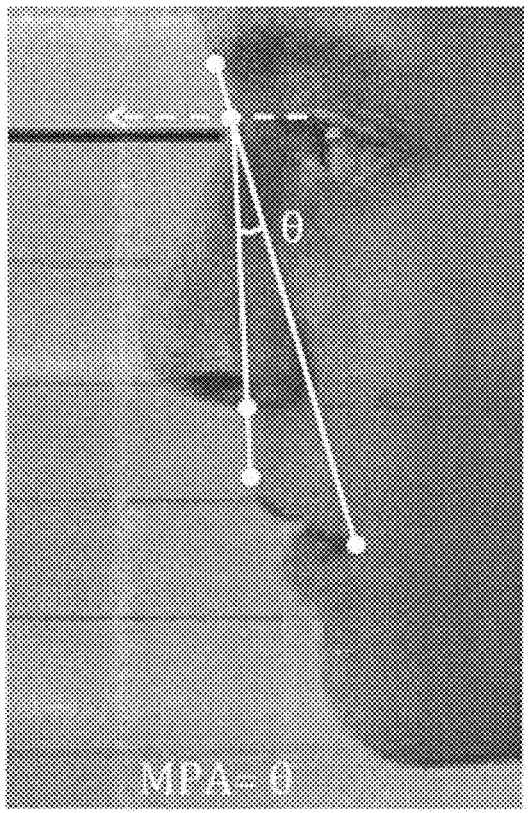
FIG. 2A shows facial descriptor measurement Maxillary Palate Angle (MPA)
Figure 2B:
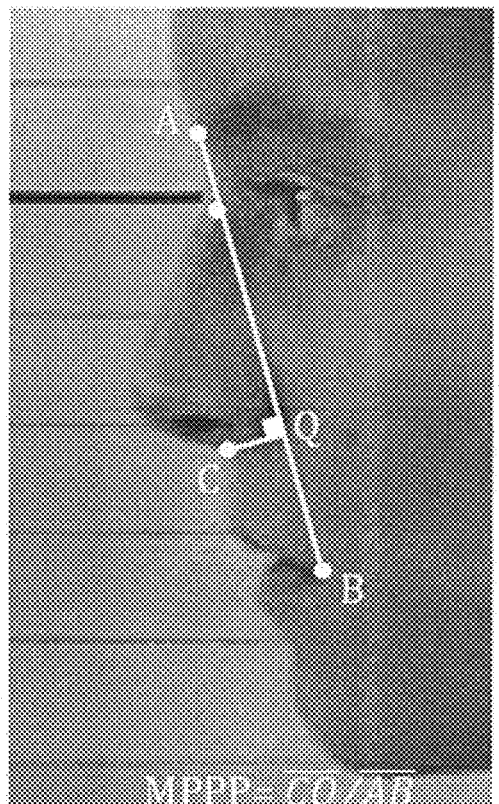
FIG. 2B shows facial descriptor measurement Maxillary Plate Prominence Proportion (MPPP)
Figure 2C:
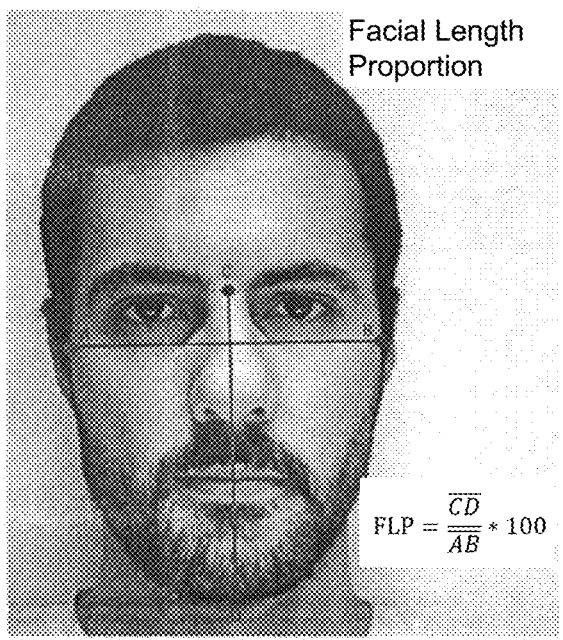
FIG. 2C shows facial descriptor measurement Facial Length Proportion (FLP)
Figure 2D:
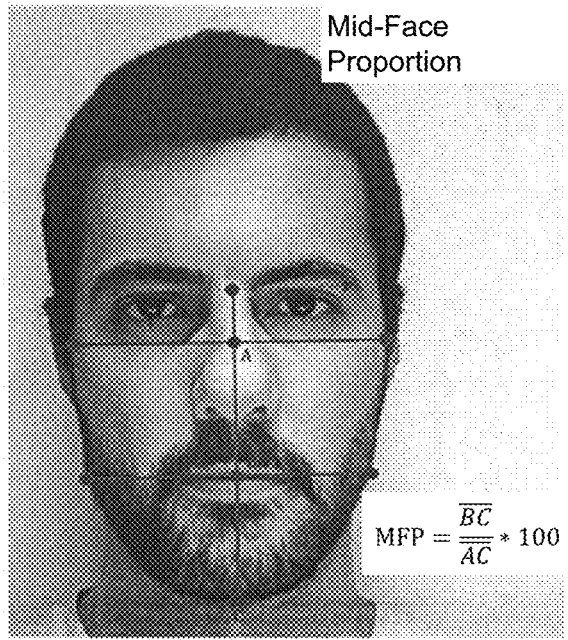
FIG. 2D shows facial descriptor measurement Mid-Face Proportion (MFP)
Figure 2E:
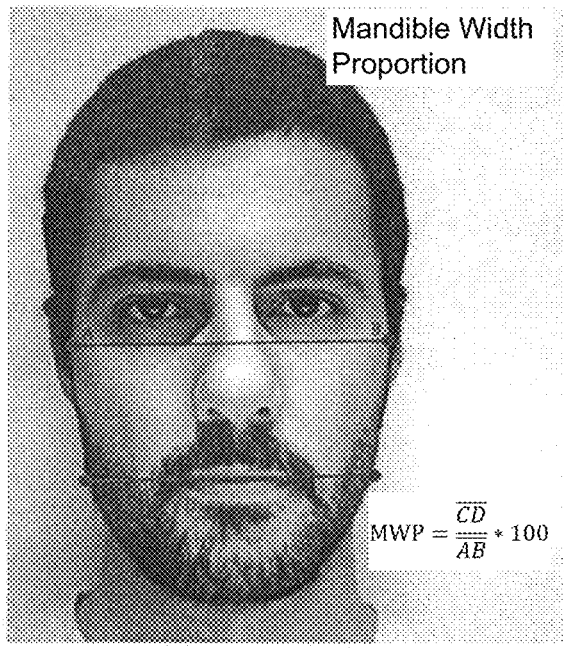
FIG. 2E shows facial descriptor measurement Mandible Width Proportion (MWP)
Figure 2F:
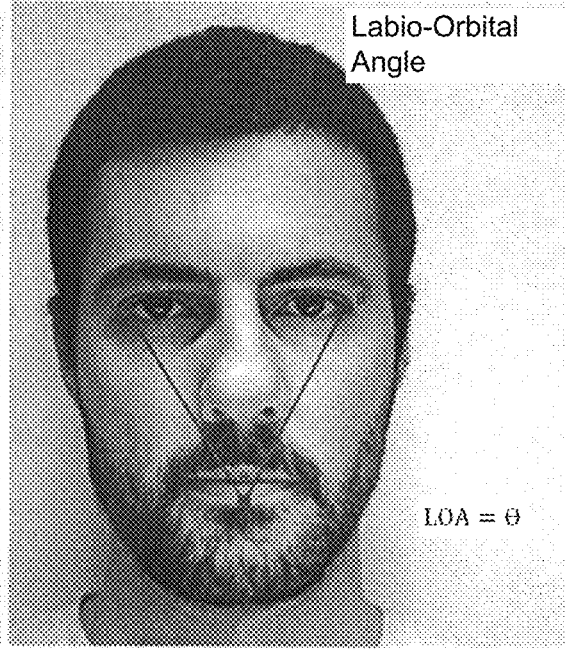
FIG. 2F shows facial descriptor measurement Labio-Orbital Angle (LOA)
Figure 2G:
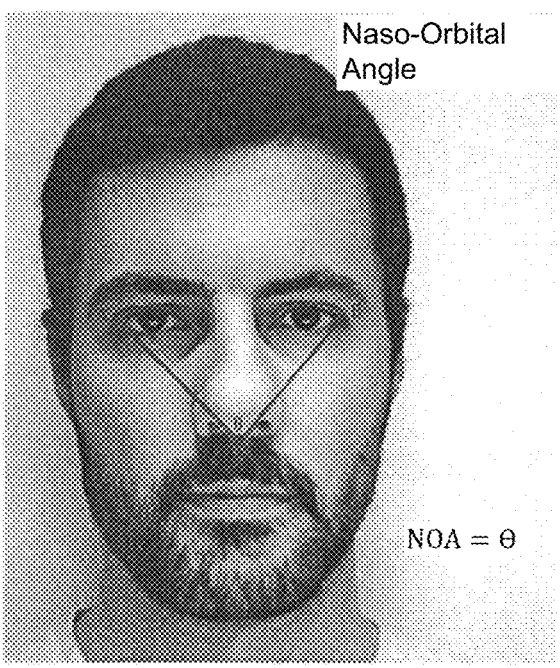
FIG. 2G shows facial descriptor measurement Naso-Orbital Angle (NOA)
Figure 2H:
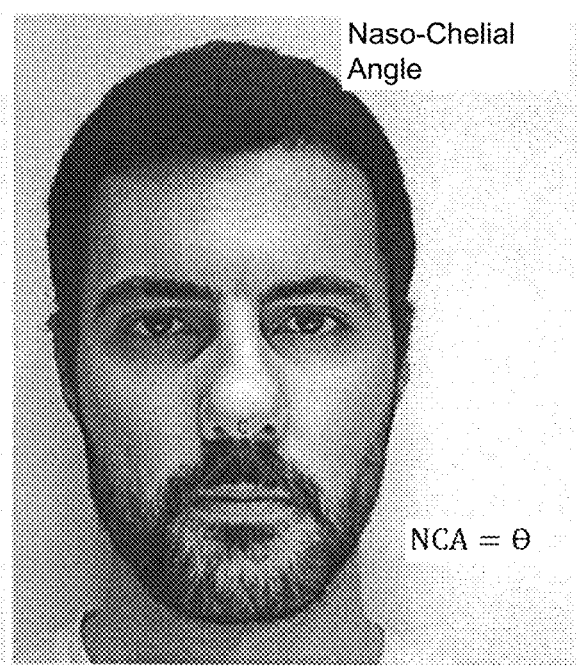
FIG. 2H shows facial descriptor measurement Naso-Chilial Angle (NCA)
Figure 3A:
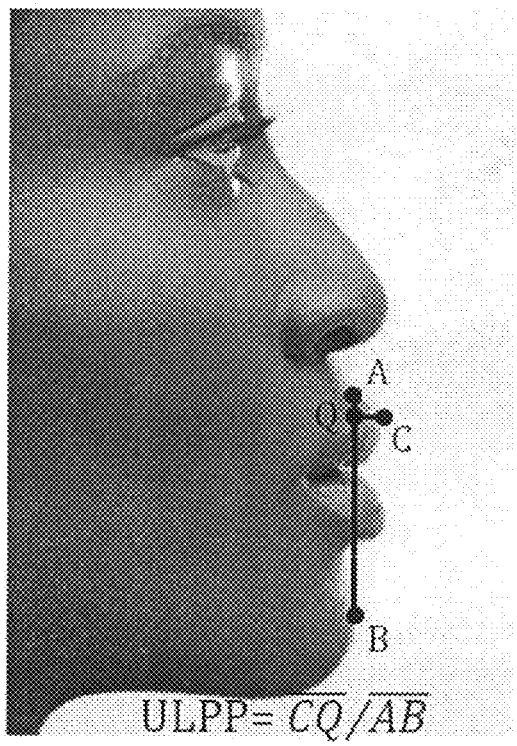
FIG. 3A shows facial descriptor measurement Upper Lip Protuberance Proportion (ULPP)
Figure 3B:
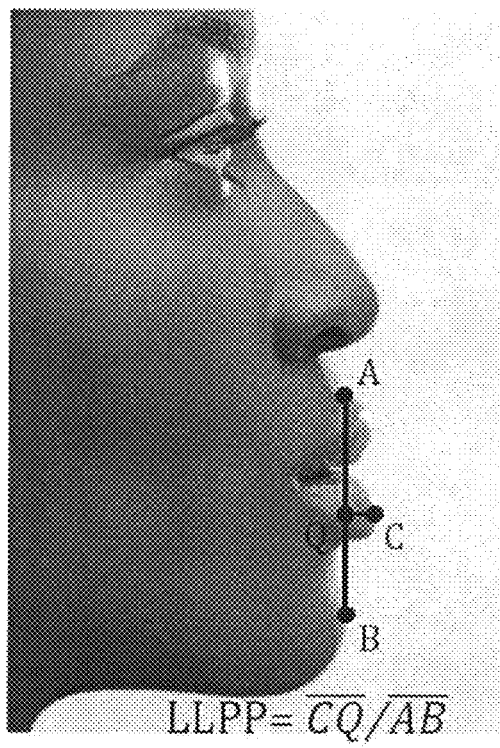
FIG. 3B shows facial descriptor measurement Lower Lip Protuberance Proportion (LLPP)
Figure 3C:
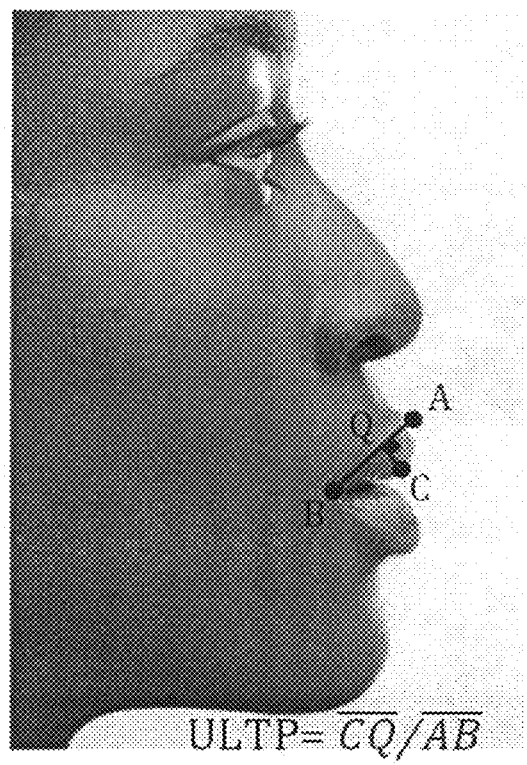
FIG. 3C shows facial descriptor measurement Upper Lip Thickness Proportion (ULTP)
Figure 3D:
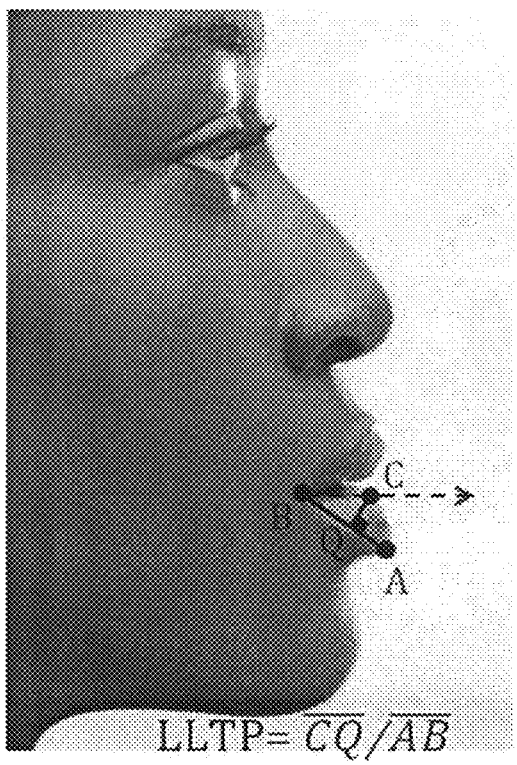
FIG. 3D shows facial descriptor measurement Lower Lip Thickness Proportion (LLTP)
Figure 3E:
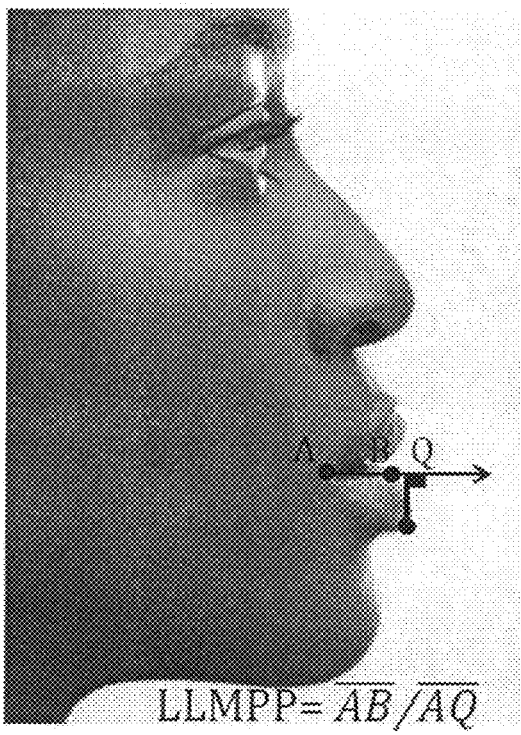
FIG. 3E shows facial descriptor measurement Lower Lip Maxima Point Proportion (LLMPP)
Figure 3F:
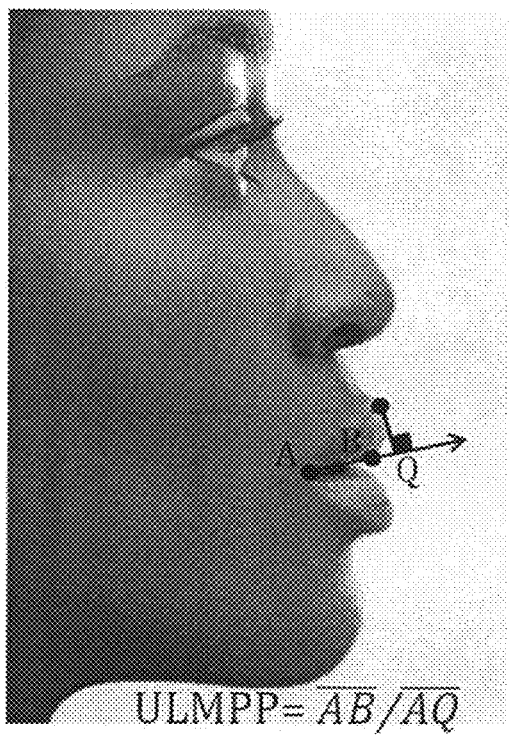
FIG. 3F shows facial descriptor measurement Upper Lip Maxima Point Proportion (ULMPP)
Figure 3G:
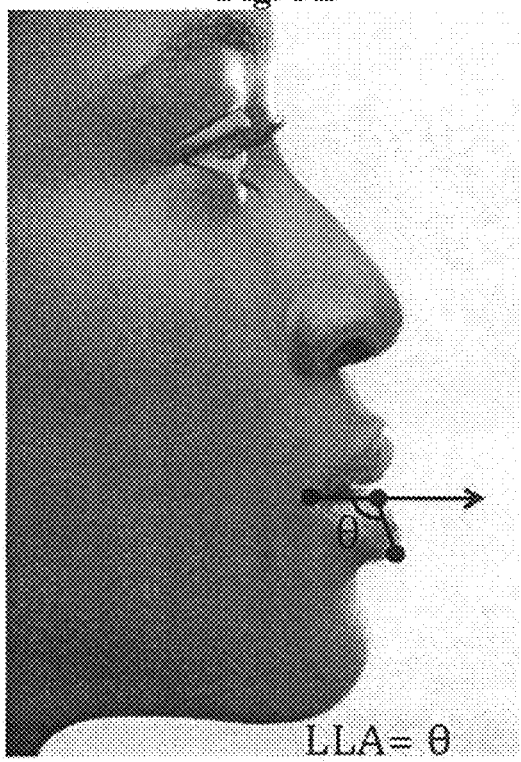
FIG. 3G shows facial descriptor measurement Lower Lip Angle (LLA)
Figure 3H:
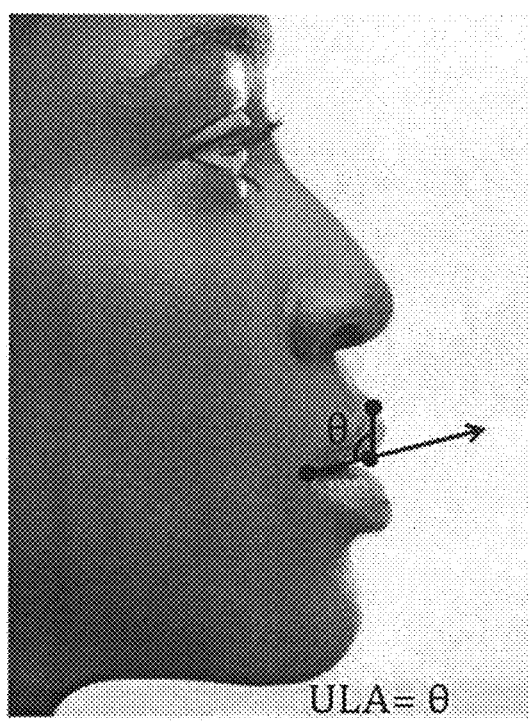
FIG. 3H shows facial descriptor measurement Upper Lip Angle (ULA)
Figure 3L:
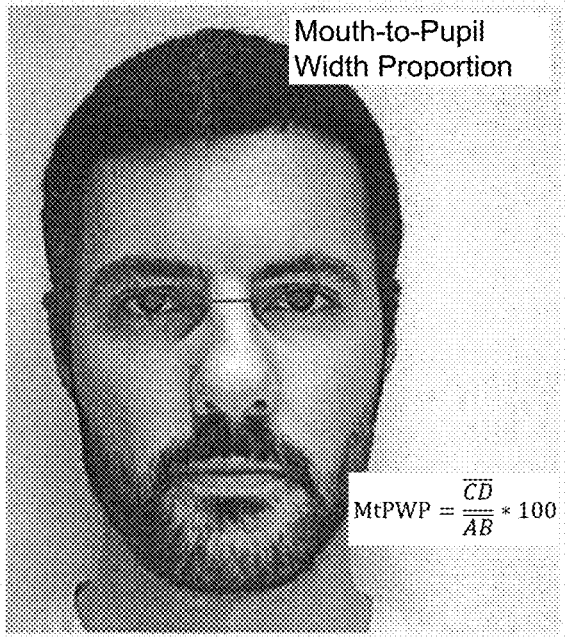
FIG. 3L shows facial descriptor measurement Mouth-to-Pupil Width Proportion (MtPWP)
Figure 3M:
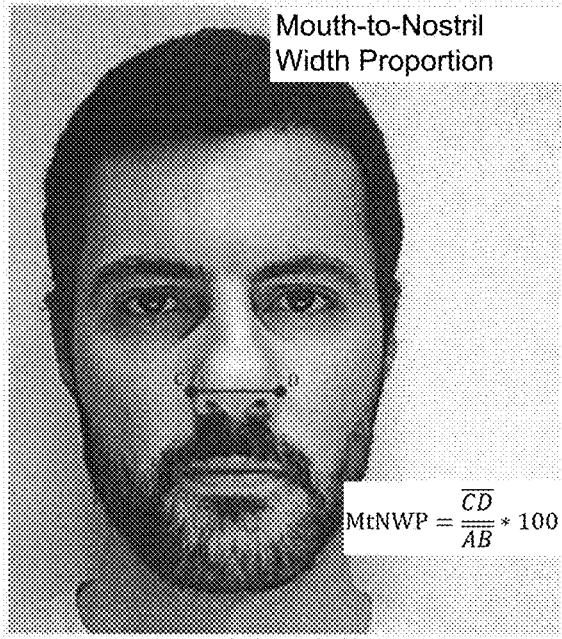
FIG. 3M shows facial descriptor measurement Mouth-to-Nostril Width Proportion (MtNWP)
Figure 3N:
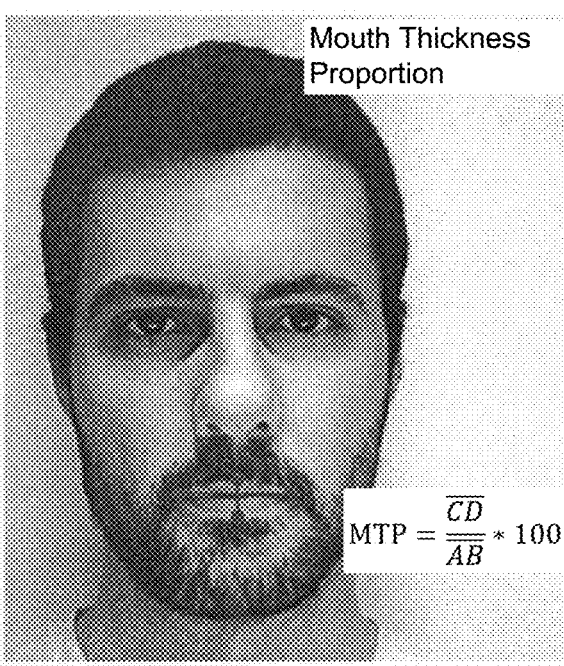
FIG. 3N shows facial descriptor measurement Mouth Thickness Proportion (MTP)
Figure 3O:
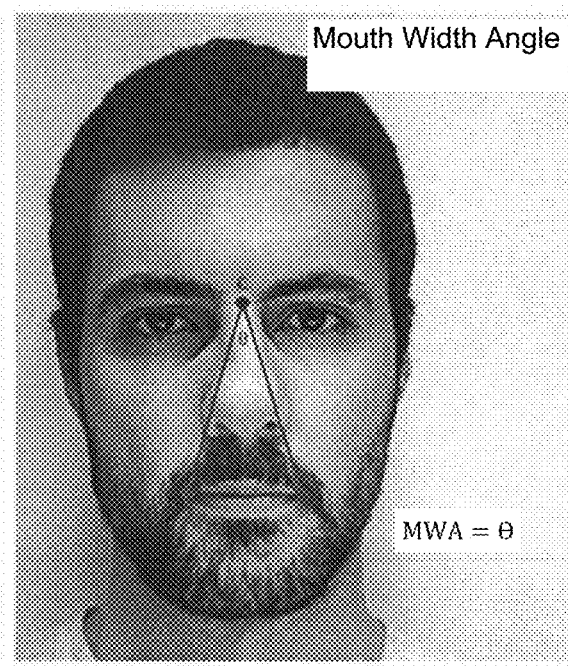
FIG. 3O shows facial descriptor measurement Mouth Width Angle (MWA)
Figure 3P:
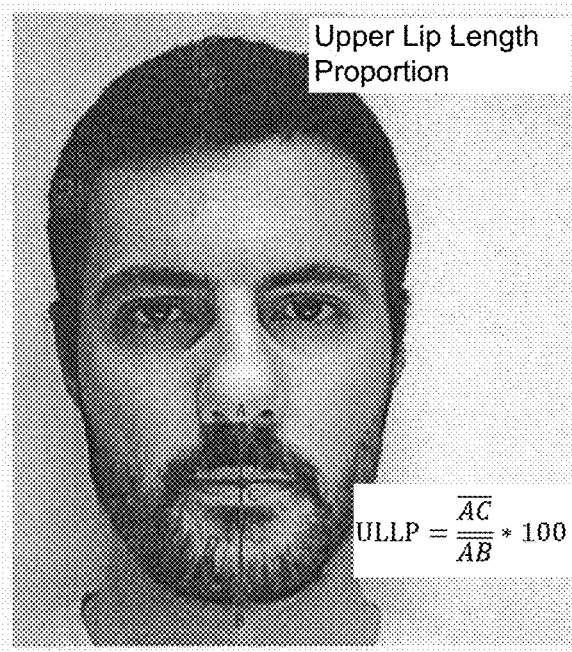
FIG. 3P shows facial descriptor measurement Upper Lip Length Proportion (ULLP)
Figure 3Q:
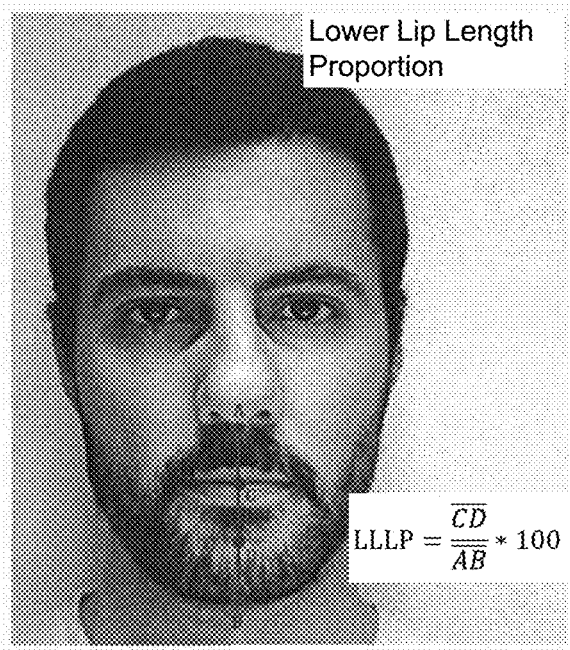
FIG. 3Q shows facial descriptor measurement Lower Lip Length Proportion (LLLP)
Figure 3R:
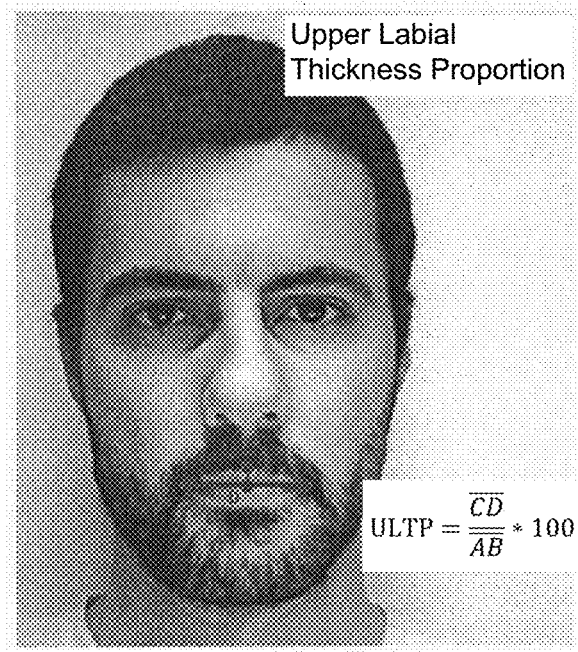
FIG. 3R shows facial descriptor measurement Upper Labial Thickness Proportion (ULTP)
Figure 3S:
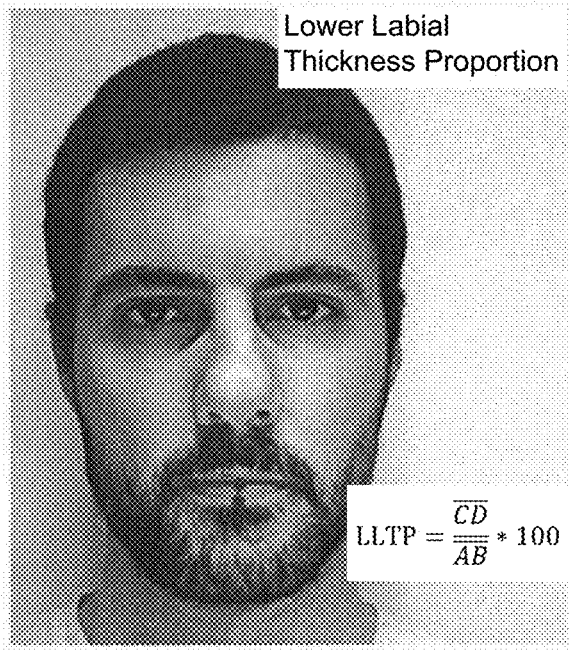
FIG. 3S shows facial descriptor measurement Lower Labial Thickness Proportion (LLTP)
Figure 4A:
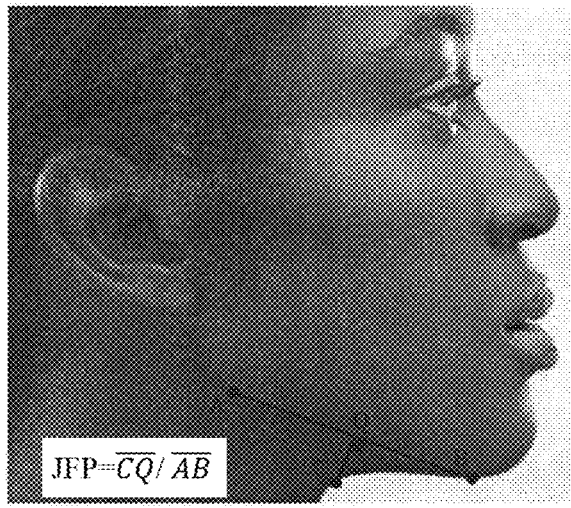
FIG. 4A shows facial descriptor measurement Jowl Fullness Proportion (JFP)
Figure 4B:
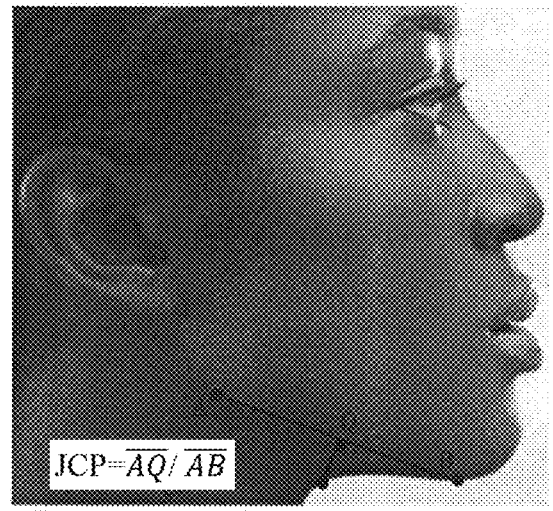
FIG. 4B shows facial descriptor measurement Jowl Connective Proportion (JCP)
Figure 4C:
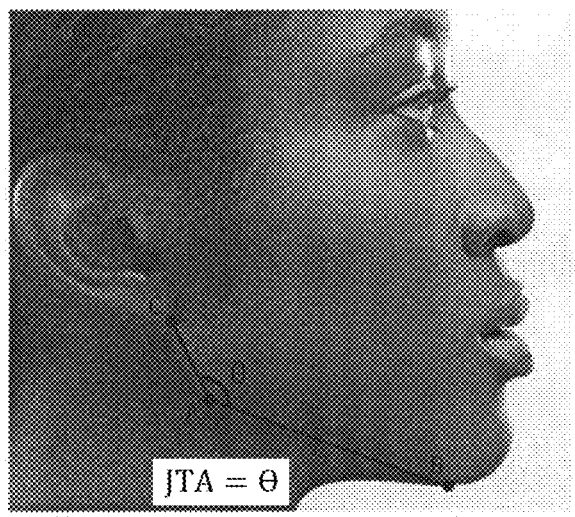
FIG. 4C shows facial descriptor measurement Jowl Thickness Angle (JTA)
Figure 4D:
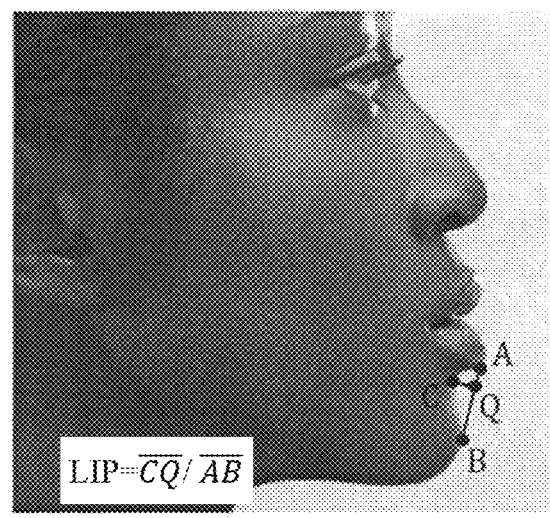
FIG. 4D shows facial descriptor measurement Jowl Set Angle (JSA)
Figure 4E:
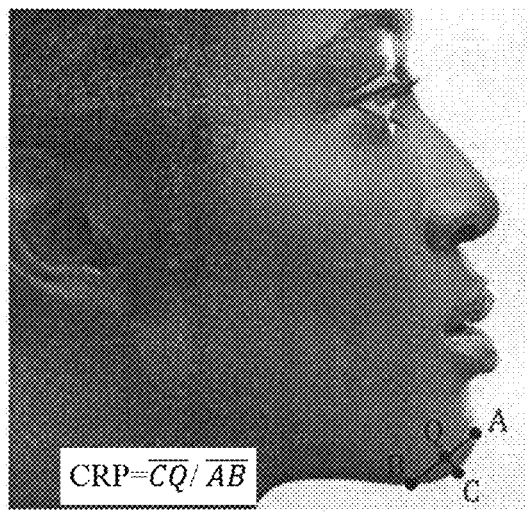
FIG. 4E shows facial descriptor measurement Lambiomental Inflexion Proportion (LIP)
Figure 4F:
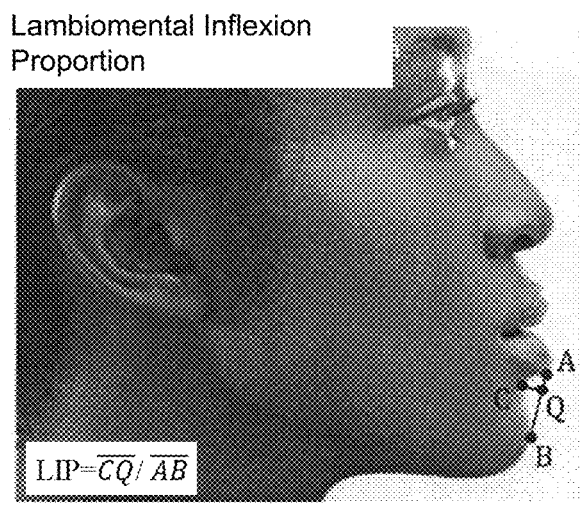
FIG. 4F shows facial descriptor measurement Chin Roundness Proportion (CRP)
Figure 4G:
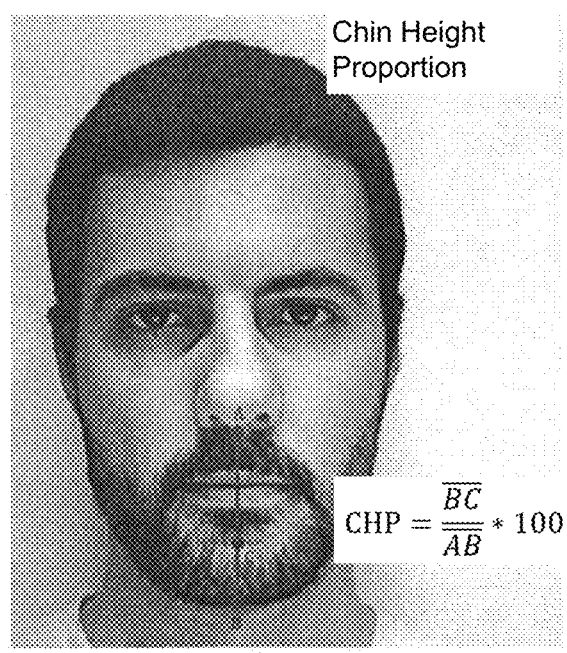
FIG. 4G shows facial descriptor measurement Chin Height Proportion (CHP)
Figure 4H:
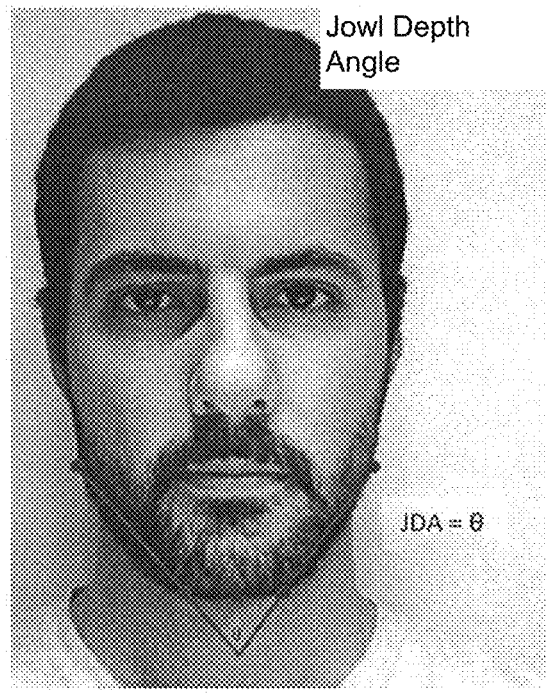
FIG. 4H shows facial descriptor measurement Jowl Depth Angle (JDA)
Figure 5A:
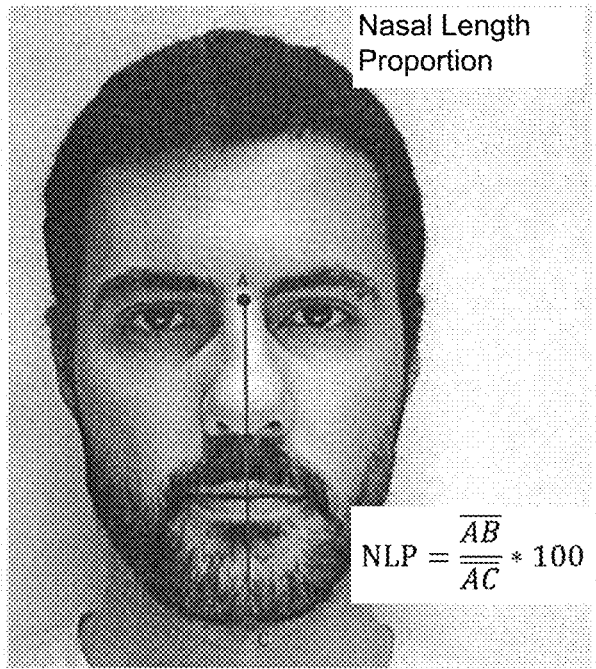
FIG. 5A shows facial descriptor measurement Nasal Length Proportion (NLP)
Figure 5B:
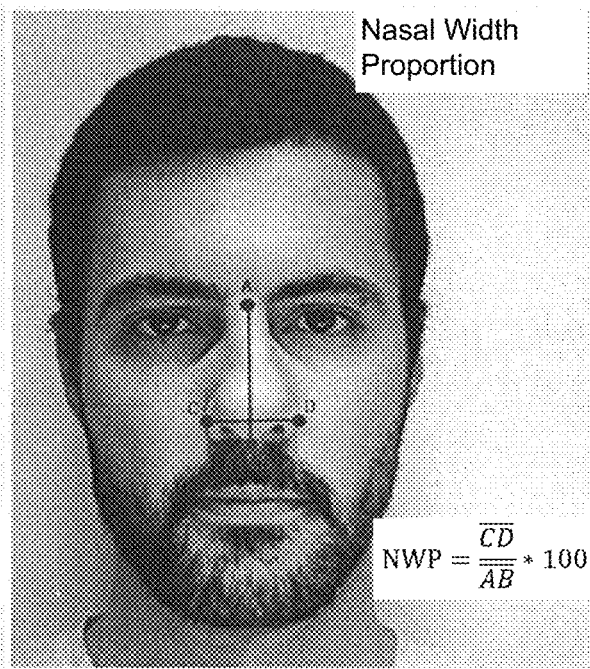
FIG. 5B shows facial descriptor measurement Nasal Width Proportion (NWP)
Figure 5C:
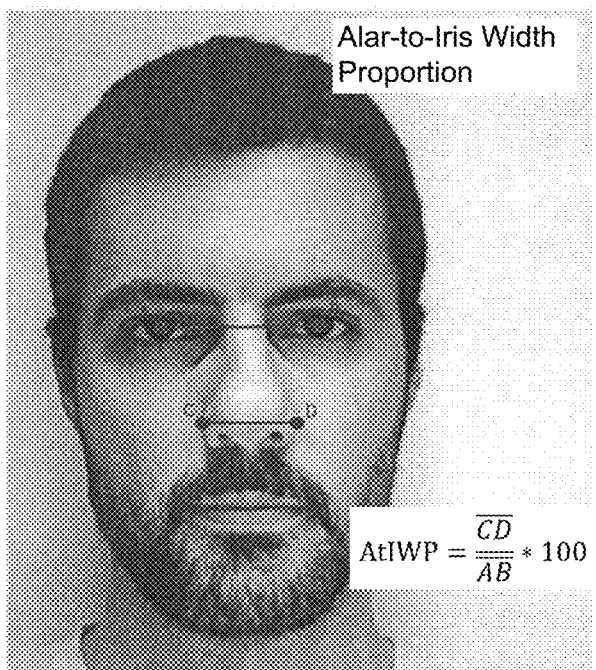
FIG. 5C shows facial descriptor measurement Alar-to-Iris Width Proportion (AtIWP)
Figure 5D:
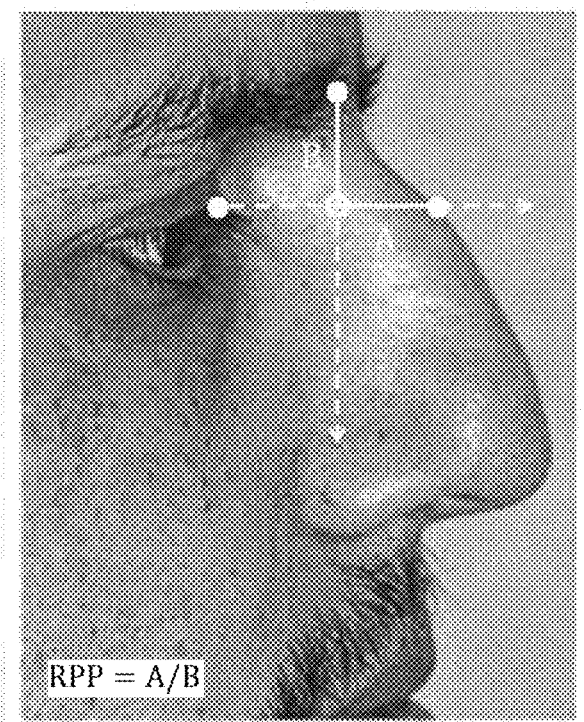
FIG. 5D shows facial descriptor measurement Radix Protrusion Proportion (RPP)
Figure 5E:
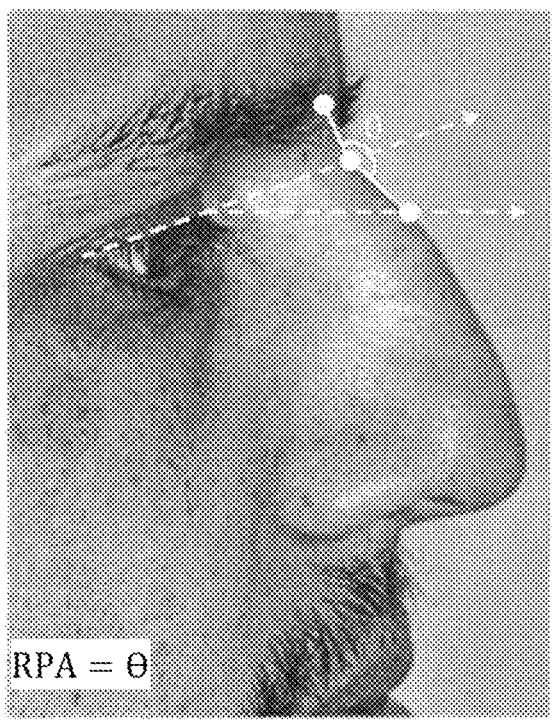
FIG. 5E shows facial descriptor measurement Radix Protrusion Angle (RPA)
Figure 5F:
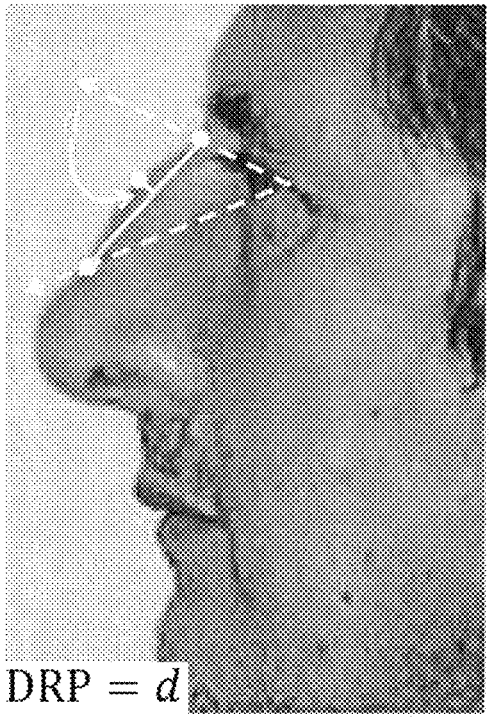
FIG. 5F shows facial descriptor measurement Dorsum Rounding Proportion (DRP)
Figure 5G:
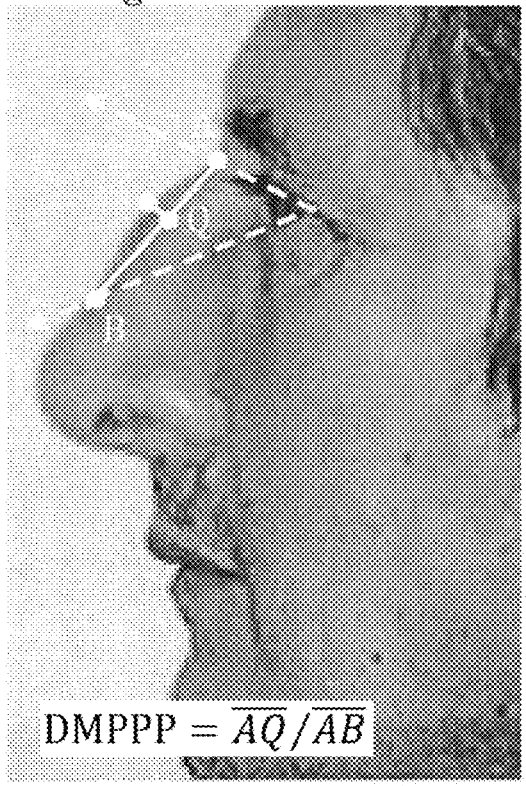
FIG. 5G shows facial descriptor measurement Dorsum Maximal Protuberance Point Proportion (DMPPP)
Figure 5H:
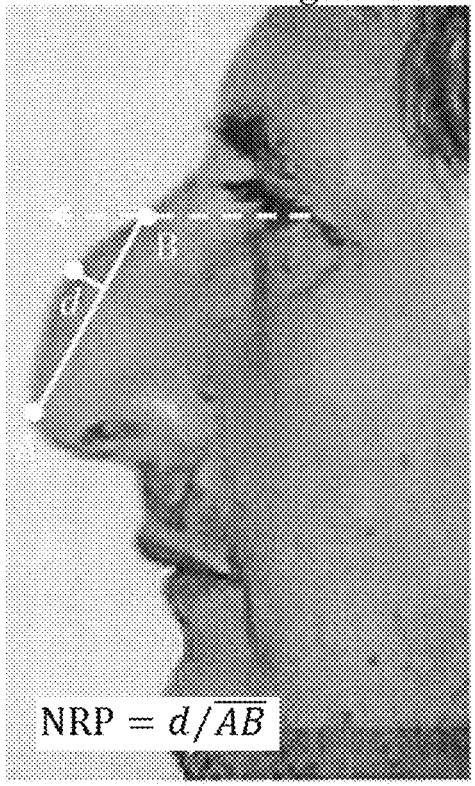
FIG. 5H shows facial descriptor measurement Nose Rounding Proportion (NRP)
Figure 5I:
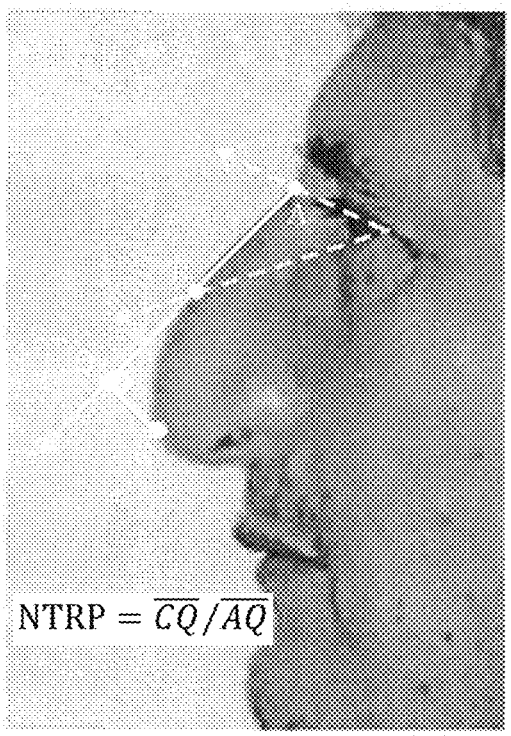
FIG. 5I shows facial descriptor measurement Nostril Tip Rounding Proportion (NTRP)
Figure 5J:
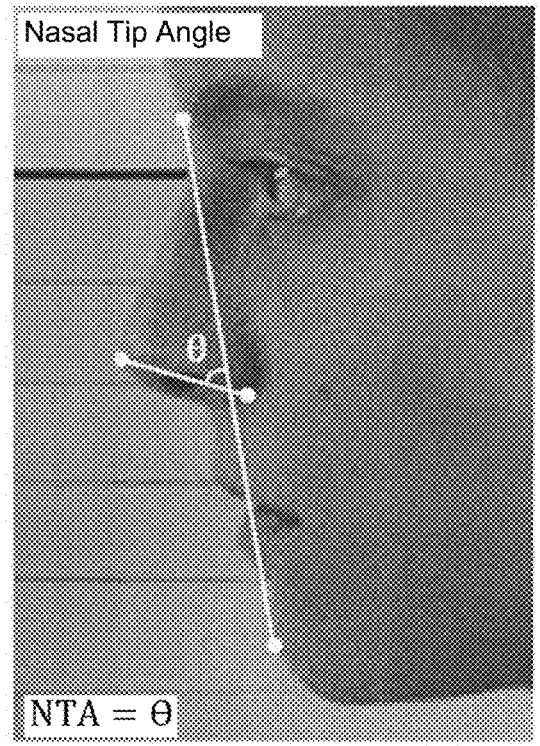
FIG. 5J shows facial descriptor measurement Nasal Tip Angle (NTA)
Figure 5K:
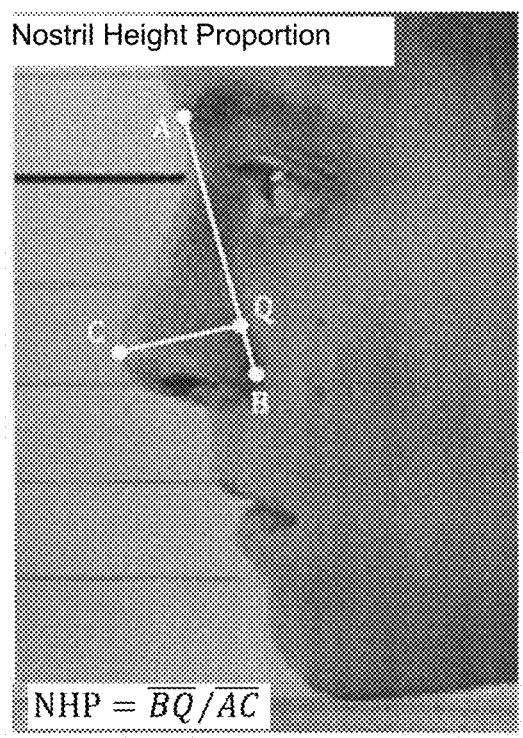
FIG. 5K shows facial descriptor measurement Nostril Height Proportion (NHP)
Figure 5L:
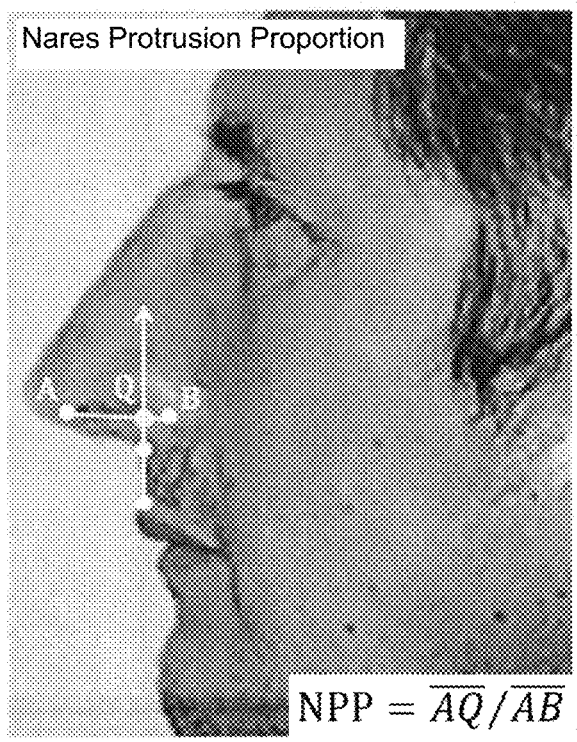
FIG. 5L shows facial descriptor measurement Nares Protrusion Proportion (NaPP)
Figure 5M:
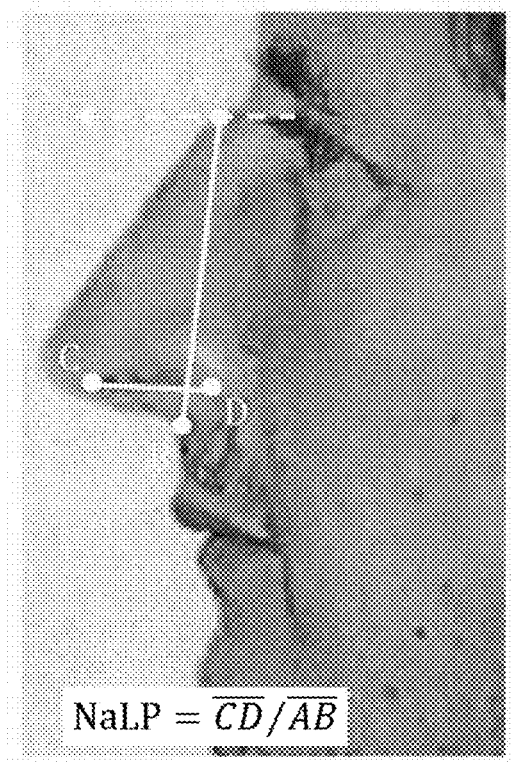
FIG. 5M shows facial descriptor measurement Nares Length Proportion (NaLP)
Figure 5N:
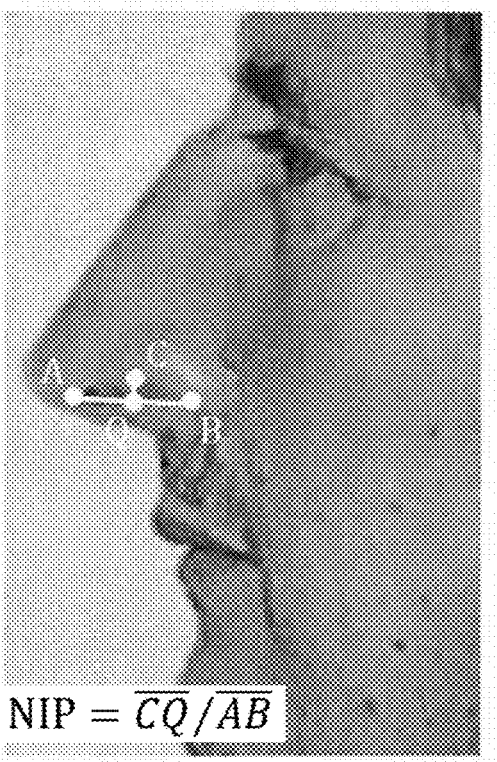
FIG. 5N shows facial descriptor measurement Nares Inflexion Proportion (NIP)
Figure 5O:
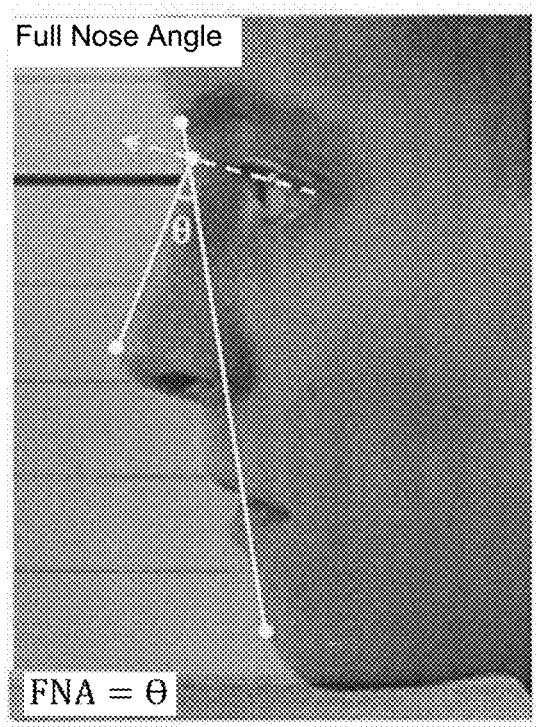
FIG. 5O shows facial descriptor measurement Full Nose Angle (FNA)
Figure 5P:
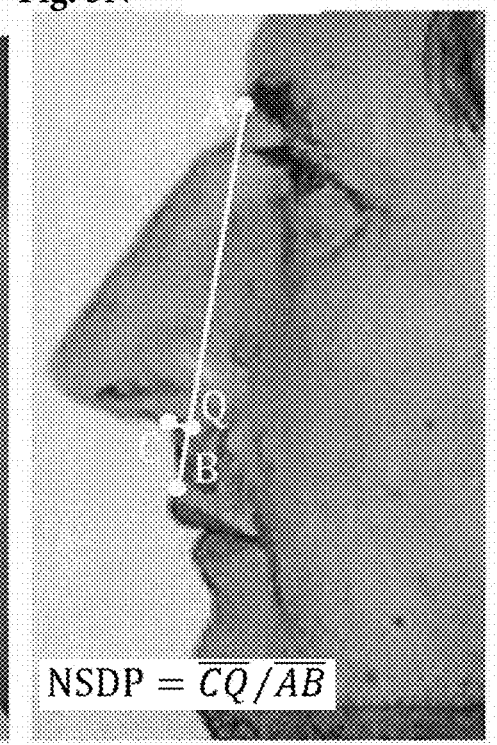
FIG. 5P shows facial descriptor measurement Nasal Spine Deviation Proportion (NSDP)
Figure 5Q:
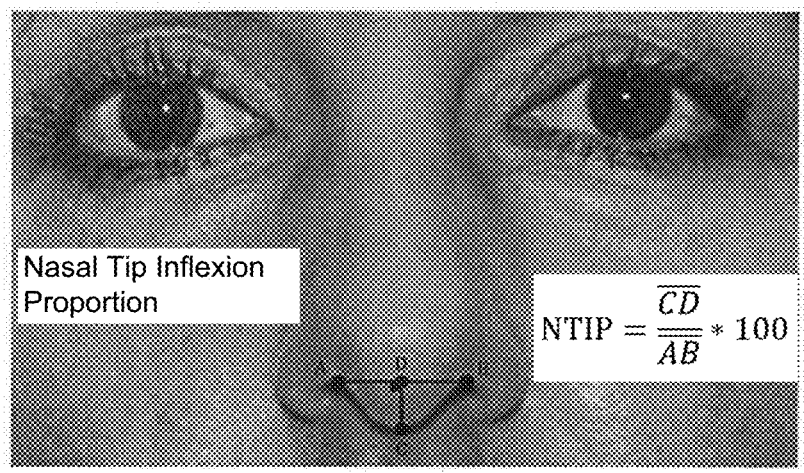
FIG. 5Q shows facial descriptor measurement Nasal Tip Inflection Proportion (NTIP)
Figure 5R:
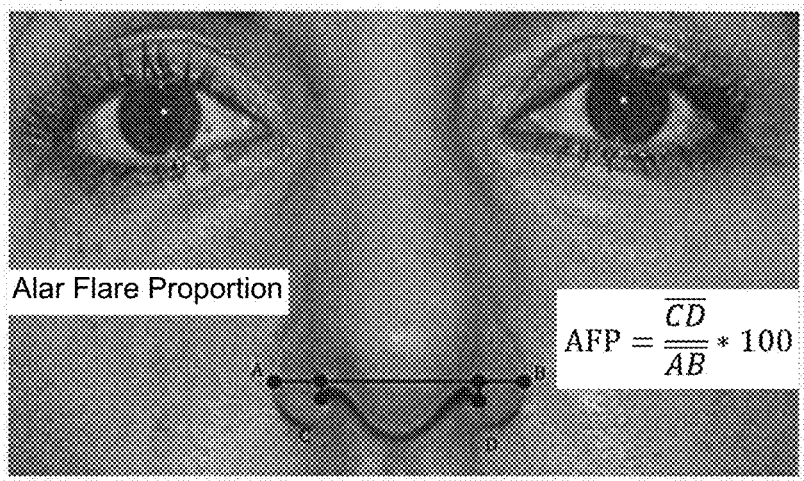
FIG. 5R shows facial descriptor measurement Alar Flare Proportion (AFP)
Figure 5S:
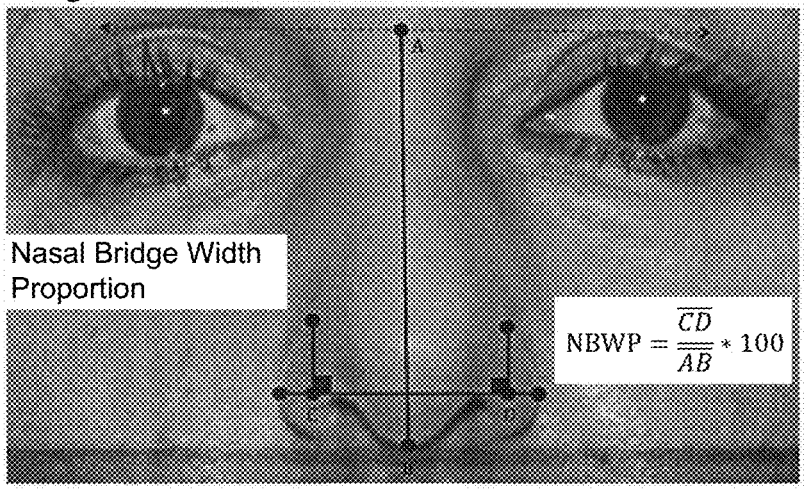
FIG. 5S shows facial descriptor measurement Nasal Bridge Width Proportion (NBWP)
Figure 5T:
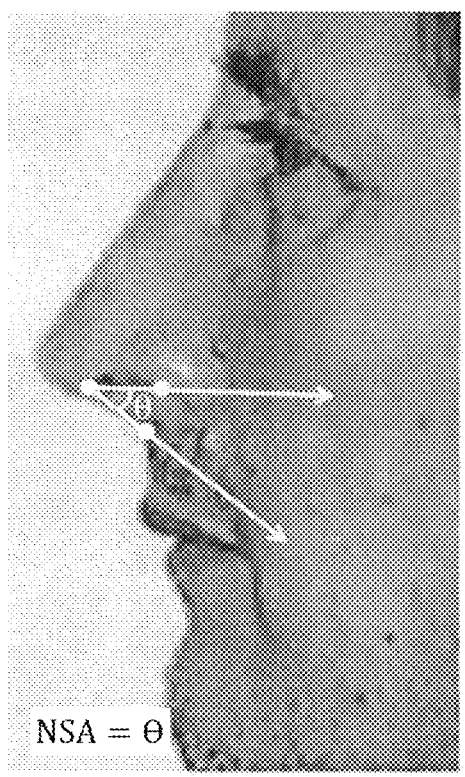
FIG. 5T shows facial descriptor measurement Nasal Spine Angle (NSA)
Figure 6A:
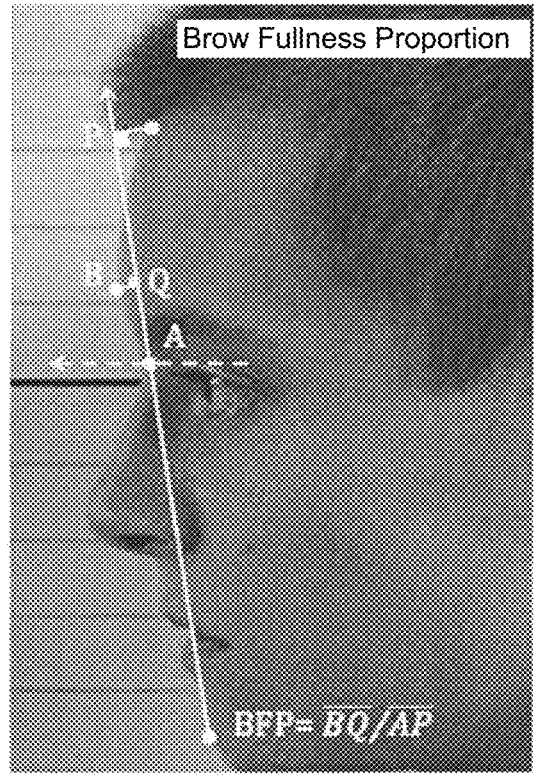
FIG. 6A shows facial descriptor measurement Brow Fullness Proportion (BFP)
Figure 6B:
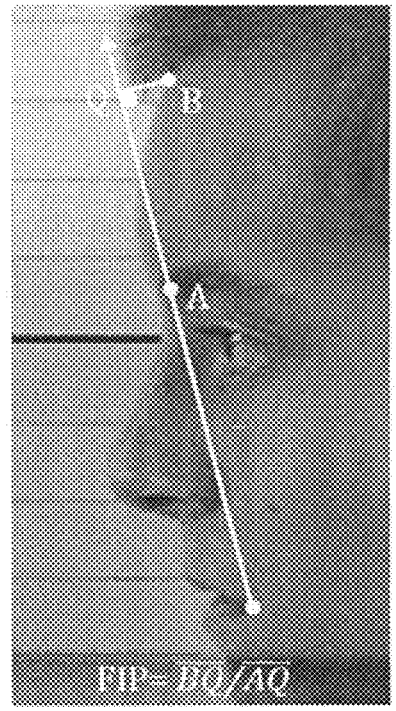
FIG. 6B shows facial descriptor measurement Forehead Inflexion Proportion (FIP)
Figure 6C:
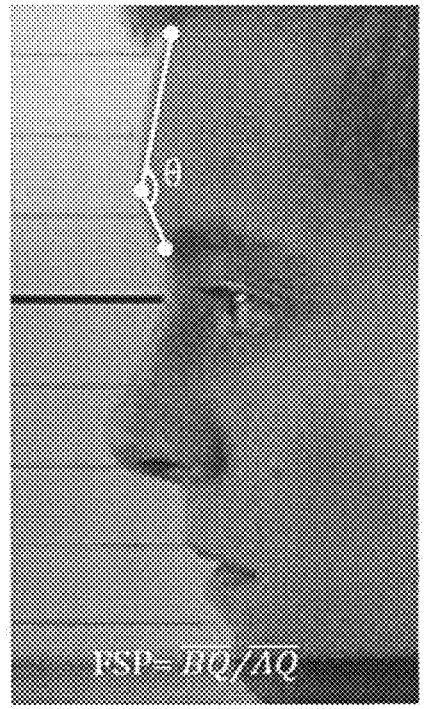
FIG. 6C shows facial descriptor measurement Forehead Slope Proportion (FSP)
Figure 6D:
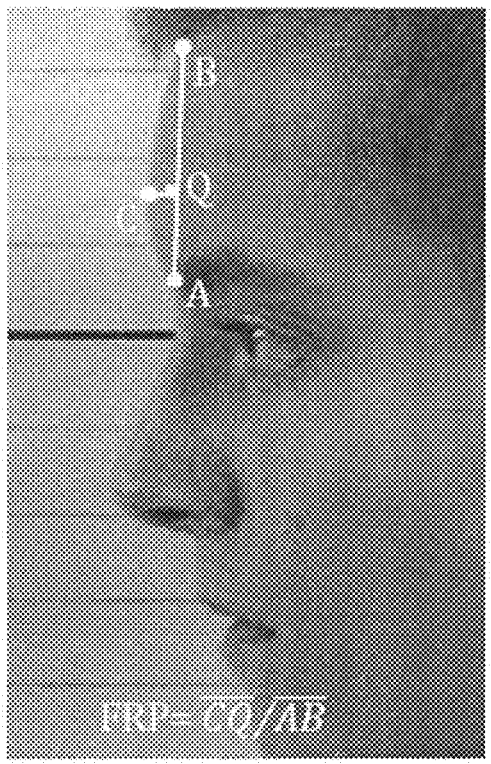
FIG. 6D shows facial descriptor measurement Forehead Roundness Proportion (FRP)
Figure 6E:
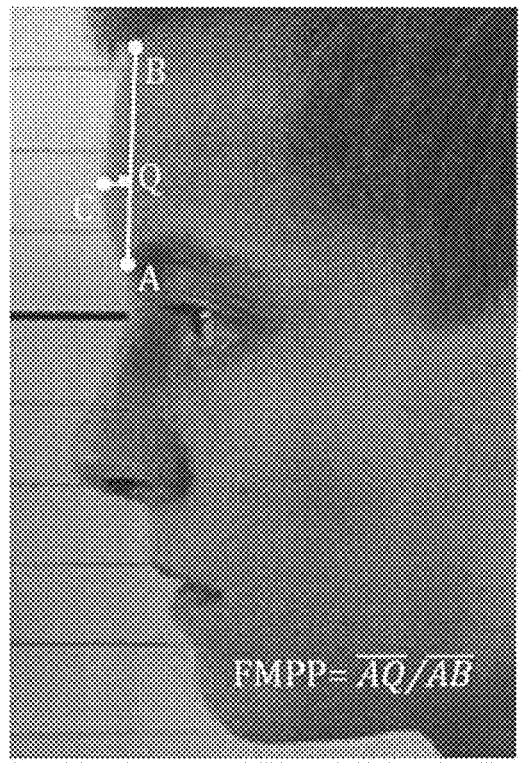
FIG. 6E shows facial descriptor measurement Forehead Maxima Point Proportion (FMPP)
Figure 6F:
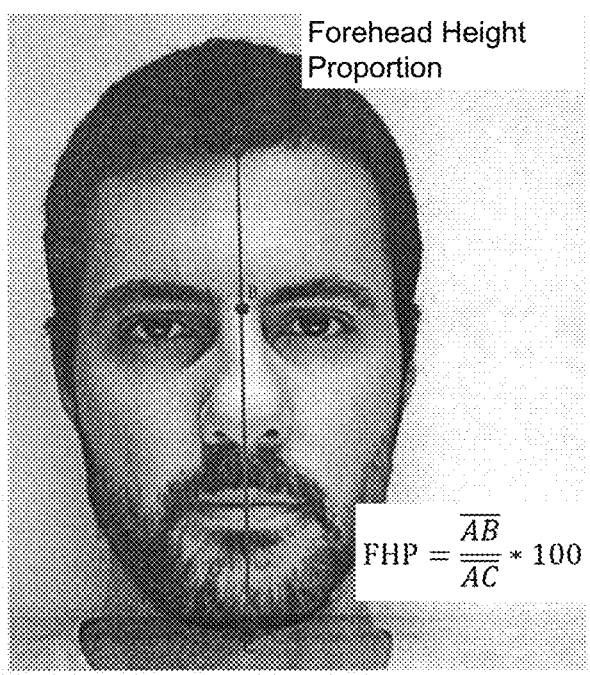
FIG. 6F shows facial descriptor measurement Forehead Height Proportion (FHP)
Figure 6G:
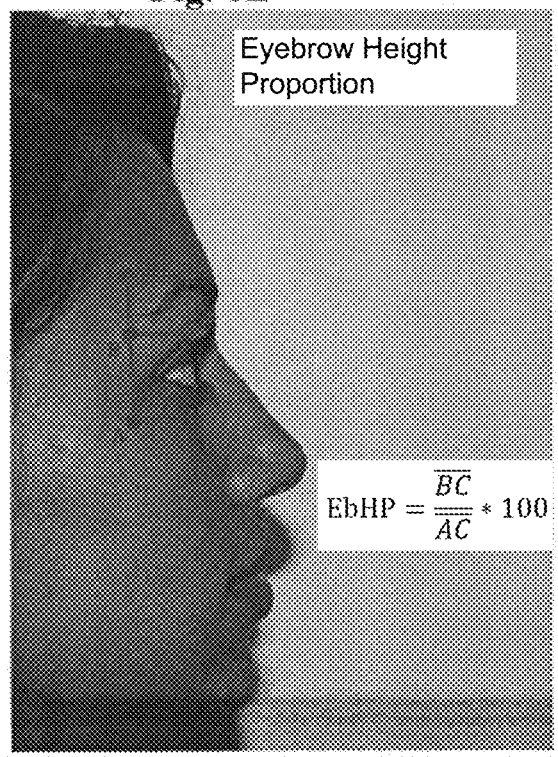
FIG. 6G shows facial descriptor measurement Eyebrow Height Proportion (EHP)
Figure 6H:
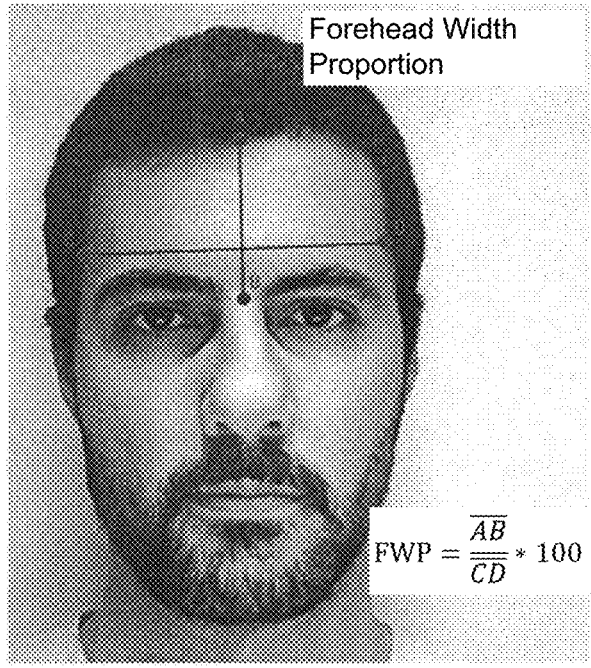
FIG. 6H shows facial descriptor measurement Forehead Width Proportion (FWP)
Figure 6I:
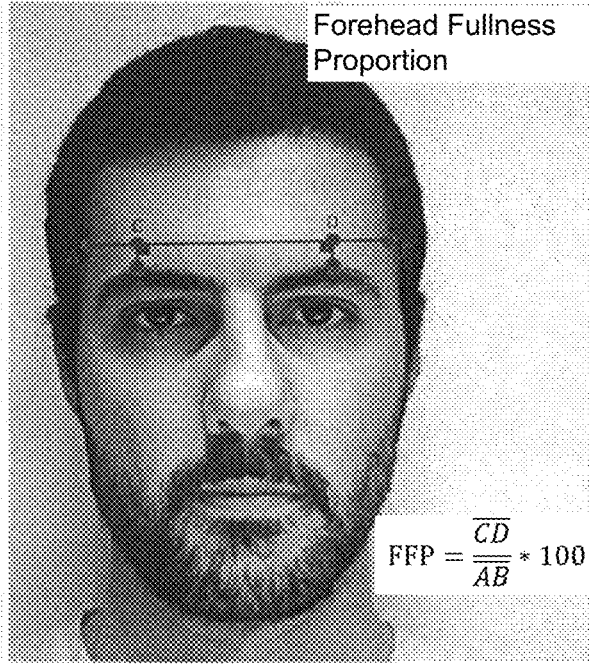
FIG. 6I shows facial descriptor measurement Forehead Fullness Proportion (FFP)
Figure 6J:
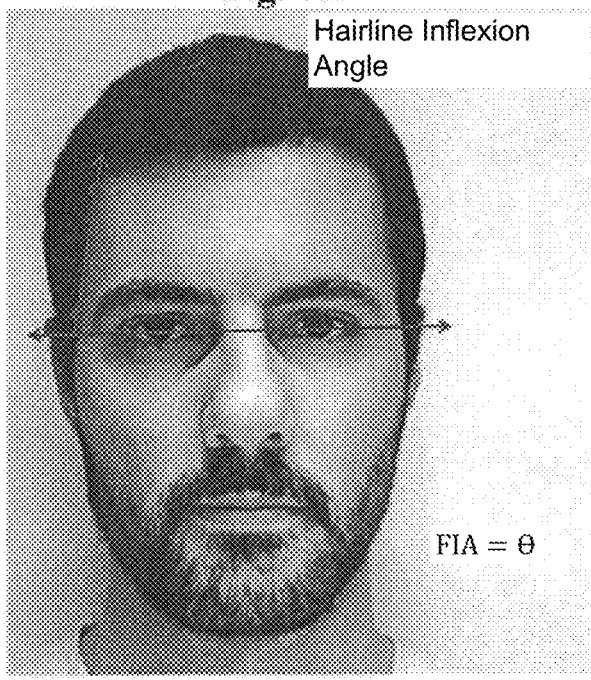
FIG. 6J shows facial descriptor measurement Hairline Inflection Angle (HIP)
Figure 7A:
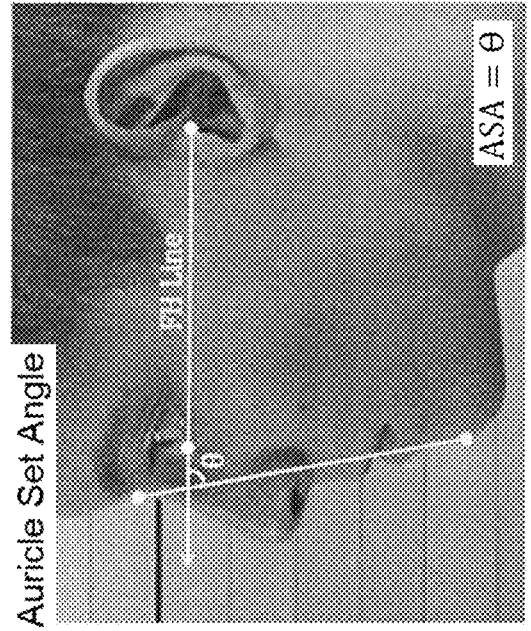
FIG. 7A shows facial descriptor measurement Auricle Inclination Angle (AIA)
Figure 7B:
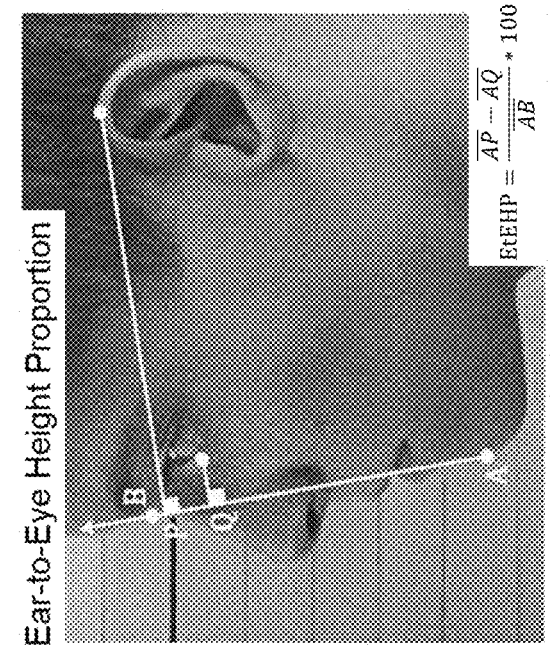
FIG. 7B shows facial descriptor measurement Auricle Set Angle (ASA)
Figure 7C:
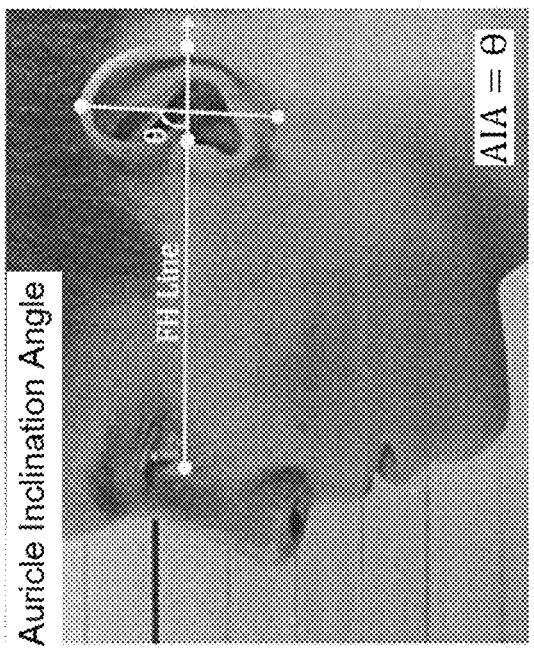
FIG. 7C shows facial descriptor measurement Ear-to-Eyebrow Height Proportion (EtEHP)
Figure 7D:
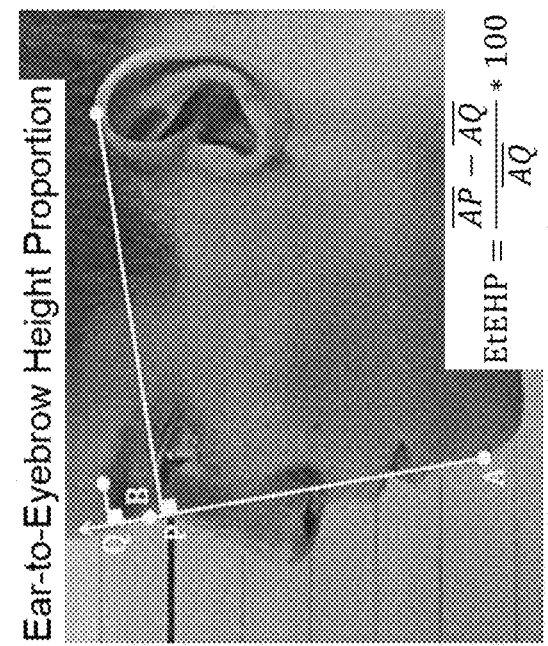
FIG. 7D shows facial descriptor measurement Ear-to-Eye Height Proportion (EtEHP2)
Figure 7E:
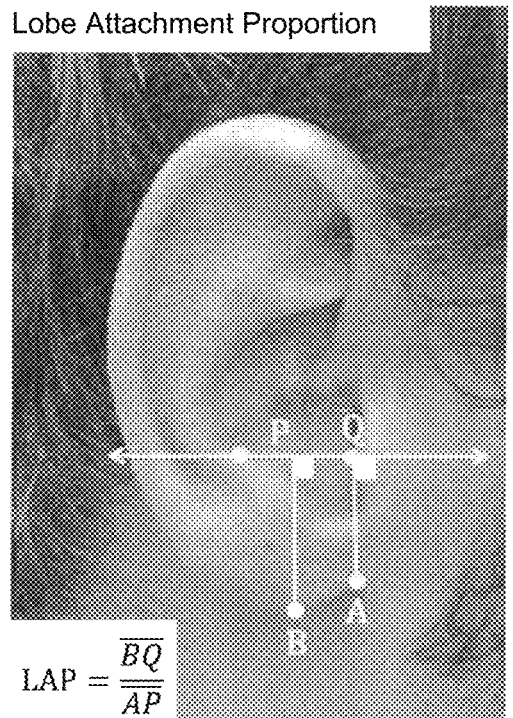
FIG. 7E shows facial descriptor measurement Lobe Attachment Proportion (LAP)
Figure 7F:
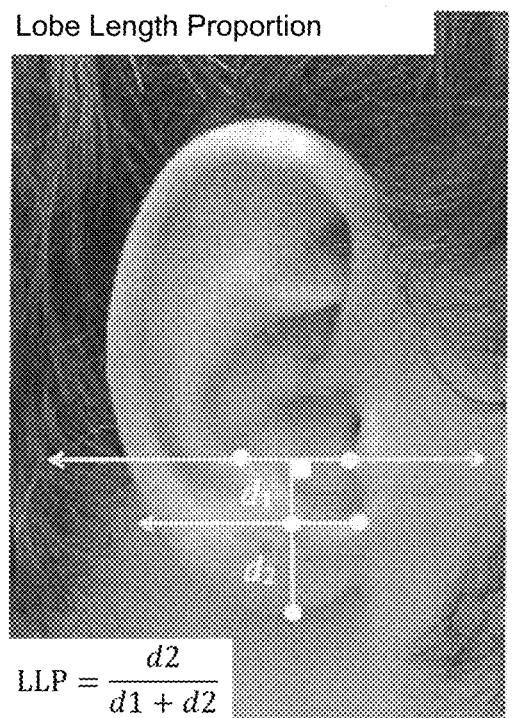
FIG. 7F shows facial descriptor measurement Lobe Length Proportion (LLP)
Figure 7G:
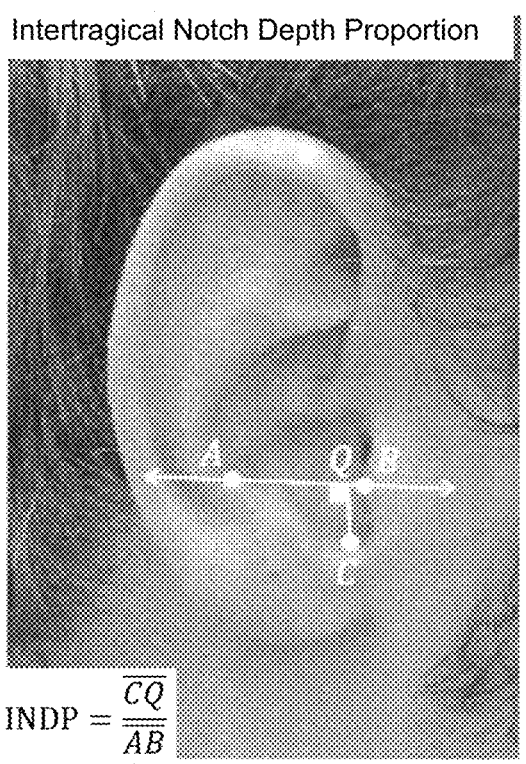
FIG. 7G shows facial descriptor measurement Intertragical Notch Depth Proportion (INDP)
Figure 7H:
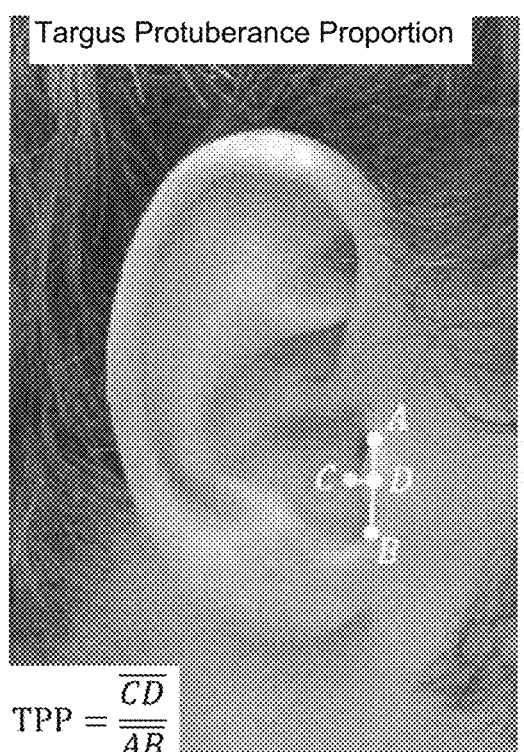
FIG. 7H shows facial descriptor measurement Tragus Protuberance Proportion (TPP)
Figure 7I:
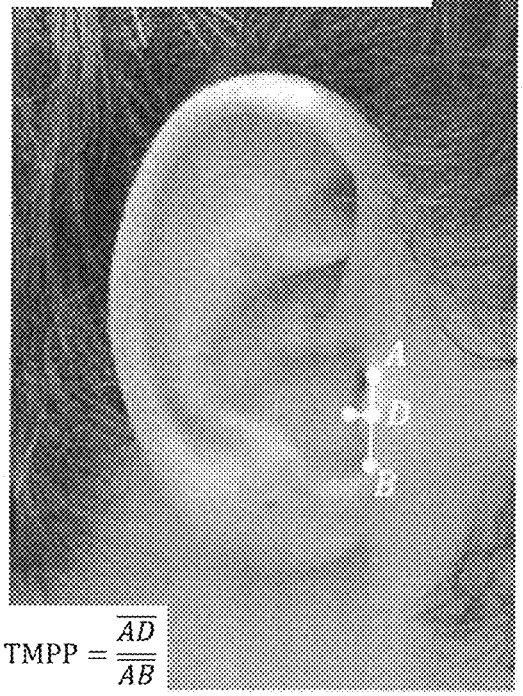
FIG. 7I shows facial descriptor measurement Tragus Mid-Point Proportion (TMPP)
Figure 7J:
FIG. 7J shows facial descriptor measurement Antitragus Protuberance Proportion (APP)
Figure 7K:
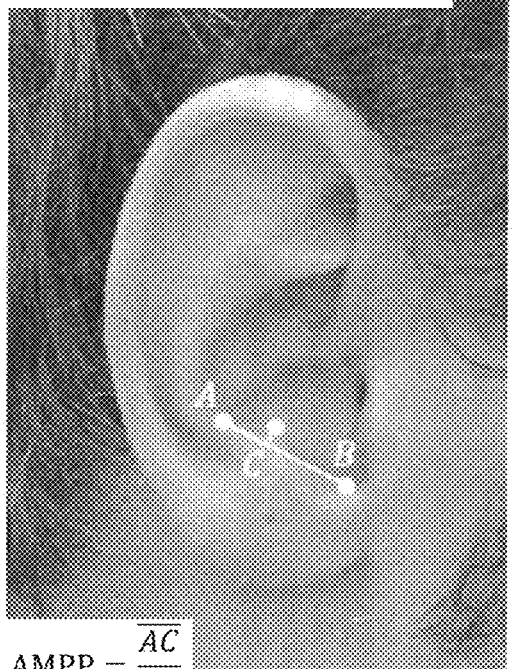
FIG. 7K shows facial descriptor measurement Antitragus Mid-Point Proportion (AMPP)
Figure 7L:
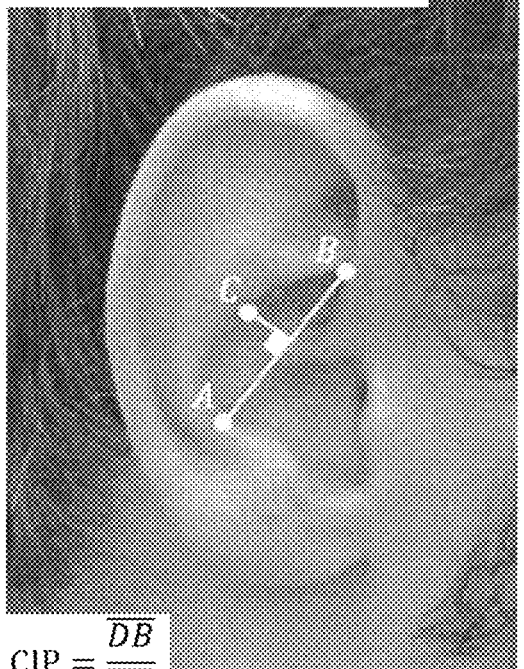
FIG. 7L shows facial descriptor measurement Concha Inflexion Proportion (CIP)
Figure 7M:
FIG. 7M shows facial descriptor measurement Upper Concha Separation Angle (UCSA)
Figure 7N:
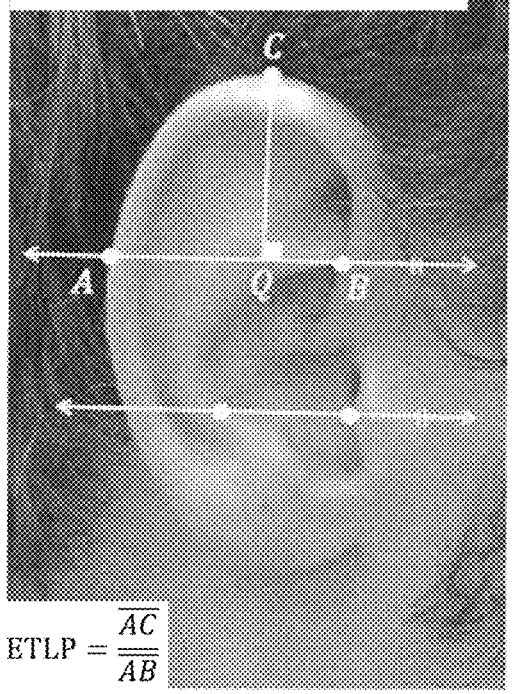
FIG. 7N shows facial descriptor measurement Ear Tip Length Proportion (ETLP)
Figure 7O:
FIG. 7O shows facial descriptor measurement Upper Concha Separation Angle (UCSA)
Figure 7P:
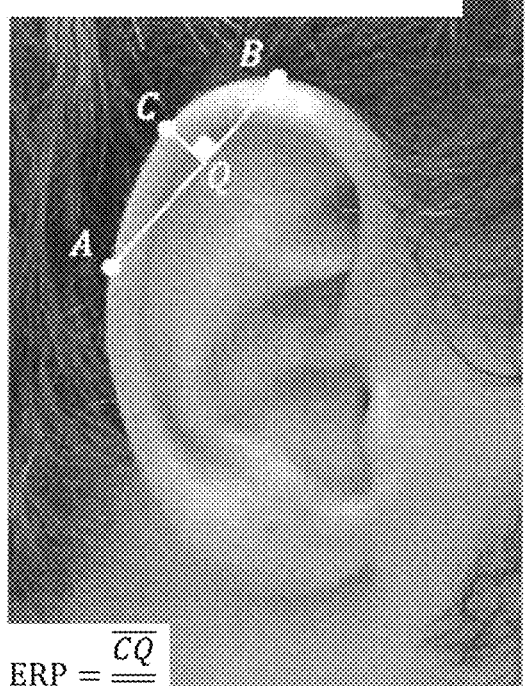
FIG. 7P shows facial descriptor measurement Ear Roundness Proportion (ERP)
Figure 7Q:
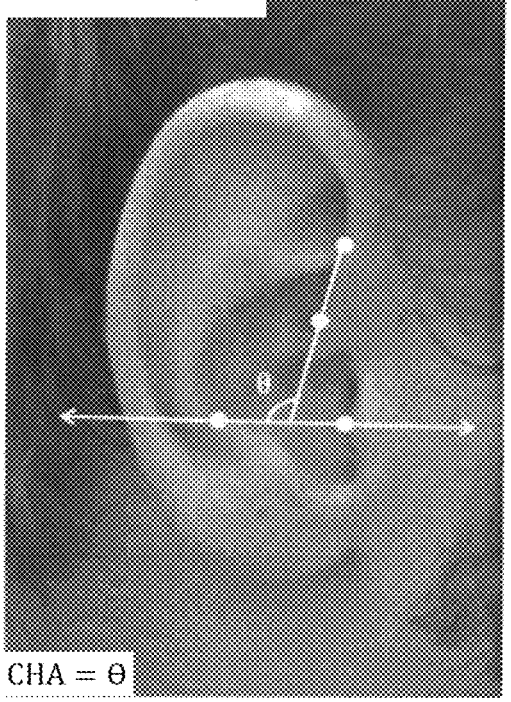
FIG. 7Q shows facial descriptor measurement Crus Helix Angle (CHA)
Figure 7R:
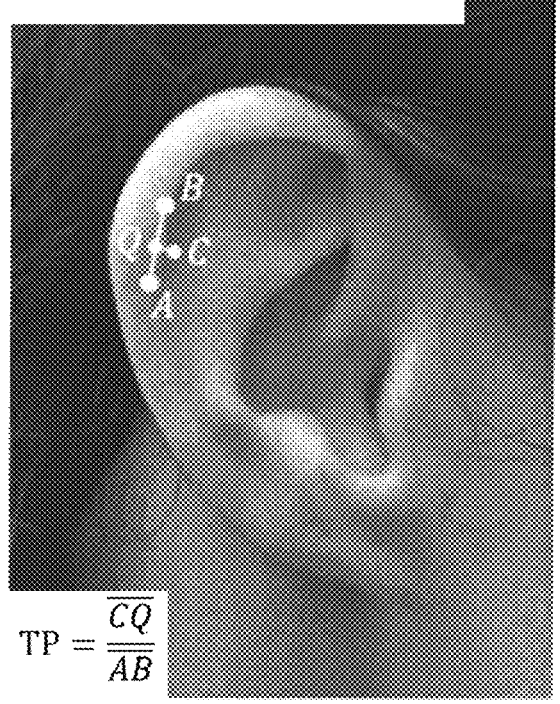
FIG. 7R shows facial descriptor measurement Tubercle Proportion (TP)
Figure 7S:
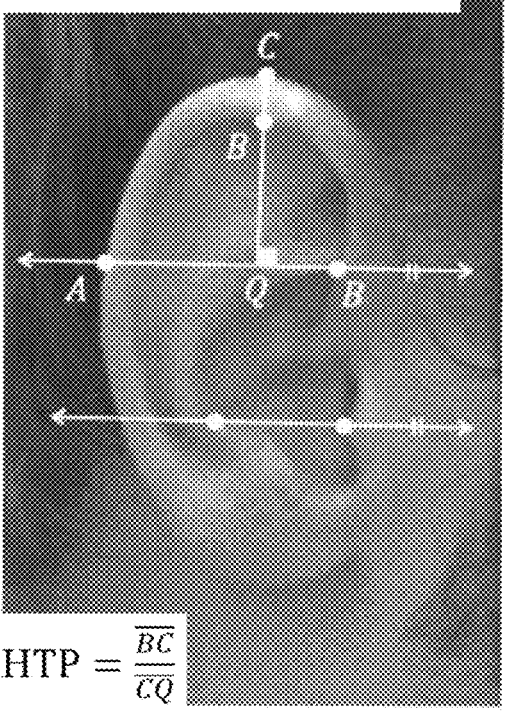
FIG. 7S shows facial descriptor measurement Helix Thickness Proportion (HTP)
Figure 7T:
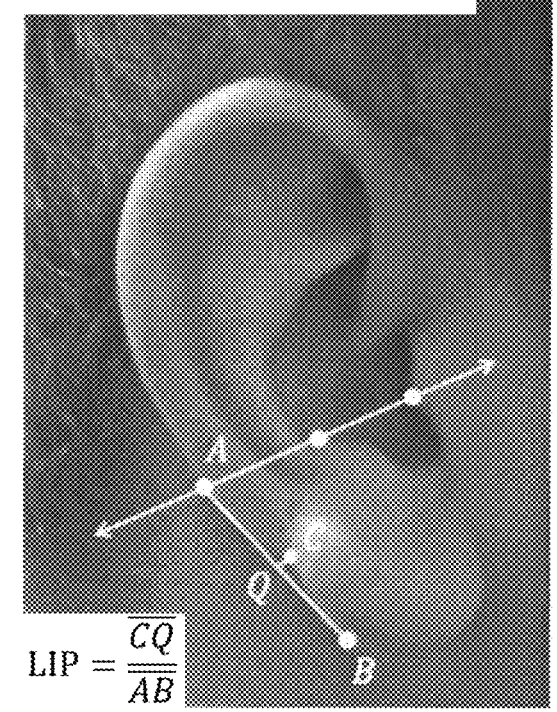
FIG. 7T shows facial descriptor measurement Lobule Inflexion Proportion (LIP)

For example, the close relationship between the functional development of the brain and structures of the face has been clearly documented for a number of developmental disorders. Among the most well known of these disorders is Fetal Alcohol Syndrome (FAS), which is the direct result of exposure of the fetus to alcohol during pregnancy. FAS has been shown to result in both an easily identifiable phenotype (i.e., collection of minor facial abnormalities such as small eyes, smooth philtrum, thin upper lip) and developmental damage to the central nervous system that is often permanent (e.g., speech delays, learning disabilities, poor reasoning skills, poor memory, attention deficit disorders, and low IQ). FIGS. 1A through 7T show a set of exemplary human facial descriptor measurements that can be used to identify the phenotype associated with FAS. For example, FIGS. 1A through 1V show various facial descriptor measurements related to the eye, while FIGS. 3A through 3S show various facial descriptor measurements related to the mouth.

By way of further example, Down Syndrome is another prenatal developmental disorder causing mental/social delays that yields an easily identifiable phenotype including a host of distinctive facial features such as small chin and/or mouth, round face, and rounded almond-shaped eyes. Recent studies have even been able to identify measurable trends in facial features that distinguish between children diagnosed with Autism Spectrum Disorders (ASD) and those of typical development. The facial descriptor measurements shown in FIGS. 1A through 7T may also be used to identify the phenotype associated with Down syndrome. However, as with FAS described above, this set of facial descriptor measurements is merely exemplary, and may be reduced or augmented for predicting Down syndrome or other human functional development disorders within the spirit and scope of the present disclosure.

The set of human facial descriptor measurements shown in FIGS. 1A through 7T are merely exemplary, and the person of ordinary skill will recognize that fewer than the entire set may be used to predict FAS or Down Syndrome. Furthermore, this set of human facial descriptor measurements is not exhaustive and others may be incorporated. In some embodiments, two, three, or more of the facial descriptor measurements are used in combination to predict a trait, characteristic, or syndrome such as FAS or Down Syndrome. Moreover, while examples are shown primarily with facial measurements, other head measurements and physical measurements may be used alone, without facial measurements, or in combination with facial measurements. For example, measurements of the head or crown may be used in conjunction with facial features to predict syndromes or traits.

Given these established relationships between human facial structures and cognitive development, any of the computationally inexpensive, two-dimensional, locally-normalized facial evaluation systems described provides a non-invasive analysis tool for use in multiple clinical applications. For example, embodiments of the facial analysis methods and systems disclosed herein will diagnose children with specific cognitive development disorders based on the degree of divergence between their facial features and those of the overall typical population with respect to the phenotype for a disorder. Such a diagnosis tool is faster and less invasive than the standard cognitive testing procedures currently employed, and may allow for earlier diagnosis and interventions. More computationally expensive embodiments or variations may also be used for diagnosis.

More generally, embodiments of the facial analysis methods and systems disclosed herein also can be used for predicting or inferring how an individual is innately programmed to perceive, synthesize, and then respond to different types of stimuli. Facial analysis can be applied to predict not only how the cognitive framework of an individual will interact with and be shaped by their environment, but also how it will interact with the cognitive frameworks of other human beings, as described in more detail below.

Each individual of a species (including humans) experiences the world differently due to the unique way in which the individual perceives the same set of stimuli. For example, pain is a stimulus whose perception varies widely among individuals. Although cultural and social expectations arguably influence how readily an individual admits to discomfort, it is clear that some people are more sensitive to pain than others, due in large part to greater capability to block out and cope with pain. Although some of this variability is due to the structure and number of neurons in the peripheral nervous system that register a pain input, how easily this input is brought to the forefront of a person's consciousness also plays a major role in overall pain sensitivity. As such, the cognitive structures for overcoming and dealing with such unpleasant sensations play a major part in determining an individual's resistance to pain. As a result, facial analysis methods can be applied to develop a useful model or tool that objectively predicts an individual's perception of the severity of pain.

Compared to the subjective pain assessments methods currently in use (e.g., scale of 1 to 10), such a model would benefit the medical community in many different ways. In addition simply helping doctors more efficiently and correctly assess the severity of an injury on their initial diagnosis, such a tool could also be used to more fairly assign priority to patients in waiting room settings. An objective pain assessment model also would be useful in preventative medicine and recovery care, particularly in the case of patients with high pain thresholds, who in underscoring the severity of their condition might otherwise keep doctors from readily picking up on health concerns in its earlier and more treatable stages. In addition, such a model could also be used in helping doctors to more rigorously qualify the strength and quantity of pain medications assigned to patients after a procedure. For example, if information from such an objective model indicates that a patient has a lower-than-average pain tolerance, a physician may decide to prescribe a higher strength pain medication to ensure that the patient will be able to rest comfortably enough to recover fully from their injury and to cope with the discomfort of their physical therapy sufficiently enough to regain full mobility. Likewise, this objective model might also indicate that a patient with a notably high pain threshold would do just fine with a lower level pain medication following a procedure that people with a normal pain threshold would otherwise find to simply have too difficult of a recovery period to cope with without the support of stronger medications. In this way, doctors could tailor the amount of pain medication prescribed based on the individual patient's objective pain perception, reducing the unnecessary exposure of the patient and the overall distribution and subsequent unauthorized or illegal access to these highly addictive medications.

Another application of the facial analysis-based tool for objectively predicting an individual's pain perception is to help orthopedists determine when surgery is an appropriate option. Major surgeries to joints such as the knees, hips, and shoulders are typically followed by a recovery period during which most patients undergo a regular schedule of painful physical therapy in order to regain full range of motion of the joint. Failure to follow this post-surgical therapy regime will result in permanent stiffening and tightening of the joint, even to the point of complete immobilization—a so called "frozen joint." Due to such risks, most orthopedists try to avoid major surgeries as long as possible, typically until and even after chronic pain has begun to seriously impact the patient's quality of life. By using the information gleaned from facial inference technologies about their patients' innate tolerance of or sensitivity to pain, orthopedists can more accurately predict how well a patient will be able to follow the post-surgical therapy and, thus, the likelihood of a full recovery. With this ability, orthopedists can make informed decisions tailored to the individual patient about if and when the benefits outweigh the risk to pursue surgical options.

Another group of applications for the facial analysis methods described herein relate to predicting an individual's sensitivity to social cues. Individual humans display a wide range of sensitivity in their ability to readily pick up on and correctly perceive social cues. On the most sensitive side of this spectrum are Highly Sensitive Persons (HSPs), who innately pick up on even the subtlest of social cues. Such individuals, who are thought to make up roughly 15% of the population, are acutely and at times even painfully aware of the thoughts and feelings of others during social situations, and are subsequently extremely sensitive to the reactions of others. While they can be extremely responsive to praise, they also tend to take even the lightest criticisms and reprimands harshly. As a result, they are more heavily influenced and reflective of social experiences than most people, particularly during their early childhood, and are more susceptible to being shy, becoming introverted, and performing poorly at tasks when they feel that they are under scrutiny.

On the opposite end of this spectrum are individuals with Autism Spectrum Disorders (ASDs), who show a very low sensitivity to perceiving the social cues of others. In some ASDs, such as Asperger's Syndrome, individuals are unable to properly synthesize and correlate different facial expressions and tones of voice to the correct emotional state of others. In all ASDs, however, it is readily observed and understood that such individuals simply do not pick up on social cues as readily as the general population, typically because they are too distracted by extraneous environmental details to notice cues from their social environment. As a result, attempting to communicate with individuals suffering from ASDs can be fairly frustrating for others who are unaccustomed to or lack the patience to deal with this lack of focus and responsiveness. Individuals with ASDs, including those who are even deemed high functioning, also tend to have a difficult time maintaining interpersonal relationships due to their inability to connect and relate with what others are feeling.

Distinct patterns in the facial features that distinguish individuals with ASDs from those in the general population have long been noted by the medical and psychiatric communities. Moreover, recent research has shown that computer-generated facial measures can identify and differentiate between children with such types of conditions. Using the facial analysis methods described herein, similar models can be used to identify HSPs and those suffering from ASDs from among the general population. In addition to identifying and classifying persons in these outlying groups, these facial analysis methods can be used to model the social sensitivity of the general population on a continuous scale, and to predict the social sensitivity of any one individual.

By further example, the facial analysis methods described herein also can be applied to model and predict how individuals respond to aggression. In general, the range of innate responses to aggression varies widely within the general population. Some individuals are by nature very easily offended, and tend to take the statements and actions of others more personally than intended. Such individuals subsequently tend to be much more bellicose in nature, and more readily engage in confrontation with others. On the other hand, some individuals regard very few statements and actions of others as offensive, even when they were meant to be. These individuals are frequently seen as having a "long fuse" or low temper. The ability to objectively model and predict an individual's relative perception of aggressive behavior of others has many benefits. For example, such information would help determine the suitability of an individual to certain tasks or jobs, particularly those that require considerable interaction with customers, working in a culturally diverse team environment, or dealing with situations where aggressive behavior is the norm (e.g., law enforcement). Also, such a model could also prove valuable in dealing with criminals themselves, helping law enforcers to identify individuals that pose a greater risk of getting into physical confrontations either within the general public or within a prison setting.

For example, a model based on a plurality of facial measurements may be used in the manner described below with reference to FIGS. 11 through 14 to predict a particular individual's innate personality such as aggression and competitiveness. One or more of the facial descriptor measurements shown in FIGS. 1A through 7T may also be used for this purpose. However, this set of facial descriptor measurements is merely exemplary and may be reduced or augmented as necessary within the spirit and scope of the present disclosure. Furthermore, multivariate analysis of a plurality of facial measurements statistically normalized against like measurements of a standard population of individuals can be used to predict other variable aspects of innate personality such as aggression, dominance, conscientiousness, compassion, extroversion, IQ, etc. Insight into such personality traits of an individual could be used to predict various aspects of behavior and performance such as learning styles, athletic performance, business decisions, etc.

For example, each year Major League Baseball teams attempt to find the best young players to select in the amateur draft. Although the draft contains multiple rounds, the first round is especially important because this is where the best players are chosen. Each of these first-round draft picks are typically compensated by a multi-million dollar signing bonus. Given their relative rarity, outstanding left-handed pitchers often are the most highly sought-after first-round draft picks, and often command larger signing bonuses that other players. However, many of these pitchers are relatively young and unproven. The cognitive suitability of a pitcher to performing under the extreme pressure situations found in Major League Baseball is a critical component for success that is otherwise very difficult to measure using conventional tools currently available to baseball scouts. Although baseball scouts use many different techniques (e.g., radar guns) to measure pitchers' physical capabilities, often these players' mental and cognitive capabilities—so-called "intangibles"—remain relatively unknown at draft time. Accordingly, it would be advantageous for teams to have a reliable indicator of the mental and cognitive capabilities of prospective first-round draft picks, such as left-handed pitchers, prior to making a decision to invest a large signing bonus and take the opportunity cost of foregoing another top prospect.

Facial and other physical measurements of successful left-handed baseball pitching prospects (or any other baseball prospects) can be made and compared with measurements of a standard population. Digital images and reference points may be used to ease the burden of the measurement process. Ratios, angles, or nominal measurements may be used instead of or in addition to actual measurements. A number of metrics may then be analyzed to find those metrics which show the greatest correlation or significance in determining statistically whether a person is more likely than another to be a successful left-handed pitcher. Once the more significant metrics are identified, the system may simply rely on those metrics to predict a person's likelihood to succeed as a left-handed pitcher. A baseball scout may use the system as a tool to assist in choosing one left-handed pitching prospect over another by scoring both candidates. Although the advantages have been illustrated by the example of a left-handed pitcher, those skilled in the art will recognize that such advantages could be achieved by use of the same or similar methods with respect to other baseball players or players in other sports using a draft, such as the National Football League (NFL) and the National Basketball Association (NBA). Moreover, those skilled in the art will recognize numerous other applications of the methods and techniques described throughout the specification to humans.

Figure 11:
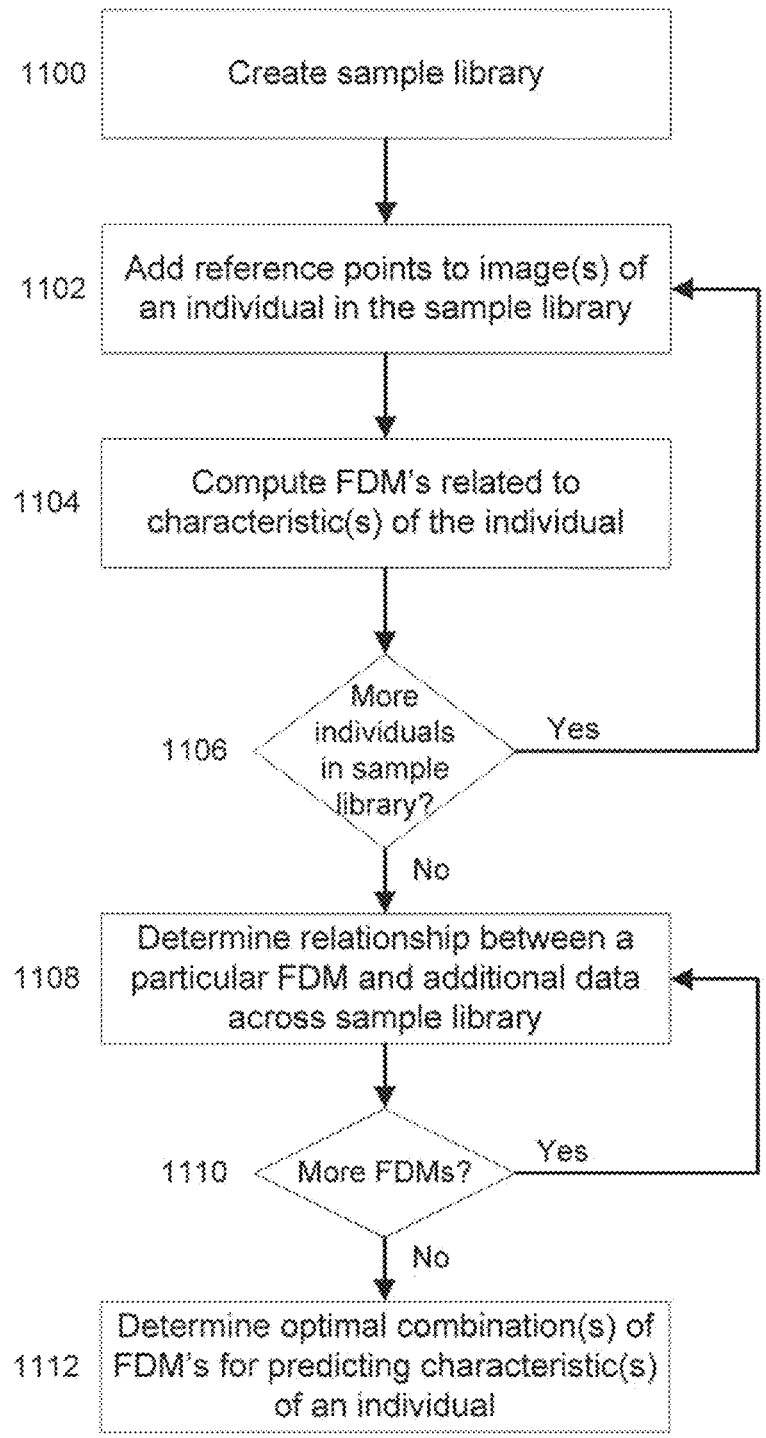
FIG. 11 shows a method for determining a predictor of a characteristic of an individual according to an embodiment of the present disclosure.

FIG. 11 shows an embodiment in the form of a method for determining a predictor of a characteristic of a particular type of individual (e.g., a human). As used herein, "type" refers to breed, species, sub-species, or any other relevant genetic similarity. Also, "characteristic" is used broadly to refer to a wide variety of features, traits, behaviors, capabilities, suitability, etc., including the most basic or fundamental personality features (e.g., sensitivity); more complex personality features that may be comprised of multiple basic features; and overall suitability for a particular task, purpose, relationship, etc., which may be influenced by a variety of fundamental and complex personality features. Accordingly, given the appropriate inputs, the method of FIG. 11 can be used to predict any type or complexity of characteristic. Although FIG. 11 illustrates the one or more embodiments by blocks arranged in a specific order, this order is merely exemplary and the steps or operations comprising the method may be performed in a different order than shown in the figure. Moreover, a person of ordinary skill will understand that the blocks shown in FIG. 11 may be combined and/or divided into blocks having different functionality.

In block 1100, a sample library is created. This step comprises obtaining one or more digital images of an anatomical region for each of a plurality of individuals, e.g., the face of a horse or a human. The image may be obtained in various ways, such as from a memory card of a digital camera, by downloading via File Transfer Protocol (FTP), via email, etc. Once obtained, the images are stored in a memory operably connected to a digital computer, such as memory that is either locally or remotely accessible by the computer, including an attached hard drive, removable flash drive, network drive, RAID (redundant array of independent disks) drive, removable memory card, etc.

Block 1100 also comprises obtaining additional data related to the characteristic of interest and storing it in the same or a different memory operably connected to the digital computer. As used herein, "data" may refer to performance records, vital statistics, results of behavior studies, and/or any other quantitative information that is related in some way to the characteristic of interest. While qualitative data may also be used, in many embodiments the qualitative data is converted into quantitative data for easier use by the system. The additional data may pertain to individuals in the sample library, groups of individuals in the sample library, or more generally the type of individual. Additional data may comprise information on breeding (e.g., pedigree/ancestry), health, and environmental factors (e.g., training, experiences). The additional data is stored in a manner and location by which it can be associated with the sample library images, such as in a relational database accessible by the digital computer.

In block 1102, a plurality of reference points are added to the one or more stored images of a particular individual in the sample library. This may be accomplished in an automated fashion or manually, for example by use of a program with a graphical user interface (GUI) running on the digital computer. For example, the one or more images can be processed by MATLAB, an advanced mathematical analysis program sold by The Mathworks, Inc., of Natick, Mass. (http://www.mathworks.com). MATLAB provides advanced image processing features and flexible options for definition of large numbers of variables, specifically matrices. Reference points are added to each of the images by using the MATLAB "GInput" command, which provides an interactive selection GUI. In some embodiments, reference points are manually selected on the image. One such embodiment is shown in FIGS. 1A through 7T, which were manually annotated with reference points (e.g., the four points in FIG. 1A). In other embodiments, reference points may be added automatically by MATLAB or another software application based on a generic model of the individual's face. Once the reference points are entered onto an image, MATLAB maps their pixel locations within the image to numerical coordinates within the corresponding matrix to facilitate further computation.

In block 1104, one or more facial descriptor measurements (FDMs) related to the characteristic of interest are computed from the set of reference points that were added to the one or more digital images of the individual. The facial descriptor measurements may be computed using distance measurements and trigonometric functions as illustrated above. Because length distance measurements are based on coordinate positions within the pixel matrix, the absolute distance values may be sensitive to factors such as camera resolution, artifacts of one or more compressions of the image, and cropping applied to isolate the face. In some embodiments, the length measurements may be normalized to structural reference lengths that are effectively constant among individuals of the same type and subject to the same set of factors. In other embodiments, the length measurements may be normalized against measurements (e.g., length or area) of other features in the same area or region of the face. For example, a measure of the lip thickness may be normalized by the lip length or width. However, it is apparent to one of ordinary skill that the facial descriptor measurements may be based upon absolute or non-normalized length measurements if the factors described above were not present or were not a concern. In other embodiments, one or more of the facial descriptor measurements may be based on an angular measurement or an area measurement. The facial descriptor measurements may be based on non-trigonometric calculations, such integral calculus calculations, or a combination of trigonometric and non-trigonometric calculations.

In some embodiments, one or more of the digital images are three-dimensional images. Such images may be created by combining multiple two-dimensional images using stereophotogrammetry or other methods known to persons of ordinary skill in the art. In such embodiments, one or more of the facial descriptor measurements may be based on a three-dimensional measurement, such as an absolute distance measure, absolute volume, a volumetric ratio, a solid angle, a dihedral angle, a surface area, or a combination thereof.

As shown in FIG. 11, blocks 1102 and 1104 are repeated for each individual in the sample library. Once complete, in block 1108, a relationship is determined between a particular facial descriptor measurement and the additional data related to the characteristic of interest using all individuals in the sample library. For example, the relationship can be determined from the mathematical correlation between the facial descriptor measurement and additional data for all individuals in the sample library. The correlation may be normalized or scaled as necessary to make it meaningful for further computation or interpretation.

Figure 10:
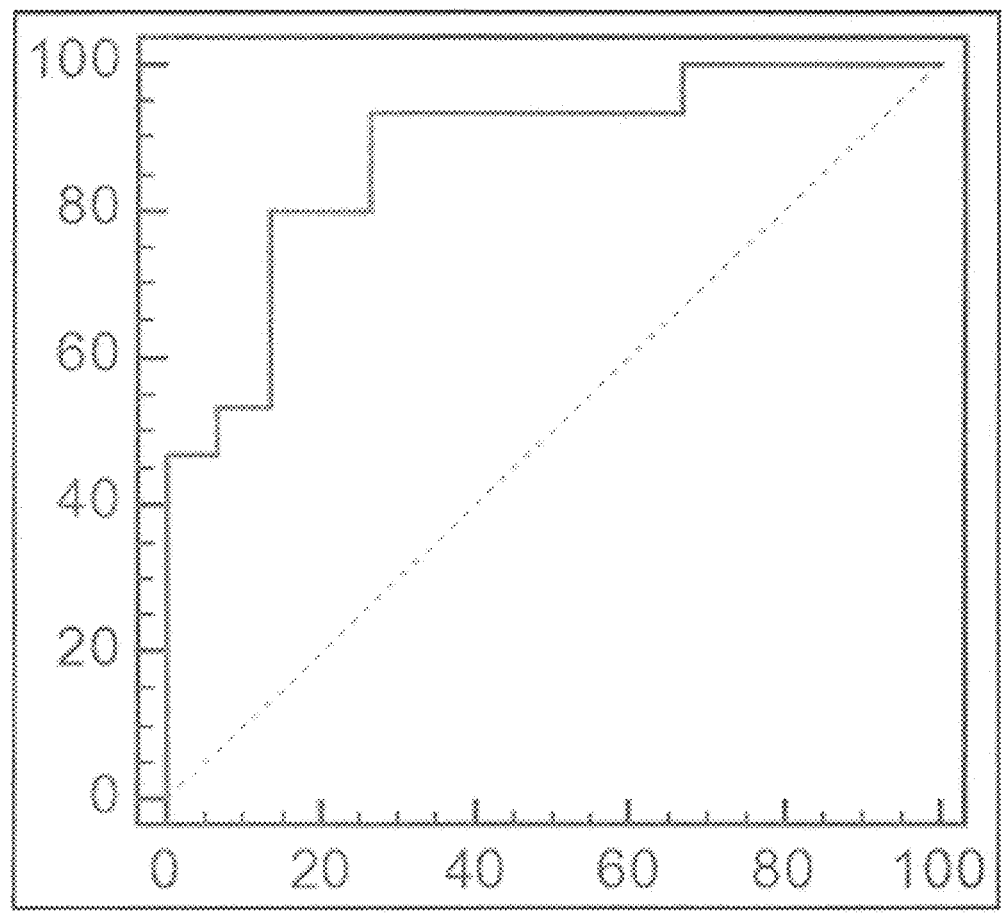
FIG. 10 shows an exemplary receiver operating characteristic (ROC) curve.

Other measures can be used to determine the relationship of a facial descriptor measurement to the additional data. For example, in categorical models (i.e., those used to separate individuals into categories and/or subcategories), receiver operating curve (ROC) analysis may be used to determine how effectively a facial descriptor measurement categorizes the collection of individuals in the sample library according to the characteristic of interest. In other words, if the additional information associated with the images in the sample library includes the actual categories and/or subcategories that the individuals fall into (e.g., personality type/subtype, consumption/purchasing patterns, learning style, type of event, etc.), ROC analysis can be used to determine how well a facial descriptor measurement assigns individuals to their actual category (i.e., true positive rate) while avoiding assignment of individuals to incorrect categories (i.e., false positive rate). FIG. 10 shows an exemplary receiver operating curve, where the false positive rate is shown on the horizontal axis and the true positive rate is shown on the vertical axis. The curve shown in FIG. 10 has an area of 0.801; an area greater than 0.65 indicates that a particular facial descriptor measurement is useful for prediction or categorization. Alternately, multi-dimensional, Euclidean distance analysis also may be used to separate two groups categorically. Other methods for determining a relationship based on appropriate statistical models are apparent to persons of ordinary skill in the art. As illustrated in FIG. 11, block 1106 is repeated for each facial descriptor measurement.

In block 1112, one or more of the facial descriptor measurements are selected to be used as predictors of the characteristic of interest. Any number of facial descriptor measurements—up to and including the entire set—may be selected. If there are multiple characteristics of interest, then a separate selection may be made for each characteristic. The selection may be made in various ways, depending on the available information and the characteristic of interest. The selection may be based on the raw facial descriptor measurements themselves, or upon scaled or transformed versions. For example, the z-score of a particular facial descriptor measurement may be used for purposes of selection. As known to persons of ordinary skill, a z-score represents the relative frequency (or rarity, as the case may be) of a particular measurement within a population, and is also commonly referred to as a standard score or z-value. Other transformations will be apparent to persons of ordinary skill in the art.

Moreover, in block 1112, the combination of the selected facial descriptor measurements that optimizes the predictor is also determined. In some embodiments, an optimal linear combination of the selected subset of facial descriptor measurements is determined using statistical analysis techniques. For example, in categorical models, ROC analysis may be used to select which combination of facial descriptor measurements best categorizes the collection of individuals in the sample library according to the characteristic of interest. As described above with respect to block 1108, ROC analysis can be used to determine which combination of facial descriptor measurements best assigns individuals to their actual category (i.e., true positive rate) while avoiding assignment of individuals to incorrect categories (i.e., false positive rate). In the spirit of the disclosure, however, a non-linear combination of the entire set, or a selected subset, of the facial descriptor measurements also may be determined from the sample library. A non-linear combination of the selected facial descriptor measurements may be selected using optimization techniques including, but not limited to, Newton's Method and Lagrange's Method. Moreover, the selected linear and/or non-linear combination may be of the facial descriptor measurements themselves, or of scaled or transformed versions such as the z-scores. If multiple characteristics are of interest, then an optimal combination for each characteristic may be selected.

Figure 13:
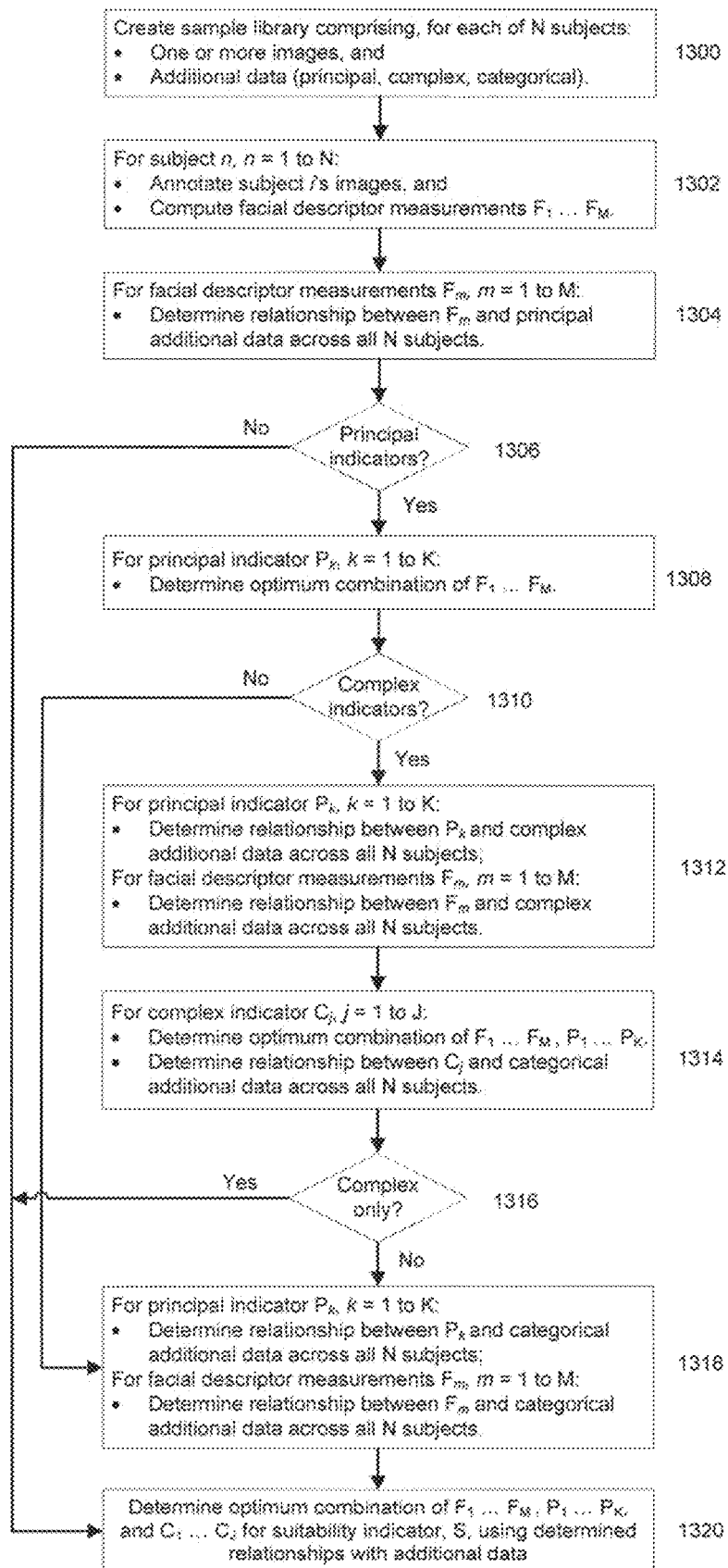
FIG. 13 shows another method for determining one or more predictors of a characteristic of an individual, according to other embodiments of the present disclosure.

FIG. 13 is a flowchart of an alternative embodiment of a method for determining a predictor of a characteristic of a particular type of individual (e.g., a human). Although FIG. 13 illustrates the one or more embodiments by blocks arranged in a specific order, this order is merely exemplary and the steps or operations comprising the method may be performed in a different order than shown in the figure. Moreover, a person of ordinary skill will understand that the blocks shown in FIG. 13 may be combined and/or divided into blocks having different functionality.

The method of FIG. 13 explicitly recognizes that more complex characteristics are based on combinations of more fundamental characteristics and overall suitability for a particular task, purpose, relationship, etc., may be based on a variety of fundamental and complex characteristics. Accordingly, the method of FIG. 13 can determine a model comprised of predictors of basic characteristics (called "principal indicators"), which are based on facial descriptor measurements; predictors of more complex characteristics (called "complex indicators"), which may be based on, or combinations of, facial descriptor measurements and/or principal indicators; and predictors of an ultimate suitability or category for an individual (called "suitability indicators"), which may be based on any of the facial descriptor measurements, principal indicators, and complex indicators. Although not shown in FIG. 13, persons of ordinary skill will readily comprehend that the model may comprise one or more additional levels of indicators. For example, the model may comprise one or more "tertiary indicators" that may be based on, or combinations of, facial descriptor measurements, principal indicators, and/or complex indicators. In such case, the one or more suitability indicators may be based on any of the facial descriptor measurements, principal indicators, complex indicators, and tertiary indicators. Moreover, models comprising such additional levels of indicators may be used in other methods described herein for predicting characteristics of one or more individuals, such as shown in and described below with reference to FIG. 14.

In block 1300, a sample library comprised of data for N individuals or subjects is created. This operation comprises obtaining one or more digital images of an anatomical region for each of the subjects, e.g., a human face. As discussed above with reference to FIG. 11, the images may be two- or three-dimensional images. The images may be obtained in various ways, such as from a removable or non-removable memory of a camera device (e.g., digital camera, webcam, smartphone, tablet, etc.), by downloading via File Transfer Protocol (FTP); by streaming from a camera device, via email, etc. Once obtained, the images are stored in a memory operably connected to a digital computer, such as memory that is either locally or remotely accessible by the computer, including an attached hard drive, removable flash drive, network drive, RAID (redundant array of independent disks) drive, removable memory card, etc.

Block 1300 also comprises obtaining additional data related to the subjects and storing it in the same or a different memory operably connected to the digital computer. The additional data may relate specifically to the individuals in the sample library, groups of individuals in the sample library, or more generally to a population of which the individuals are a part. As used herein, "additional data" may refer to performance records, vital statistics, results of behavior studies, environment data, and/or any other quantitative information that is related in some way to the characteristic of interest. While qualitative data may also be used, in many embodiments the qualitative data is converted into quantitative data for easier use by the system. Moreover, additional data may be comprised of principal additional data, which are related to the principal indicators of interest; complex additional data, which are related to the complex indicators of interest; and categorical additional data, which are related to the ultimate suitability indicator or categorization. The additional data is stored in a manner and location by which it can be associated with the sample library images, such as in a relational database accessible by the digital computer.

In block 1302, the images corresponding to each of the N individuals or subjects in the sample library are annotated with a plurality of reference points. As discussed above with reference to FIG. 11, the annotation may be done manually or automatically. Also in block 1302, a set of M facial descriptor measurements (Fi, i=1 to M) are computed based on the reference points annotated onto the one or more images for each of the N individuals. The facial descriptor measurements Fi may be computed using absolute or normalized distance measurements, angular measurements, area measurements, volume measurements, etc. using trigonometric functions, integral calculus, and other computational methods known to persons of ordinary skill. Although block 1302 shows both the annotation and the computation of Fi being done sequentially for each subject, the person of ordinary skill will recognize that these operations could be arranged differently, e.g., annotations for all subjects followed by computation of Fi for all subjects.

In block 1304, one or more relationships is determined between each of the facial descriptor measurements Fi, i=1 to M, and the principal additional data across all N subjects in the sample library. By way of example, the one or more relationships for facial descriptor measurements Fi can be determined using one or more mathematical correlations between Fi and at least some portion of the principal additional data for all N subjects in the library. The correlation may be normalized, scaled, or transformed (e.g., z-score) as necessary to make it meaningful for further computation or interpretation. As discussed above with reference to FIGS. 11 and 12, in some embodiments, receiver operating curve (ROC) analysis may be used to determine the effectiveness of facial descriptor measurement Fi as a principal indicator, based on the ability of Fi (or a function thereof) to assign individuals to their actual category (i.e., true positive rate) while avoiding assignment of individuals to incorrect categories (i.e., false positive rate). In other embodiments, correlation analysis may be used to determine the one or more relationships. Other methods for determining a relationship based on appropriate statistical models are apparent to persons of ordinary skill in the art.

In block 1306, it is determined whether principal indicators Pk, k=1 to K, are to be used in the computation of the suitability indicator, S. In the case that only facial descriptor measurements Fi, i=1 to M, are to be used in computing S, the method proceeds to block 1318. Otherwise, the method proceeds to block 1308, where one or more of the facial descriptor measurements, Fi, are selected to be used to compute each of principal indicators Pk, k=1 to K. Any number of facial descriptor measurements—up to and including the entire set—may be selected for each principal indicator. The selection may be made in various ways, depending on the available information and the particular principal indicator, Pk. The selection may be based on the raw facial descriptor measurements themselves, or upon scaled or transformed versions. For example, the z-score of a particular facial descriptor measurement may be used for purposes of selection. Other transformations will be apparent to persons of ordinary skill in the art.

In block 1308, the combination of the selected facial descriptor measurements that optimizes each of principal indicators Pk is also determined. In some embodiments, an optimal linear combination of the selected subset of facial descriptor measurements is determined. In other words, if $Pk = \alpha 1 Fk1 + \alpha 2 Fk2 + \ldots \alpha n Fkn$, then the facial descriptor measurements $Fki$, $i=1$ to $n$, and the linear coefficients $\alpha i$, $i=1$ to $n$, are determined in block 1308. The linear combination may be determined using statistical analysis techniques. For example, in categorical models, ROC analysis may be used to select the combination of facial descriptor measurements that provides a Pk that best categorizes the subjects in the sample library, e.g., according to at least a portion of the principal additional data. In the spirit of the disclosure, however, a non-linear combination of the entire set, or a selected subset, of the facial descriptor measurements also may be determined based on the principal additional data. A non-linear combination of the selected facial descriptor measurements may be selected using optimization techniques including, but not limited to, Newton's Method and Lagrange's Method. Moreover, the selected linear and/or non-linear combination may be of the facial descriptor measurements themselves, or of scaled or transformed versions such as the z-scores.

In block 1310, it is determined whether complex indicators Cj, j=1 to J, are to be used in the computation of the ultimate suitability indicator, S. If not, then the method proceeds to block 1318. Otherwise, the method proceeds to block 1312, where one or more relationships are determined between each of the principal indicators Pk, k=1 to K, and the complex additional data across all N subjects in the sample library. By way of example, the one or more relationships for principal indicators Pk can be determined using one or more mathematical correlations between Pk and the complex additional data for all N subjects in the library. The correlation may be normalized, scaled, or transformed (e.g., z-score) as necessary to make it meaningful for further computation or interpretation. As discussed above, in some embodiments, the relationships can be determined based on receiver operating curve (ROC) analysis. In other embodiments, correlation analysis may be used to select the complex indicators used for computing the ultimate suitability indicator, S. In block 1312, one or more relationships are also determined between each of the facial descriptor measurements Fi, i=1 to M, and the complex additional data across all N subjects in the sample library. ROC analysis, correlations, or other methods known to persons of ordinary skill may be used to determine these relationships.

Next, in block 1314, one or more of the facial descriptor measurements, Fi, and principal indicators, Pk, are selected to be used to compute each of complex indicators Cj, j=1 to J. Any number of facial descriptor measurements and principal indicators—up to and including the entire set of both—may be selected for each principal indicator. Moreover, the selection may be limited only to one or more of the principal indicators, Pk, i.e., the facial descriptor measurements are not used. The selection may be made in various ways, depending on the available information and the particular complex indicator, Cj. The selection may be based on the raw values of Fi and Pk, or upon scaled or transformed versions. For example, the z-score of a particular Fi or Pk may be used for purposes of selection. Other transformations will be apparent to persons of ordinary skill in the art.

In block 1314, the combination of the selected facial descriptor measurements, Fi, and/or principal indicators, Pk, that optimizes each of complex indicators Cj is also determined. In some embodiments, an optimal linear combination of the selected group of Fi and/or Pk is determined. In other words, if $Cj = \alpha 1 Fk1 + \alpha 2 Fk2 + \alpha n Fkn + \beta 1 Pk1 + \beta 2 Pk2 + \beta m Pkm$, then the facial descriptor measurements Fki, i=1 to n, and principal indicators Pki, i=1 to m, are selected in block 1312 and the linear coefficients $\alpha ki$, i=1 to n, and $\beta ki$, i=1 to m, are determined in block 1314. The linear combination may be determined using statistical analysis techniques. In some embodiments, ROC analysis may be used to select the combination of facial descriptor measurements and/or principal indicators that provides a Cj that best categorizes the subjects in the sample library, e.g., according to at least a portion of the complex additional data. In other embodiments, correlation analysis may be used to select the combination of measurements.

In the spirit of the disclosure, however, a non-linear combination of the selected group of facial descriptor measurements and/or principal indicators also may be determined based on the complex additional data. A non-linear combination of the selected group of facial descriptor measurements and/or principal indicators may be determined using optimization techniques including, but not limited to, Newton's Method and Lagrange's Method. Moreover, the selected linear and/or non-linear combination may be of the facial descriptor measurements and/or principal indicators themselves, or of scaled or transformed versions such as the z-scores.

In block 1314, one or more relationships are also determined between each of the complex indicators Cj and the categorical additional data across all N subjects in the sample library. By way of example, the one or more relationships for complex indicators Cj can be determined using one or more mathematical correlations between Cj and the categorical additional data for all N subjects in the library. The correlation may be normalized, scaled, or transformed (e.g., z-score) as necessary to make it meaningful for further computation or interpretation. As discussed above, in some embodiments the relationships can be determined based on receiver operating curve (ROC) analysis while in other embodiments correlation analysis may be used.

In block 1316, it is determined whether only the set of complex indicators Cj, j=1 to J, are to be considered in the model for suitability indicator, S. If so, then the method proceeds to block 1320. Otherwise, the method proceeds to block 1318, where one or more relationships are determined between each of the facial descriptor measurements, Fi, and the categorical additional data across all N subjects in the sample library. In addition, one or more relationships also are determined between each of the principal indicators, Pk, and the categorical additional data across all N subjects in the sample library. These relationships can be determined in the manner described above with respect to the relationships with the principal and complex additional data.

In block 1320, one or more of the facial descriptor measurements, Fi, principal indicators, Pk, and complex indicators, Cj, are selected to be used to compute the suitability indicator, S. Any number of facial descriptor measurements, principal indicators, and complex indicators—up to and including the entire set of all three—may be selected for each suitability indicator. Moreover, the selection may be limited only to one or more of the complex indicators, Cj, i.e., the facial descriptor measurements and principal indicators are not used. The selection may be made in various ways, depending on the available information and the particular suitability indicator, S. The selection may be based on the raw values of Fi, Pk, and/or Cj, or upon scaled or transformed versions. For example, the z-score of a particular Fi, Pk, or Cj, may be used for purposes of selection. Other transformations will be apparent to persons of ordinary skill in the art.

In block 1320, the combination of the selected facial descriptor measurements, principal indicators, and complex indicators that optimizes suitability indicator S is also determined. In some embodiments, an optimal linear combination of the selected group of Fi, Pk, and/or Cj is determined. In other words, if S=α1Fk1+α2Fk2+ . . . αnFkn+α1Pk1+β2Pk2+ . . . βmPkm+γ1Ck1+γ2Ck2+ . . . γ rCkr then the facial descriptor measurements Fki, i=1 to n, principal indicators Pki, i=1 to m, and complex indicators, Cki i=1 to r, are selected in block 1320 and the linear coefficients αi, i=1 to n, βi, i=1 to m, and γi, i=1 to r are determined in block 1320. To the extent that the selection is limited to one or more of the complex indicators, Cj, the corresponding coefficients αi and βi are zero. The linear combination may be determined using statistical analysis techniques. For example, in some embodiments, ROC analysis may be used to select the combination of facial descriptor measurements and/or principal indicators that provides a value for S that best categorizes the subjects in the sample library, e.g., according to at least a portion of the categorical additional data. In other embodiments, correlation analysis may be used to select the combination of measurements and/or indicators. In the spirit of the disclosure, however, a non-linear combination of the selected group of facial descriptor measurements and/or principal indicators also may be determined based on the complex additional data, in the same or similar manner as discussed above.

As mentioned above, the additional data stored in the sample library in block 1100 of FIG. 11 and block 1300 of FIG. 13 may comprise environmental data. An individual's actual personality and behavior is influenced not only by their innate personality traits but also by their environment, including experiences and social interactions throughout life, but particularly during early childhood. Accordingly, prediction of an individual's characteristic such as behavior or personality traits should take into account the relevant environmental factors to the greatest extent possible. For example, the additional data stored in the sample library should include environmental information related to whether, or to what degree, each of the individuals has experienced particular events (e.g., death of a parent before a certain age), been exposed to certain environmental stimuli (e.g., violence), or has a particular family status (e.g., only child). When determining a model for predicting a characteristic of an individual, such as by using one or more of the methods shown in FIGS. 11 and 13, environmental variables may be incorporated in several different ways. First, environmental information about whether or not an individual has experienced a particular event can be represented by a Boolean-valued environmental variable. If this event is associated with one or more facial descriptor measurements, principal indicators, or complex indicators, the environmental variable can be used to enable and disable the contributions of the associated measurements and/or indicators to the overall predictor model. For example, if environmental variable τ is associated with principal indicator P1, then complex indicator C that depends on P1 would be expressed as C=τ·α1·P1+α2P2+ . . . αnPn. If the environmental information relates to degree or type of experience, the corresponding environmental variable (e.g., τ) can take on either a discrete or a continuous range of values.

In other embodiments, environmental variables may be included as standalone terms in the models determined for principal, complex, and/or categorical indicators. For example, a complex indicator, C, that depends on environmental variable r as well as principal indicators P1 through Pn could be expressed as C=α1·P1+α2·P2+ . . . αn·Pn+αn+1·τ. The value for the linear coefficient αn+1 would then be determined together with linear coefficients α1 through an, e.g., in block 1314 of FIG. 13. More generally, in such embodiments, environmental variables may be treated in the same manner as facial descriptor measurements, principal indicators, and complex indicators when determining the optimal selection and combination comprising a higher-level indicator.

Figure 12:
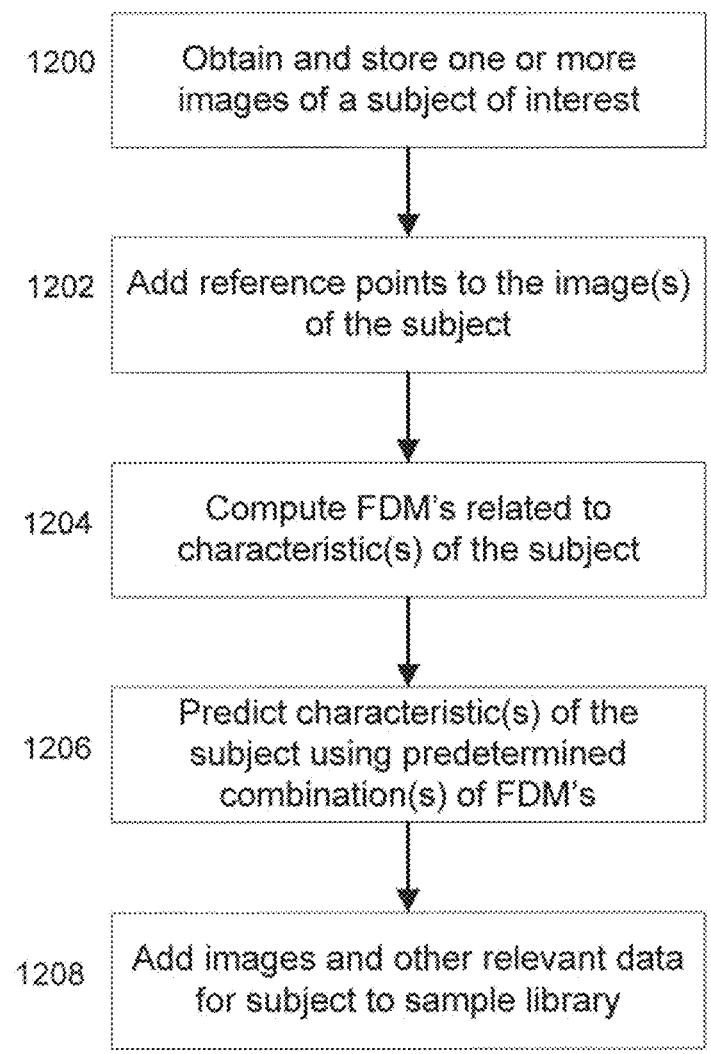
FIG. 12 shows a method for determining a characteristic of an individual according to another embodiment of the present disclosure.

According to the embodiment illustrated by FIG. 12, a subset and combination of facial descriptor measurements selected using the embodiment illustrated by FIG. 11 then can be used to predict a characteristic of an individual based on the facial descriptor measurements for that individual. In other words, the subset and combination selected based on the sample library can be applied to other individuals of the same type to determine the characteristic for those individuals. Although FIG. 12 illustrates the one or more embodiments by blocks arranged in a specific order, this order is merely exemplary and the steps or operations comprising the method may be performed in a different order than shown in the figure. Moreover, a person of ordinary skill will understand that the blocks shown in FIG. 12 may be combined and/or divided into blocks having different functionality.

In block 1200, digital images and additional data are obtained and stored for an individual of interest, in the same manner as described above with reference to the sample library (i.e., block 1100 of FIG. 11). In block 1202, reference points consistent with those of the images in the sample library are added to the images of the individual of interest. In block 1204, facial descriptor measurements are calculated for the individual of interest.

In block 1206, the subset and combination selected in block 1112 is applied to the facial descriptor measurements of the individual to predict the characteristic of interest. In block 1208, the sample library optionally may be augmented by adding the image(s), additional data, and facial descriptor measurements for this individual. Subsequently, the method of FIG. 11 can be repeated using the augmented sample library, and the resulting predictor can be applied to additional individuals of the same type in accordance with the method of FIG. 12. Although the embodiment illustrated by FIG. 12 has been described as being used in conjunction with the embodiment of FIG. 11, it also can be utilized in conjunction with the embodiment of FIG. 13. For example, the method shown in FIG. 12 can be used to compute one of more of the principal indicators, Pk that are comprised of a linear or non-linear combination of facial descriptor measurements, Fi.

Figure 14:
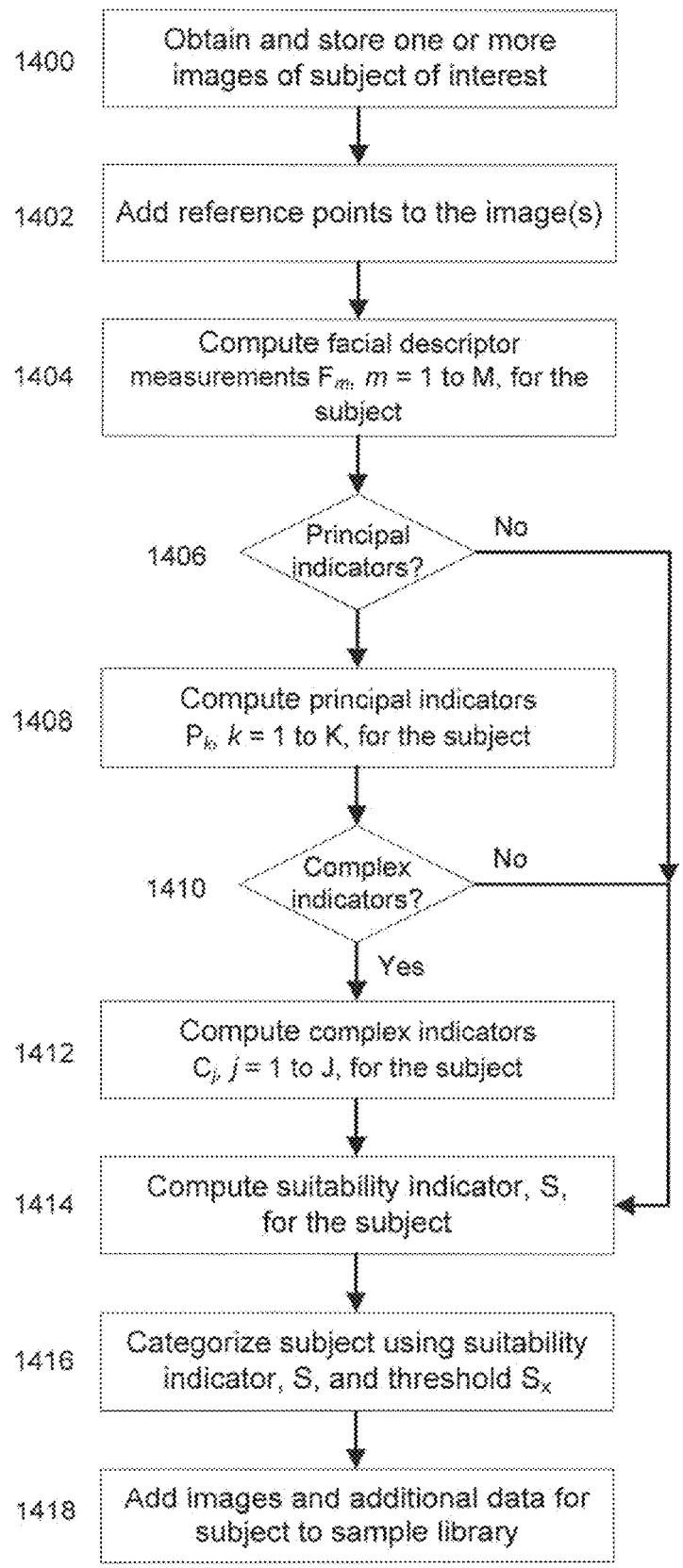
FIG. 14 shows another method for determining a characteristic of an individual according to other embodiments of the present disclosure.

FIG. 14 is a flowchart of an alternative embodiment of a method for predicting a characteristic of an individual, such as suitability for a particular task, purpose, relationship, etc., based on the facial descriptor measurements for that individual. The embodiment illustrated by FIG. 14 may utilize the facial descriptor measurements together with the models for principal indicators and complex indicators to determine a suitability indicator, S. The models for the principal and complex indicators may be determined by the method illustrated in FIG. 13 or by any other method that generates such models. Although FIG. 14 illustrates the one or more embodiments by blocks arranged in a specific order, this order is merely exemplary and the steps or operations comprising the method may be performed in a different order than shown in the figure. Moreover, a person of ordinary skill will understand that the blocks shown in FIG. 14 may be combined and/or divided into blocks having different functionality.

In block 1400, digital images and additional data are obtained and stored for a subject, in the same manner as described above with reference to the sample library (e.g., block 1100 of FIG. 11 and block 1300 of FIG. 13). In block 1402, the images of the subject are annotated with a plurality of reference points. As discussed above with reference to FIGS. 11 through 13, the annotation may be done manually or automatically. In block 1404, a set of M facial descriptor measurements (Fi, i=1 to M) are computed based on the reference points annotated onto the one or more images of the subject.

In block 1406, it is determined whether principal indicators are to be used in the computation of the suitability indicator, S. In the case that only facial descriptor measurements Fi, i=1 to M, are to be used in computing S, the method proceeds to block 1414. Otherwise, the method proceeds to block 1408, where principal indicators Pk, k=1 to K, are computed using facial descriptor measurements Fi and the model determined, for example, in block 1308 of FIG. 13. Subsequently, the method proceeds to block 1410, where it is determined whether complex indicators are to be used to compute the suitability indicator. If not, then the method proceeds to block 1414. Otherwise, the method proceeds to block 1412 where complex indicators Cj, j=1 to J, are computed using facial descriptor measurements Fi and/or principal indicators Pk, based on, the model determined, for example, in block 1314 of FIG. 13.

Next, in block 1414, the suitability indicator, S, for the subject of interest is computed based on the facial descriptor measurements Fi, principal indicators Pk, and/or complex indicators Cj using the model determined, for example, in block 1320 of FIG. 13. In block 1416, the subject is categorized based on the value of suitability indicator, S, and a suitability threshold, Sx. In some embodiments, this characterization may comprise determining that the subject is suitable for a particular task, purpose, relationship, etc. based on comparing the values of S and Sx, e.g., S>Sx or |S−Sx|<ε. In some embodiments, this characterization may comprise assigning the subject to one category if S>Sx and another category if S≤Sx. Other possible comparisons will be apparent to persons of ordinary skill in the art. Finally, in block 1418, the sample library optionally may be augmented by adding the image(s), additional data, facial descriptor measurements, principal indicators, complex indicators, and/or suitability indicator for the subject.

Figure 15:
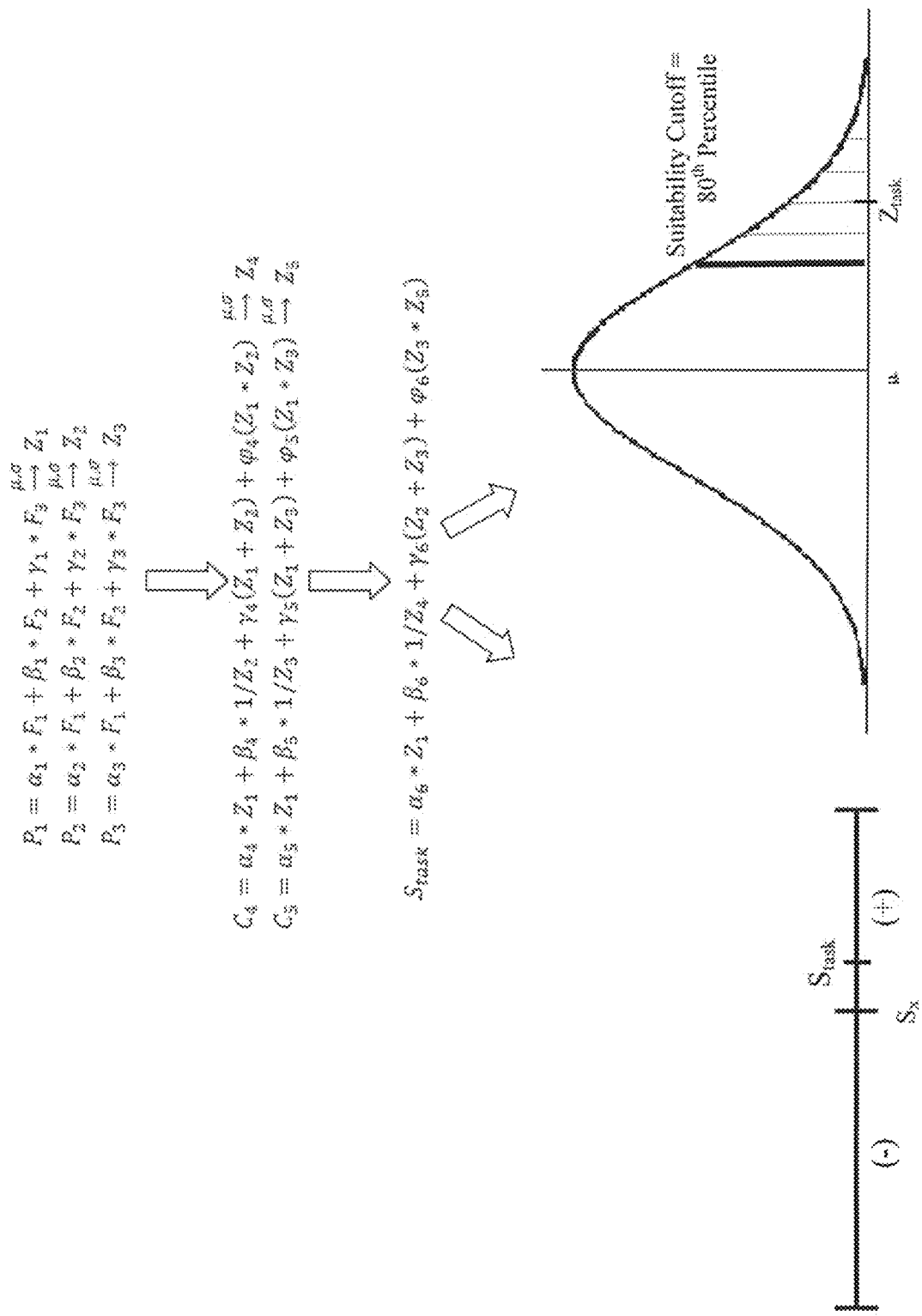
FIG. 15 shows an example illustrating an embodiment of the method shown in FIG. 14.

FIG. 15 further illustrates the method of FIG. 14 by example. Initially, principal indicators P1, P2, and P3 are computed based on linear combinations of facial descriptor measurements F1, F2, and F3. The use of the same facial descriptor measurements in computing each of the principal indicators is merely exemplary. Coefficients αi, βi, and γi used to compute the principal indicators may have been previously determined, for example, by the method shown in FIG. 13. Z-scores Z1, Z2, and Z3, are determined for principal indicators P1, P2, and P3, respectively. Next, complex indicators C4 and C5 are computed by a non-linear combination of principal indicator z-scores Z1, Z2, and Z3. Coefficients αi, βi, γi, and φi used to compute the complex indicators may have been previously determined, for example, by the method shown in FIG. 13. Z-scores Z4 and Z5 are determined for complex indicators C4 and C5, respectively.

Subsequently, categorical indicator for suitability for a task Stask is computed from a non-linear combination of z-scores Z1, Z2, and Z3 corresponding to the principal indicators and z-scores Z4 and Z5 corresponding to the complex indicators. Coefficients αi, βi, γi, and φi used to compute the suitability indicator Stask may have been previously determined, for example, by the method shown in FIG. 13. Next, Stask may be used to determine whether the subject with facial descriptor measurements F1, F2, and F3 is suitable for the task at issue. This may be done in a variety of ways, two of which are shown in FIG. 15. For example, the raw value of Stask may be compared against the threshold Sx to determine which of two categories to place the subject (e.g., "(+)" and "(−)" in FIG. 15). In another example, a z-score Ztask computed from Stask may be compared to a cutoff or threshold on the distribution of the population of interest (e.g., the 80th percentile) to determine whether the subject is suitable for the task of interest. The population of interest may be the general population or a specific sub-population, e.g., those who already are engaged in the particular task. The cutoff or threshold may be chosen in conjunction with the choice of population. As noted above, FIG. 15 is merely an example illustrating the embodiment shown in and described above in reference to FIG. 14; other variations will be apparent to the person of ordinary skill.

In other embodiments, Stask may comprise a set of z-scores, Zq, q=1 to Q, each corresponding to one or more principal indicators Pk and/or one or more complex indicators Cj, and threshold Sx may comprise a set of thresholds, Sxq, q=1 to Q, each corresponding to a Zq. In such embodiments, each of z-scores in {Zq} can be compared to its corresponding threshold in {Sxq}, with subject categorized as suitable for the task of interest if each member of {Zq} has the desired relationship—less or greater than, as the case may be—with the corresponding member of {Sxq}. Alternately, the subject may be determined to be suitable if a subset of {Zq} and {Sxq} have the desired relationship (e.g., majority). In some embodiments, one or more of the thresholds {Sxq} may comprise a pair of thresholds related to the corresponding member of {Zq}, in which case the desired relationship may be between the pair of thresholds, e.g., Sxq1<Zq≤Sxq2. In some embodiments, Stask may comprise a set of raw values, {Sq}, each corresponding to one or more principal indicators Pk, and/or one or more complex indicators Cj, and threshold Sx may comprise a set of thresholds {Sxq}, each corresponding to a member of {Sq}. Suitability may be determined for these embodiments in the same manner as discussed above with respect to embodiments comprising z-scores.

In the embodiments described above, the operation in block 1416 of FIG. 14 categorizes the subject as suitable or non-suitable based on the suitability indicator. In other embodiments, however, the operation in block 1416 may comprise using the suitability indicator to assign the subject to one of a plurality, or set, of categories. This set of categories may be exhaustive (i.e., every member of a population will be placed in one of the categories) or non-exhaustive, in which case the set may comprise an "other" or similarly-named category to which subjects that do not fall into one of the defined categories are assigned. In some embodiments, a set of categories Kt, t=1 to T, are defined by a set of thresholds, Sxt, t=1 to T+1, such that a subject is assigned to category Kt if Sxt<Stask≤Sx(t+1). Optionally, beginning threshold Sx1 and end threshold Sx(T+1) may be set to −/+∞, respectively.

In other embodiments, Stask may comprise a set of z-scores, Zq, q=1 to Q—or raw scores, Sq, q=1 to Q—each corresponding to one or more principal indicators Pk and/or one or more complex indicators Cj. Each category Kt is defined by a pair of values {Sxqtmin, Sxqtmax} defining a range for each z-score of the set {Zq}, i.e., a set of Q ranges. A subject will be assigned to a category Kt if each member of the set of z-scores {Zq} falls within the range {Sxqtmin, Sxqtmax} associated with that z-score and category. In other words, a subject will be assigned to a particular category only if all z-scores (or raw scores, as the case may be) fall within the set of ranges associated with that category. In other embodiments, a subject may be assigned to a particular category if a required subset of the z-scores (or raw scores) falls within the set of ranges associated with that category. The required subset may be determined in various ways, such as by majority (i.e., at least Q/2) of the set, by majority of each of two subsets, by all of a one subset and one or more of the remainder, etc. In these embodiments, the set of categories {Kt} may be exhaustive (i.e., every individual in the population will be assigned to one of the categories) or non-exhaustive.

For example, embodiments of the present disclosure may be used to predict the risk level of a driver for purposes of automobile insurance. Accordingly, Stask may comprise a set of z-scores, Zq, q=1 to Q—or raw scores, Sq, q=1 to Q—each related to a particular risk area for a driver (e.g., specific types of accidents, theft risk, etc.). In some embodiments, the value of a particular z-score Zq is proportional to the risk level in the corresponding risk area. An insured driver (or candidate for insurance) could be assigned to one of a plurality of overall risk categories {Kt, t=1 to T} based on the values of each of the set of z-scores {Zq} relative to one or more corresponding thresholds. In such embodiments, additional data used to determine the model for categorization of drivers may comprise frequency and/or severity of past accidents, overall cost of accidents to insurance company, number of traffic violations, traffic density in individual's home city, length of commute (if any), etc. In some embodiments, such a model may be applied using additional data and facial descriptor measurements pertaining to a new individual to predict that individual's risk level.

In other embodiments, the set of categories may be related to a pre-existing population categorization model, such as a pre-existing model used by insurance companies to categorize drivers and personality categorization models such as the Myers Briggs Type Indicator (MBTI), the Kiersey Temperament Sorter, the Costa McRae Five Factor model (also known as the Big Five model), the Petrides Trait EI model for emotional intelligence, and others known to persons of ordinary skill in the art. For example, the MBTI separates individuals into sixteen personality categories using subjects' answers to a psychometric questionnaire designed to measure psychological preferences in how people perceive the world and make decisions. The MBTI categories are based on the four dichotomies of extraversion/introversion (E/I), sensing/intuition (S/N), thinking/feeling (T/F), and judging/perceiving (J/P).

The method shown in FIG. 13 could be employed to predict which of the 16 categories that an individual would be assigned by an MBTI assessment. For example, the sample library created in block 1300 may comprise digital images of individuals whose personalities have been categorized using MBTI, together with additional data for each individual comprising their answers to the questionnaire, their rating on each of the four dichotomies, and any other information used for MBTI categorization (e.g., gender). In blocks 1302 through 1318, a variety of facial descriptor measurements, principal indicators, and complex indicators could be determined as described above. In some embodiments, a set of four predictors {SE/I, SS/N, ST/F, SJ/P} corresponding to the four MBTI dichotomies are determined in block 1320. The set of predictors may be based on raw scores, z-scores, or a combination thereof. An indicator of an individual's MBTI category can be determined based on this set of dichotomy predictors.

These predictors may then be used according to the method shown in FIG. 14 to predict to which of the sixteen personality types that an individual subject would be assigned based on an MBTI assessment. The subject's predicted rating on the four MBTI dichotomies can be determined in block 1416 by comparing the subject's four dichotomy indicators {SE/I, SS/N, ST/F, SJ/P} to their corresponding thresholds {SxE/I, SxS/N, SxT/F, SxJ/P}. By way of example, if SE/I<SxE/I, then the subject is likely to be categorized as an introvert ("I"); otherwise the subject is likely to be categorized as an extrovert ("E") by an MBTI assessment. The subject's ultimate MBTI category is predicted based on the results of the four comparisons. In another embodiment, a single category predictor SMBTI may be determined in block 1320 and used to compute a single categorical indicator for a subject in block 1416. An indicator of the subject's MBTI category may be determined based upon the range of values that the categorical indicator falls within, as described above.

While some embodiments of the present disclosure are useful for predicting categorizations of individuals under existing models, such as the MBTI, other embodiments can be used to augment existing categorization models with additional, more granular information. For example, in addition to predicting a subject's rating on each of the four MBTI dichotomies, the methods of FIGS. 11 through 15 can be used to determine indicators of the strength of the subject's rating on each of the categories. The four dichotomy indicators {SE/I, SS/N, ST/F, SJ/P} may be expressed as z-scores such that a high positive value for a dichotomy (e.g., E/I) indicates that the subject is strongly oriented toward one side (e.g., E), a high negative value indicates that the subject is strongly oriented toward the other side (e.g., I), and a value near zero indicates that the subject is relatively balanced. Alternately, the four dichotomy indicators may be expressed as percentile scores, e.g., with zero and 100 percentiles representing the two extremes of a dichotomy (e.g., extreme introverts and extreme extroverts). Continuously-valued indicators, such as these examples, may be used to create sub-categories for one or more of the categories of the MBTI or other existent model.

Although exemplary embodiments have been discussed above in relation to humans, embodiments of the methods for predicting a characteristic of an individual may be applied for predicting various characteristics of a non-human animal. For example, embodiments may be employed to predict the characteristic of gluttony in animals, i.e., how much a specific animal will eat in relation to the population of other animals of the same type. Moreover, such embodiments may be employed to predict how the animal's food intake level is affected by environmental stress (e.g., heat, handling, transport, weaning, parturition, injury, etc.) based on the characteristics of their susceptibility to stress and their ability to respond to it. Furthermore, embodiments may be employed to predict an animal's preferences for particular types of food (based, e.g., on texture, taste, smell, etc.) and how this contributes to variability in the animal's food intake level. Embodiments also may be used to predict how well an animal is able to digest their food.

Similarly, embodiments may be employed to predict how an animal will respond to changes in their environment such as, for example, changes to pen or stall, pen- or stallmates, transportation, feeding systems, feeding or other schedules, etc. Embodiments may be used to predict the animal's susceptibility to stress, the expected level of stress the animal would suffer in response to various stress-inducing changes, and type and/or degree of physiological reaction to such changes including depression, aggression, flight, weight loss, diarrhea, self-injury, death, etc. Based on the predictions of such characteristics, such embodiments could be used to select animals better suited to thrive in terms of growth and/or production under the known stress of existing animal management protocols.

Although the methods of FIGS. 11 through 15 have been described above in terms of determining a predictor of a characteristic or indicator of an individual (or predicting the characteristic or indicator using the predictor, as the case may be), embodiments of the present disclosure also may be used to determine the degree to which two individuals are suitable for a particular purpose or type of relationship, i.e., "pairwise complementary." These embodiments may be used to determine if two individuals are pairwise complementary for any type of relationship, including husband-wife, student-teacher, athlete-coach/trainer, teammates, roommates, worker-supervisor, co-workers, business partners, etc.

Figure 16:
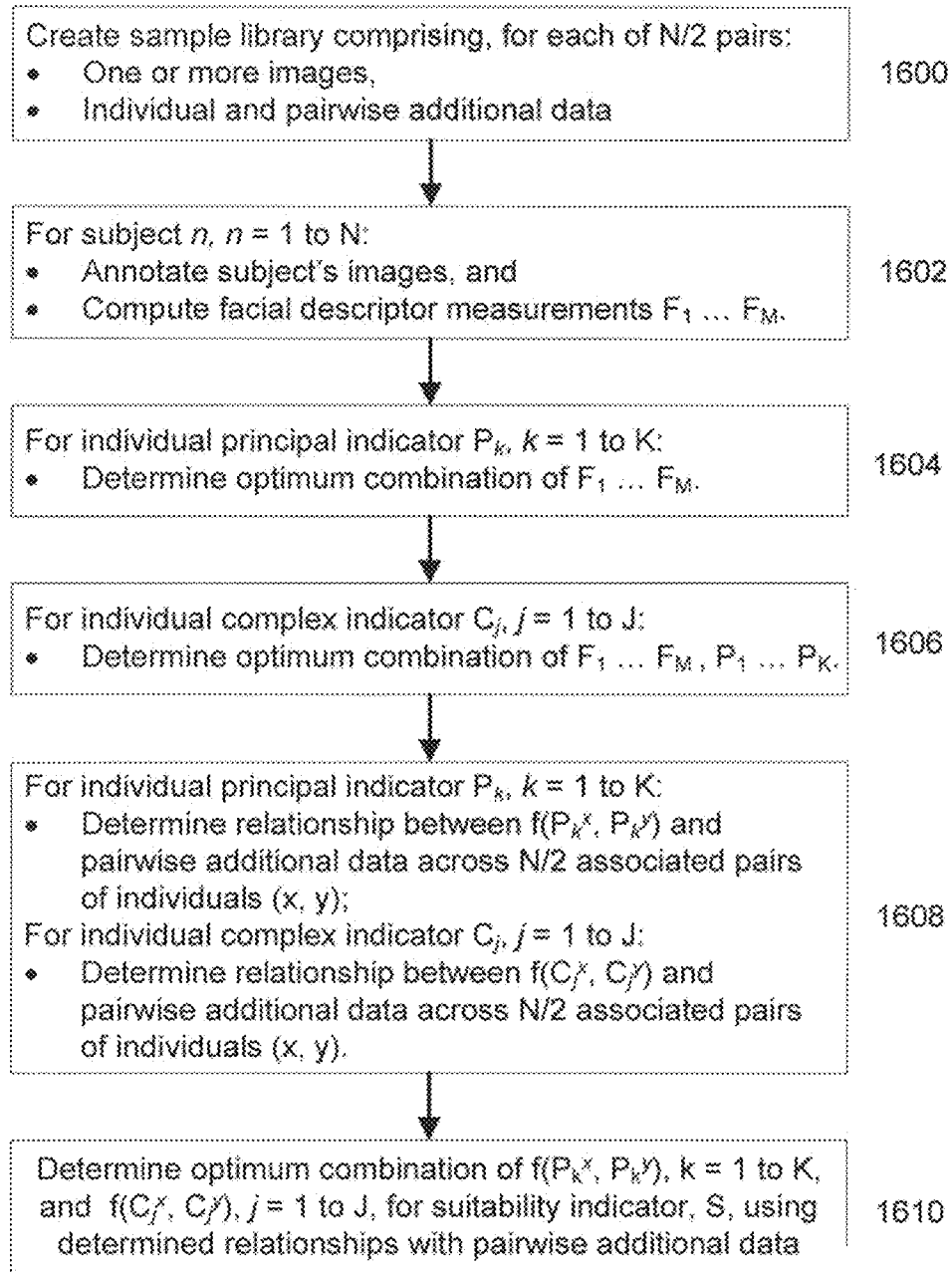
FIG. 16 is a flowchart of a method for determining a predictor for the pairwise complementarity of two individuals for a particular purpose, according to other embodiments of the present disclosure.

For example, FIG. 16 shows a flowchart for a method for determining a predictor for the pairwise complementarity of two individuals for a particular purpose, e.g., marriage. As will be apparent during the following discussion, the embodiment illustrated by FIG. 16 is similar to the embodiment shown in and described above with reference to FIG. 13. Although FIG. 16 illustrates the one or more embodiments by blocks arranged in a specific order, this order is merely exemplary and the steps or operations comprising the method may be performed in a different order than shown in the figure. Moreover, a person of ordinary skill will understand that the blocks shown in FIG. 16 may be combined and/or divided into blocks having different functionality.

In block 1600, a sample library comprised of data for N individuals or subjects is created. These N individuals are comprised of N/2 pairs of individuals that are associated based on an existing relationship of the type for which a predictor will be determined. For instance, the N individuals may comprise N/2 married couples. The operation comprises obtaining one or more digital images of an anatomical region for each of the individuals, as discussed above with reference to block 1100 of FIG. 11 and block 1300 of FIG. 13 with block 1600 also storing additional data related to the individuals and their pairings in the sample library. This additional data may comprise individual additional data, such as discussed above with reference to block 1100 of FIG. 11 and block 1300 of FIG. 13, and pairwise additional data, which relates to the pairing of the two individuals. The pairwise additional data may comprise identifiers for the two individuals that are paired, quantitative information related to the duration, success, performance, etc. of the pairing, and environmental data related to the pairing of the individuals (e.g., existence and/or degree of certain external events or stimuli). The pairwise additional data may relate specifically to individual pairs in the sample library, a plurality of pairs in the sample library, or more generally to a population of which the pairs are a part. The additional data is stored in a manner and location by which it can be associated with the sample library images, such as in a relational database accessible by a digital computer.

In block 1602, the images corresponding to each of the N individuals or subjects in the sample library are annotated with a plurality of reference points. Also in block 1602, a set of M facial descriptor measurements (Fi, i=1 to M) are computed based on the reference points annotated onto the one or more images for each of the N individuals. In block 1604, one or more of the facial descriptor measurements, Fi, are selected to be used to compute each of individual principal indicators Pk, k=1 to K. Also in block 1604, the combination of the selected facial descriptor measurements that optimizes each of individual principal indicators Pk is also determined. In block 1606, one or more of the facial descriptor measurements, Fi, and individual principal indicators, Pk, are selected to be used to compute each of individual complex indicators Cj, j=1 to J. Also in block 1606, the combination of the selected facial descriptor measurements, Fi, and/or individual principal indicators Pk that optimizes each of individual complex indicators Cj is also determined. The operations in blocks 1602, 1604, and 1606 may be substantially the same as the operations described above with reference to blocks 1302 through 1314 of FIG. 13. Furthermore, the operation in block 1606 may be omitted if no complex indicators are utilized in the prediction model being determined. In such embodiments, the method proceeds from block 1604 to block 1608.

In block 1608, for each of the principal indicators Pk, one or more relationships are determined between the pairwise additional data and one or more functions f(Pkx, Pky) of the individual principal indicator Pk for an associated pair of individuals (x, y), across all N/2 associated pairs in the sample library. Also in block 1608, for each of the complex indicators Cj, one or more relationships are determined between the pairwise additional data and one or more functions f(Cjx, Cjy) of the individual complex indicator Cj for the associated pair (x, y), across all N/2 associated pairs in the sample library. The functions f(Pkx, Pky) and f(Cjx, Cjy) may be any linear or non-linear function of the pair of the particular individual indicator for both individuals in the pair. Exemplary functions f (Pkx, Pky) include, but are not limited to, Pkx, Pky, ($\alpha$·Pkx+$\beta$·Pky), ($\alpha$·Pkx−$\beta$·Pky), 1/|Pkx−Pky|, max(Pkx, Pky), (Pkx·Pky), (Pkx/Pky), etc., and like functions for f (Cjx, Cjy). Some embodiments also may include discontinuous functions. In some embodiments, the operations of block 1608 may comprise determining one or more relationships between functions of multiple individual principal or complex indicators for pairs of individuals, e.g., f (Pk1$x$, Pk1$y$, Pk2$x$, Pk2$y$) for individual principal indicators Pk1 and Pk2.

In block 1608, for each of the principal and complex indicators, the set of pairwise functions f(Pkx, Pky) and f(Cjx, Cjy) to be analyzed for a relationship with the pairwise additional data may be determined in various ways. In some embodiments, a fixed set is always analyzed, e.g., Pkx, Pky, (α·Pkx+β·Pky), (α·Pkx−β·Pky), 1/|Pkx−Pky|, max(Pkx, Pky), (Pkx·Pky), and (Pkx/Pky), for relationships with the additional data. One or more of the functions in the fixed set may be selected for each principal and/or complex indicator based on categorical potential with respect to the additional data using, e.g., ROC or correlation analysis as described above. In other embodiments, one or more candidate functions of each principal and/or complex indicator may be selected by using heuristic computational methods. For example, a larger list of candidate functions may be organized into a multi-stage search tree. At each stage, some small number of (e.g., two) candidate functions—or types of functions—are analyzed to determine which gives the best categorical potential based on the additional data. The best of the candidates is selected and used in the next stage of the search tree. In this manner, a small set of candidate functions of each of the individual principal and/or complex indicators can be identified from among a larger set of candidate functions. Such heuristic computational algorithms also may comprise artificial intelligence functions in which results of previous selections related to the same characteristic or indicator may be stored and used to guide future selections, as known by persons of ordinary skill in the art.

The operation in block 1608 of selecting the pairwise functions f(Pkx, Pky) and f(Cjx, Cj y) may be broken into steps that are carried out sequentially. In some embodiments, the operation of block 1608 may comprise first selecting one or more pairs of principal indicators (Pkx, Pky) and/or complex indicators (Cjx, Cjy) then determining the optimal functions f(Pkx, Pky) and f(Cjx, Cjy) of the selected pairs. In other embodiments, the selection of the indicator pairs and the determination of the optimal pairwise functions may comprise a substantially unitary operation. Other ways of structuring the operations of block 1608 will be apparent to persons of ordinary skill in the art. Regardless of the selection process used, however, the candidate pairwise functions analyzed may comprise functions of individual principal indicators Pkx and/or Pkx, and functions of individual complex indicators Cjx and/or Cjy. As used herein unless specifically stated to the contrary, the term "pairwise function" comprises functions of individual principal or complex indicators, or other such terms. Similarly, a function of two variables $f(x, y)$ comprises functions $f(x)$ and $f(y)$ of the individual variables.

Moreover, although the operation of block 1608 is described above in the context of finding pairwise functions of the same type of indicator (i.e., principal or complex), this is merely exemplary and pairwise functions of different types of indicators may be selected in some embodiments. For example, embodiments of block 1608 may select one or more functions f(Pkx, Pky, Cjx, Cjy) of both principal and complex indicators for the two individuals x and y. Furthermore, embodiments of block 1608 may select one or more functions of a combination of principal indicators, complex indicators, and facial descriptor measurements, Fi, corresponding to the pair of individuals x and y. Accordingly, although the description of operations of subsequent blocks of FIG. 16 may refer to pairwise functions f(Pkx, Pky) and/or f(Cjx, Cj y), persons of ordinary skill in the art will understand that these operations may encompass functions of various indicators and measurements pertaining to two individuals x and y.

In any event, the result of block 1608 is one or more pairwise functions corresponding to the individual principal and/or complex indicators, together with their respective relationships to the pairwise additional data. In block 1610, some portion of the group of the pairwise functions determined in block 1608 are selected to be used to compute the pairwise complementarity indicator, S. Any number of the pairwise functions-up to and including the entire set—may be selected. Moreover, the selection may be limited only to functions f(Cj x, Cj y) of individual complex indicators, i.e., functions f(Pkx, Pky) of individual principal indicators are not used. The selection may be made in various ways, depending on the available information and the particular pairwise complementarity indicator, S. The selection may be based on the raw values of functions f(Pkx, Pky) and/or f(Cj x, Cj y), or upon scaled or transformed versions. For example, the z-score of a particular functions f(Pkx, Pky) or f(Cjx, Cjy) may be used for purposes of selection. Other transformations will be apparent to persons of ordinary skill.

The selection of the pairwise functions f(Pkx, Pky) and/or f(Cjx, Cjy) to be used for computing indicator S may be accomplished in various ways. In some embodiments, some fixed number of pairwise functions having the highest categorical potential with respect to the additional data may be selected. In other embodiments, one or more pairwise functions may be selected by using heuristic computational methods. For example, the various functions can be broken into groups or categories using qualitative information related to the types of characteristics that they indicate. Subsequently, one or more pairwise functions may be selected from each group based on, e.g., their categorical potential within the group. Alternately, selections may be constrained to a subset of the groups based on the qualitative information related to the groups. Such embodiments may comprise learning-based functionality whereby results of previous selections related to the same or similar indicator(s) may be stored and used to guide future selections. Other methods for selecting pairwise functions f(Pkx, Pky) and/or f(Cjx, Cjy) to be used for computing indicator S will be apparent to the person of ordinary skill in the art.

In block 1610, a combination of the selected pairwise functions f(Pkx, Pky) and f(Cjx, Cjy) that optimizes pairwise complementarity indicator S is also determined. In some embodiments, an optimal linear combination of the selected pairwise functions f(Pkx, Pky) and f(Cj x, Cj y) is determined. In other words, if $S = \alpha_1\ f_1(P_1x, P_1y) + \alpha_2\ f_2(P_2x, P_2y) + \ldots + \alpha_n\ f_n(P_nx, P_ny) + \beta_1\ f_1(C_1x, C_1y) + \beta_2\ f_2(C_2x, C_2y) + \ldots + \beta_m\ f_m(C_mx, C_my)$ then the pairwise functions f(Pix, Piy), i=1 to n, and f(Ci x, Ci y), i=1 to m, are selected and the linear coefficients αi, i=1 to n, and βi, i=1 to m, are determined in block 1610. To the extent that the selection is limited to one or more of pairwise functions f(Cix, Ci y), the corresponding coefficients αi are zero. The linear combination may be determined using statistical analysis techniques. For example, in categorical models, ROC analysis may be used to select the combination of pairwise functions f(Pkx, Pky) and/or f(Cjx, Cjy) that provides a value for S that best predicts or categorizes the pairs in the sample library, e.g., according to at least a portion of the pairwise additional data. In the spirit of the disclosure, however, a non-linear combination of the selected group of pairwise functions f(Pkx, Pky) and/or f(Cjx, Cj y) also may be determined based on the pairwise additional data. A non-linear combination of the selected group of pairwise functions f(Pkx, Pky) and/or f(Cjx, Cjy) may be determined using optimization techniques including, but not limited to, Newton's Method and Lagrange's Method. The selected linear and/or non-linear combination may be of the pairwise functions f(Pkx, Pky) and/or f(Cjx, Cjy) themselves, or of scaled or transformed versions such as z-scores.

Although not shown in FIG. 16, persons of ordinary skill will readily comprehend understand that the model may comprise one or more additional levels of indicators. For example, the model may comprise one or more "tertiary indicators" that may be based on, or combinations of, facial descriptor measurements, principal indicators, and/or complex indicators. In such case, the one or more suitability indicators may be based on any of the facial descriptor measurements, principal indicators, complex indicators, and tertiary indicators. Moreover, models comprising such additional levels of indicators may be used in other methods described herein for predicting characteristics of one or more individuals, such as shown in and described below with reference to FIGS. 17 and 18.

Figure 17:
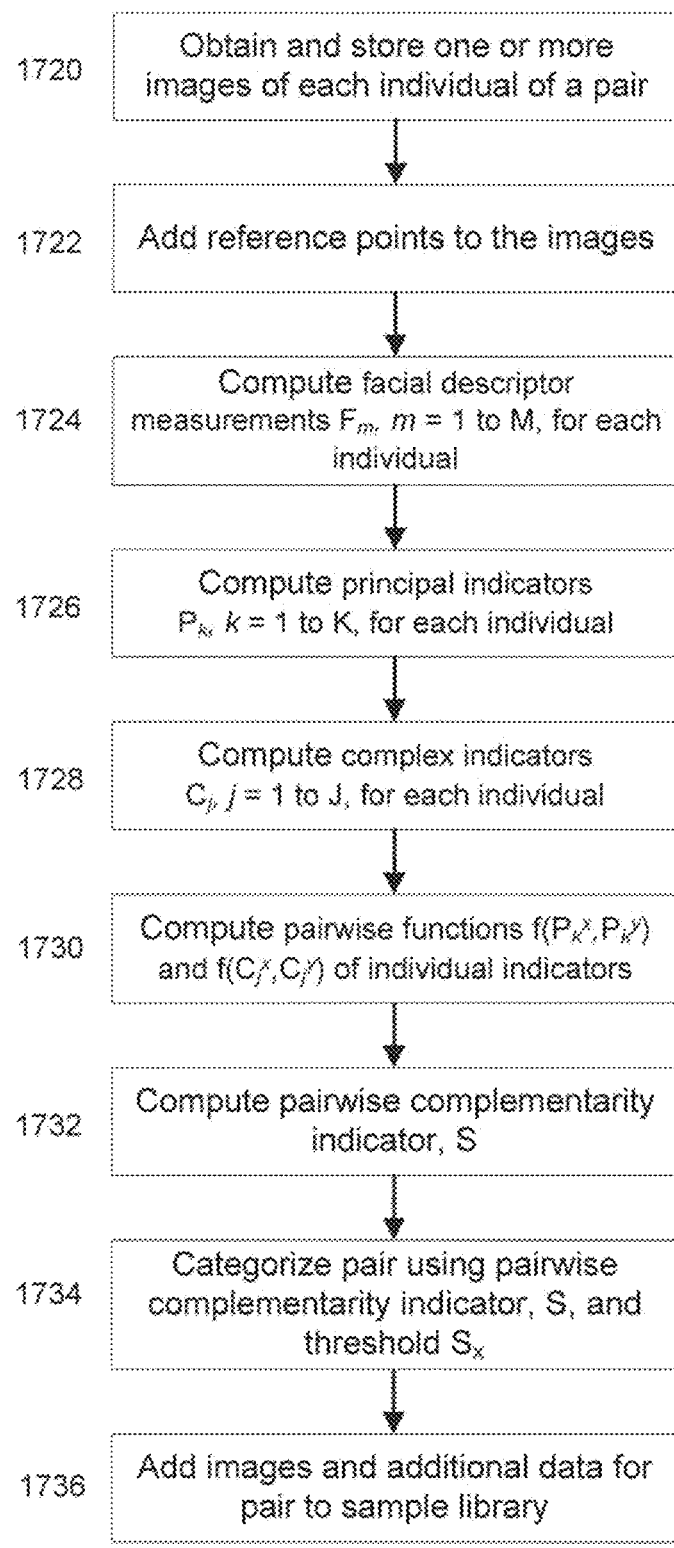
FIG. 17 is a flowchart of a method for predicting a characteristic of a pair of individuals, such as pairwise complementarity for a particular purpose, according to other embodiments of the present disclosure.

FIG. 17 is a flowchart of an embodiment of a method for predicting a characteristic of a pair of individuals, such as pairwise complementarity for a particular purpose (e.g., marriage), based on the facial descriptor measurements for those individuals. The embodiment illustrated by FIG. 17 may utilize models for principal indicators, complex indicators, and pairwise indicator functions to determine a pairwise complementarity indicator, S. The models for principal indicators, complex indicators, and pairwise indicator functions may be determined by the method illustrated in FIG. 16 or by any other method that generates such models. Although FIG. 17 illustrates the one or more embodiments by blocks arranged in a specific order, this order is merely exemplary and the steps or operations comprising the method may be performed in a different order than shown in the figure. Moreover, a person of ordinary skill will understand that the blocks shown in FIG. 17 may be combined and/or divided into blocks having different functionality.

In block 1720, digital images and additional data are obtained and stored for a pair of individuals, in the same manner as described above with reference to the sample library (e.g., block 1600 of FIG. 16). In block 1722, the images of the subject are annotated with a plurality of reference points. In block 1724, a set of facial descriptor measurements, $F_i$, $i=1$ to M, are computed based on the reference points annotated onto the one or more images of the subject. In block 1726, individual principal indicators $P_k$, $k=1$ to K, are computed using facial descriptor measurements $F_i$ and the individual principal indicator model determined, for example, in block 1704 of FIG. 16. In block 1728, individual complex indicators $C_j$, $j=1$ to J, are computed using facial descriptor measurements $F_i$ and/or individual principal indicators $P_k$ based on the model determined, for example, in block 1706 of FIG. 16. In block 1730, pairwise functions $f(P_{k1}, P_{k2})$ and/or $f(C_{j1}, C_{j2})$ of principal and/or complex indicators for the two individuals (i.e., individuals 1 and 2) are computed, and further used to compute pairwise complementarity indicator, S, of the prospective pair using the model determined, for example, in block 1610 of FIG. 16.

Next, in block 1732, the subject is categorized based on the values of the pairwise complementarity indicator, S and a suitability threshold, $S_x$. In some embodiments, this characterization may comprise determining that the pair of individuals are suitable for a particular purpose or relationship (e.g., marriage) based on comparing the values of S and $S_x$, e.g., $S > S_x$ or $|S - S_x| < \varepsilon$. In some embodiments, this categorization may comprise assigning the pair to one category if $S > S_x$ and another category if $S \le S_x$. Other possible comparisons will be apparent to persons of ordinary skill in the art. Finally, in block 1734, the sample library optionally may be augmented by adding the image(s), additional data, facial descriptor measurements, principal indicators, complex indicators, pairwise functions, and/or pairwise complementarity indicator for the pair of individuals.

In other embodiments, the operation in block 1732 may comprise using the pairwise complementarity indicator to assign the pair to one of a plurality, or set, of categories. In some embodiments, a set of categories $K_t$, $t=1$ to T, are defined by a set of thresholds, $S_{xt}$, $t=1$ to T+1, such that a subject is assigned to category $K_t$ if $S_{xt} < S \le S_{x(t+1)}$. Optionally, beginning threshold $S_{x1}$ and end threshold $S_{x(T+1)}$ may be set to $-/+\infty$, respectively. In other embodiments, S may comprise a set of z-scores, $Z_q$, $q=1$ to Q—or raw scores, $S_q$, $q=1$ to Q—each corresponding to pairwise functions $f(P_{k1}, P_{k2})$ and/or $f(C_{j1}, C_{j2})$ of principal and/or complex indicators for the two individuals. In such embodiments, each of the set of categories $K_t$, $t=1$ to T, may be defined by a particular range $\{S_{xqt1}, S_{xqt2}\}$ associated with a particular z-score, $Z_q$. A pair of individuals will be assigned to a category $K_t$ if each member of the set of z-scores $\{Z_q\}$ falls within the particular range $\{S_{xqt1}, S_{xqt2}\}$ associated with that z-score and category. In other embodiments, a pair of individuals may be assigned to a particular category if a required subset of the z-scores (or raw scores) falls within the set of ranges associated with that category. For example, an on-line dating service could categorize the type of relationship that two individuals are most likely to experience. If the type of relationship that each of the individuals is seeking was included in the individual additional data, such embodiments could also use it to determine the likelihood of success of the prospective pairing.

Variations of the embodiment shown in and described above with reference to FIG. 17 are also possible, as will be apparent to persons of ordinary skill in the art. For example, rather than predicting whether two new individuals (i.e., individuals not in the sample library) are pairwise complementary, the method of FIG. 17 may also be used to predict which of the existing members of a sample library would be pairwise complementary with a single new individual. Embodiments also may be used to determine the degree to which a new individual would be pairwise complementary with one or more existing members of the sample library, or to identify or rank a predetermined number of existing members of the sample library based on their degree of pairwise complementarity with the new individual.

In such embodiments involving pairings of a single new individual with one or more existing individuals in the sample library, the operations in blocks 1720 through 1728 and 1736 of FIG. 17 will be performed only for the new individual, provided that the data records of existing individuals in the sample library are complete. Furthermore, the operations in blocks 1730 and 1732 will be performed for each pairing of the new individual with a different existing individual in the sample library. The operations of block 1734 may comprise the ranking or ordering of the existing individuals tested in blocks 1730 and 1732 based on their degree of pairwise complementarity with the new individual.

Other embodiments of FIGS. 16 and 17 may be used to categorize an existing relationship of two individuals (e.g., a marriage) in various ways. For example, the pairwise complementarity indicator, S, may comprise a set of z-scores $\{Z_q\}$, each corresponding to one or more pairwise functions of principal and/or complex indicators for the two individuals. The set of one or more pairwise functions may be selected, as shown in FIG. 16, such that the corresponding $Z_q$ represents or is related to a specific area in the particular type of relationship of interest. Embodiments may categorize each specific area of the relationship by comparing the value of its corresponding z-score Zq to one or more thresholds Sxq, and assigning a quantitative or qualitative category accordingly. For example, embodiments may compare Zq to a series of thresholds {Sxq1, Sxq2, . . . Sxqn}, each representing a boundary between two of the n+1 equal-probability sections of the probability distribution of the one or more pairwise functions corresponding to Zq (e.g., quartiles for n=3). Subsequently, the area of the relationship corresponding to Zq will be categorized based on which of the equal-probability sections that Zq falls within. This categorization may be quantitative (e.g., first quartile, sixth decile) or qualitative (e.g., very weak, weak, average, strong, very strong), or a combination thereof. (e.g., low second quartile).

In addition, various embodiments of the present disclosure may be used to determine whether, or the degree to which, a group of more than two individuals are suitable for one or more purposes, tasks, and/or relationships. For example, embodiments may be used to determine if a group of individuals is suitable for a specific purpose, task, or relationship. A group suitability indicator, SG, corresponding to the specific task may be determined based on linear and/or non-linear combinations of the individual principal and/or complex indicators, or may be a statistic of the individual indicators. For example, if the set {C1$i$=1 to I} comprises complex indicator C1 for each of the I individuals in the group, the group categorical indicator may be based on mean, median, mode, standard deviation, variance, ratio of standard deviation to range, average distance between numerically-ordered values, etc. of the values in {C1$i$}. The group suitability indicator SG may comprise a z-score, raw score, percentile score, or other metric indicating whether, or to what extent, the group is suitable for the specific task. For example, a percentile score may indicate the suitability ranking of a particular group among all groups engaged in the same task. The suitability of the group for the task may be determined, for example, based on the relationship of SG to a threshold value Sx, as described above with reference to other embodiments.

Similarly, embodiments may be used to determine which one of a particular set of tasks is most suitable for a particular group of individuals. A group categorical indicator, SG, may be determined using principal and/or complex indicators for individuals in the group. The group categorical indicator may be based on linear and/or non-linear combinations of the principal and/or complex indicators, or may be a statistic of the individual indicators. The group categorical indicator may further comprise a set of categories {Kt, t=1 to T}, that are defined by a set of thresholds {Sxt, t=1 to T+1}, such that the group is assigned to category Kt if Sxt<SG≤Sx(t+1). Optionally, beginning threshold Sx1 and end threshold Sx(T+1) may be set to −/+∞, respectively. Each of the categories Kt may correspond to a particular task, and the most suitable task for the group may be determined based on the category Kt to which the group is assigned.

In other embodiments, a set of group suitability indicators {SGt, t=1 to T}, each corresponding to one of the particular set of tasks, may be determined based on linear and/or non-linear combinations of the individual principal and/or complex indicators, or may be a statistic of the individual indicators. The set of group indicators {SGt} may comprise a set of z-scores, raw scores, percentile scores, or other metrics that indicates whether, or to what extent, the group is suitable for each of the corresponding set of tasks. For example, a percentile score for a task t may indicate the suitability ranking of a particular group among all groups engaged in task t. The most suitable task for the group may be determined, for example, based on selecting the task corresponding to the highest group suitability indicator among the set {SGt}.

Other embodiments of the present disclosure may be used to determine whether, or to what degree, an existing or prospective group of individuals fills a predetermined set of roles. The set of roles may be defined based on what are deemed necessary for a particular task or purpose, or may be a more generic, or broader, set of roles not oriented or directed toward any particular task or purpose, e.g., "leader", "facilitator", "innovator", "executor", etc. Suitability indicator models can be defined for each role, based on principal and/or complex individual indicators related to characteristics associated with the respective roles (e.g., sensitivity, dominance, impulsiveness, creativity, etc.). Using these models and the facial descriptor measurements of the individuals comprising the group, a set of suitability indicators {Sri, r=1 to R} corresponding to the set of R roles may be computed for each individual i in the group. The suitability of an individual for a specific role may be determined by comparing {Sri} to a corresponding threshold to determine a "fit/no fit" rating. Alternately, or in addition, the suitability indicator for the individual/role combination may comprise degree-of-fit information, which may be categorical, ordinal, integer-valued, real-valued, etc. If an individual's indicators { Sri} show that they are suitable for multiple roles, they may be assigned to each suitable role category. If individual's suitability indicators show that they are suitable for no roles, they may be assigned to a "none" role category or to the role category having the greatest degree-of-fit, provided such information is available. Alternately, a single categorical indicator model may be determined and used to assign the individual to one category based on the value of their corresponding indicator, in the same manner as described above with respect to group categorical indicators.

The group suitability indicator may be determined in various ways. It may be based on some function of the number of individuals in each role category, number or percentage of role categories unoccupied, number or percentage of individuals in the "none" role category, etc. Alternately, if individual suitability indicators comprise degree-of-fit information, they may be used to determine the group suitability indicator. For example, if a particular distribution among role categories is preferred (e.g., for a particular task), the group of individuals can be mapped to this preferred distribution in a way that maximizes the group suitability indicator, which may be computed by a linear (e.g., sum or weighted sum) or non-linear combination of the individual suitability indicators corresponding to the individual/role category mapping. Such mapping could be constrained, for example, by requiring all, a portion, or a specific subset of the role categories to be filled by at least one individual.

Other embodiments of the present disclosure may be used to determine whether, or to what degree, a new individual fits within an existing group of individuals for a specific task, purpose, or relationship. In some embodiments, suitability of the new individual as a member of the group may be determined by constraining the roles of the existing group members to remain the same, and then using facial descriptor measurement analysis techniques to predict whether the new individual will fill a defined missing role within the group. In these embodiments, a set of suitability indicators {Sr, r=1 to R} corresponding to the set of R missing roles may be computed for the prospective new group member, in the same manner as described above. The suitability of an individual for a specific role may be determined by comparing {Sr} to a corresponding threshold to determine a "fit/no fit" rating. Alternately, or in addition, the set of suitability indicators may comprise degree-of-fit information, which may be categorical, ordinal, integer-valued, real-valued, etc. If the new individual's indicators { Sr} show that they are suitable for one or more of the missing roles, they may be assigned to each suitable role category.

In other embodiments, the new individual's suitability may be based on the existence, or degree, of conflict between the predicted role(s) for the new individual and roles and/or categories of existing group members. The existence, or degree, of conflict may be determined, for example, based on a pairwise conflict indicator between the new individual and each of the existing group members. Such an indicator may be computed in a manner similar to the pairwise complementarity indicators discussed above.

Figure 18:
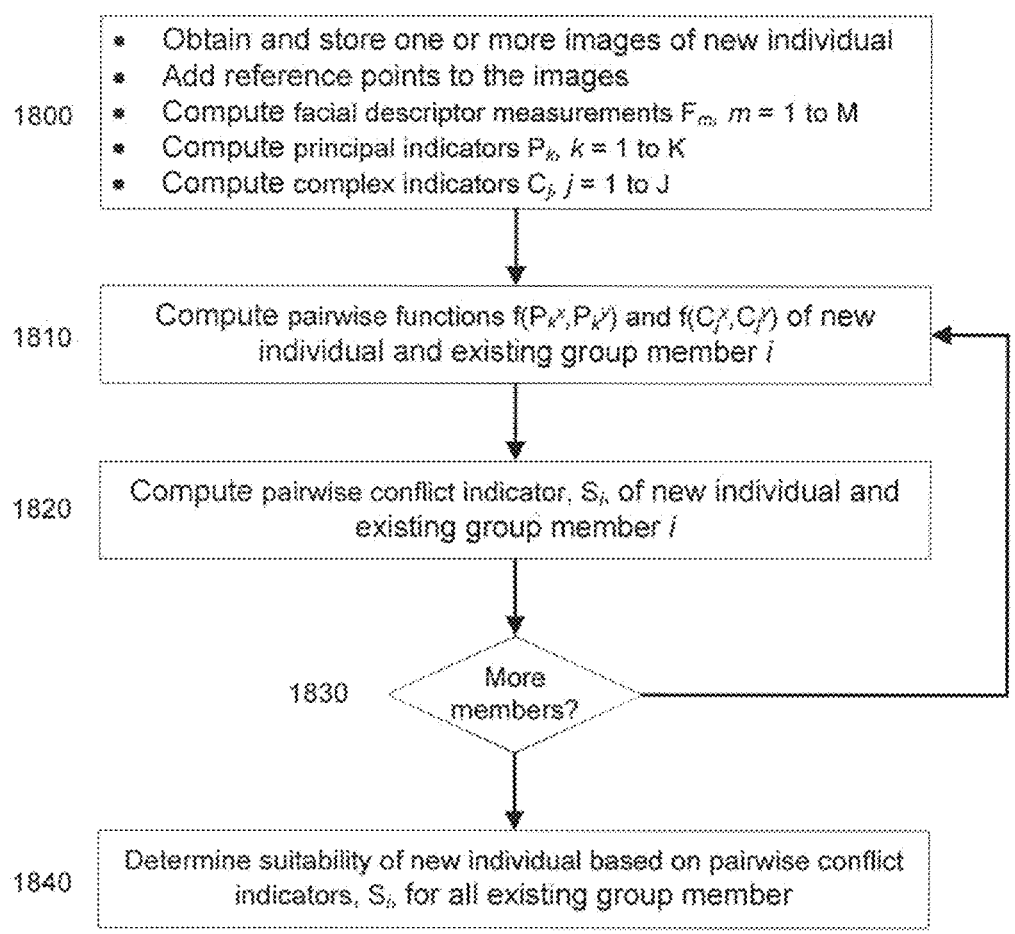
FIG. 18 is a flowchart of an exemplary method for determining the suitability of a new individual as a member of an existing group based on the predicted conflict with the existing group members, according to other embodiments of the present disclosure.

FIG. 18 shows an exemplary method for determining the new individual's suitability be based on the existence, or degree, of conflict between the predicted role(s) for the new individual and roles and/or categories of existing group members. Although FIG. 18 illustrates the one or more embodiments by blocks arranged in a specific order, this order is merely exemplary and the steps or operations comprising the method may be performed in a different order than shown in the figure. Moreover, a person of ordinary skill will understand that the blocks shown in FIG. 18 may be combined and/or divided into blocks having different functionality.

In block 1800, digital images and additional data are obtained and stored for the new individual, i.e., the prospective group member. The images of the new individual are annotated with a plurality of reference points and a set of facial descriptor measurements, $F_i$, i=1 to M, are computed based on the annotated reference points. In addition, principal indicators $P_k$, k=1 to K, are computed using facial descriptor measurements $F_i$, and individual complex indicators $C_j$, j=1 to J, are computed using facial descriptor measurements $F_i$ and/or individual principal indicators $P_k$. The models used to compute the principal and complex indicators may be determined, for example, as discussed above with reference to FIG. 16. Although the operations of block 1800 have been described with respect to the new individual, the person of ordinary skill will readily comprehend that they can be repeated, as necessary, for existing members of the group.

In block 1810, one or more pairwise functions $f(P_k, P_{ki})$ and/or $f(C_j, C_{ji})$ of principal and/or complex indicators for the new individual and the ith existing group member of the group are computed. Each of the functions may correspond to a particular area of potential conflict between the new individual and an existing group member. In block 1820, the one or more pairwise functions $f(P_k, P_{ki})$ and/or $f(C_j, C_{ji})$ are used to compute a pairwise conflict indicator, S, for the two individuals. The models used to compute the functions and the pairwise conflict indicator may be determined, for example, as discussed above with reference to FIG. 16.

In some embodiments, the pairwise conflict indicator for two individuals may comprise a set of z-scores $\{Z_q\}$, each corresponding to one or more pairwise functions of principal and/or complex indicators for the two individuals. In some embodiments, the indicator may comprise one or more z-scores corresponding to one or more functions of individual principal and/or complex indicators, such as described above. A set of one or more pairwise functions may be selected, as in FIG. 16, such that the corresponding $Z_q$ corresponds to a specific area of potential conflict between the roles and/or relationship of the two individuals. For example, pairwise functions may be selected such that certain z-scores emphasize differences between characteristics of the two individuals, while other pairwise functions may be selected such that other z-scores emphasize similarities between other characteristics.

In block 1830, it is determined whether any other group members need to be analyzed for predicting suitability with the prospective new member. If so, the method returns to block 1810. Otherwise, if all members have been analyzed, the method proceeds to block 1840 where the suitability of the new individual for membership in the existing group is determined based on the set of pairwise conflict indicators {Si} corresponding to each of the existing group members. This may be done in various ways depending on the particular embodiment. In some embodiments, block 1840 may comprise comparing each of the pairwise conflict indicators, Si, to a suitability threshold, Sx, and determining that the new individual is suitable based on some portion of the comparisons having the desired relationship (e.g., greater than). The portion may be all, a majority, a particular number, a particular subset, etc. Put another way, in such embodiments, the suitability of the new individual may be determined based on their pairwise suitability with each of the existing group members.

In other embodiments, particularly ones in which each pairwise conflict indicator Si comprises a set of z-scores $\{Z_{qi}\}$, block 1840 may comprise computing a function of the collection of z-scores comprising the set of pairwise conflict indicators{Si}. For example, if higher z-scores indicate greater likelihood of conflict, the collection of z-scores may be added to obtain an overall prediction of likelihood of conflict between the new member and existing group members. The computed function may then be compared against a threshold to determine overall suitability as a member of the group.

In other embodiments, suitability of the new individual may be determined without constraining the roles of existing group members to remain the same. In other words, the suitability of the new individual may be determined assuming that their presence will cause the roles of the existing group members to change (e.g., people move to roles in which they are more/most suitable). In this embodiment, the suitability of the individual may be determined based on whether their presence will make the group more suitable for the specific task, purpose, or relationship. Accordingly, a group suitability indicator for the specific task may be determined and used, for example, in the manner described above with respect to other embodiments related to group suitability.

In other embodiments, suitability of one or more individuals with respect to a group may be determined based on whether their presence in the group is likely to negatively impact the group's performance, e.g., by the individual filling a negative role. For example, this embodiment may be applied to an existing group by computing a group suitability indicator S for the current existing group, computing additional group suitability indicators Si, i=1 to n, for the existing group minus each of the n members, then comparing each Si to S to see if the deletion of a particular member causes the group suitability to increase. Similarly, this embodiment may be used to a prospective member of an existing group by computing a suitability indicator for the current existing group, computing a suitability indicator for the group including the prospective member, then comparing the two suitability indicators to see if the new member is likely to negatively impact the existing group's performance.

Figure 19:
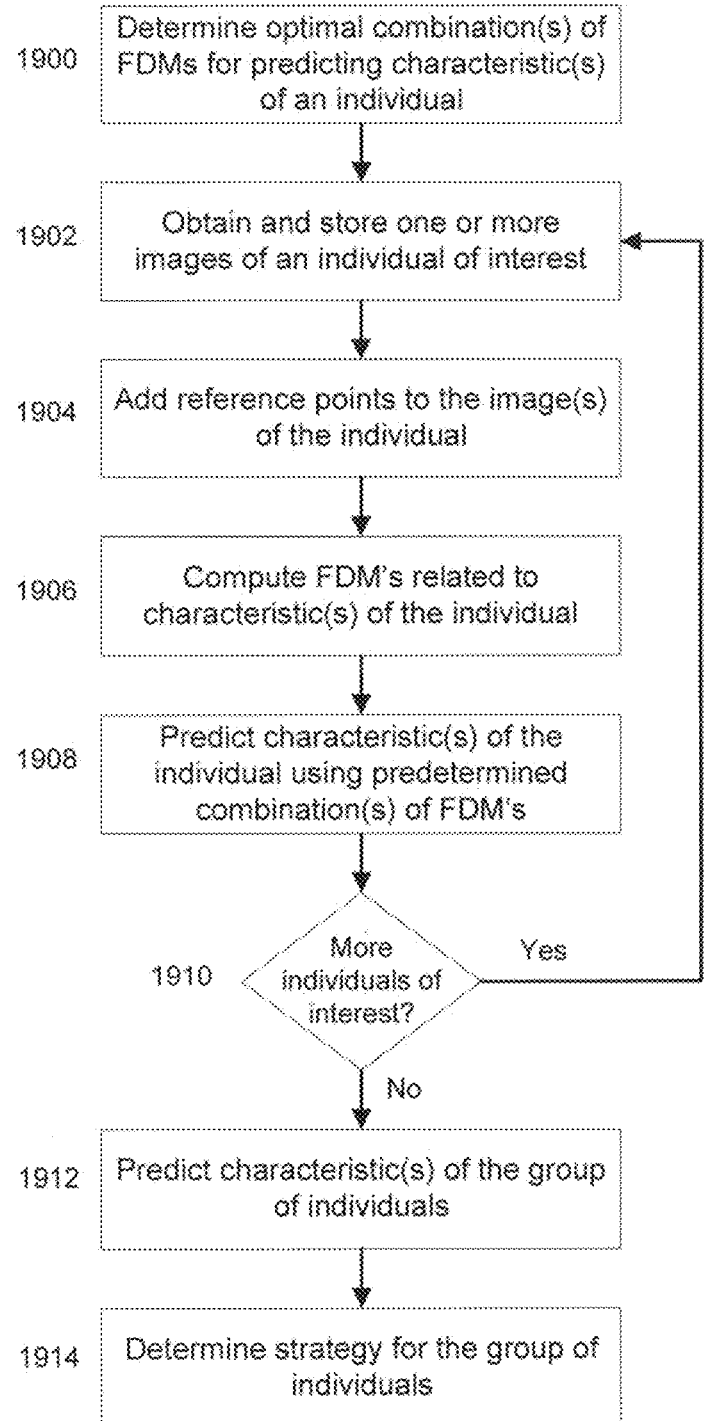
FIG. 19 shows a method for determining a strategy for a group of individuals using facial descriptor measurements, according to another embodiment of the present disclosure.

Other embodiments may be used to determine strategies for a group of individuals, as illustrated by the flowchart of FIG. 19. In some embodiments, the method shown in FIG. 19 may be used to determine strategies for a group of individuals based on facial descriptor measurements for individual members of the group. In other embodiments, the method of FIG. 19 may be used to determine a strategy for dealing with a group of humans in a common situation, e.g., a group of individuals in a workplace, a sports team, etc. Although FIG. 19 illustrates the one or more embodiments by blocks arranged in a specific order, this order is merely exemplary and the steps or operations comprising the method may be performed in a different order than shown in the figure. Moreover, a person of ordinary skill will understand that the blocks shown in FIG. 19 may be combined and/or divided into blocks having different functionality.

In block 1900, one or more optimal combinations of facial descriptor measurements are selected for predicting one or more characteristics of interest, such as principal indicators, complex indicator, and/or suitability indicators. Block 1900 may be carried out according to the method described above with reference to FIG. 11 or 13, or in other ways within the scope of the present embodiment. The one or more characteristics of interest preferably are related to the strategies under consideration. As discussed above, block 1900 may include generation of a sample library comprising digital images, additional data, and a plurality of facial descriptor measurements. The facial measurements may be—but are not necessarily—similar to the ones shown in and discussed above in reference to FIGS. 1A through 7T. Non-facial physical measurements may also be used with the method.

In block 1902, digital images and additional data for an individual of interest are obtained and stored, in the same manner as described above with reference to the sample library (e.g., block 1100 of FIG. 11). In block 1904, reference points consistent with those added to the images in the sample library are added to the images of the individual of interest. In block 1906, facial descriptor measurements consistent with those in the sample library are calculated for the individual of interest. In block 1908, the one or more optimal combinations determined in block 1900 are applied to the facial descriptor measurements of the individual to predict the one or more characteristics of interest, in a manner such as described above with reference to FIGS. 12 and 14. The predictors may include primary indicators, complex indicators, and/or suitability indicators. Blocks 1902 through 1908 are repeated for each individual of interest. In block 1912, the predicted characteristics of interest for the individuals are used to predict one or more characteristics for the group of individuals. Finally, in block 1914, the predicted group characteristics and/or predicted individual characteristics are used to determine a strategy for the group. Other factors and information may be used in either or both of blocks 1912 and 1914, including factors related to individuals, factors related to the group, and/or factors related to the individual or group environment.

By further example, a group characteristic such as aggression level can be predicted according to the method illustrated in FIG. 19 as follows. First, the optimal combination of facial descriptor measurements determined in block 1900 can be utilized according to blocks 1902 through 1910 to predict the aggressiveness of individuals in the group. Next, the set of predicted aggression levels can be combined optimally to form a predictor, or principal indicator, of the level of aggression within the group. In other words, the principal indicator of aggression level for the ith individual in the group can be expressed as $Pi = \alpha 1 \cdot F1 + \alpha 2 \cdot F2 + \ldots + \alpha M \cdot FM$, where $F1 \ldots FM$ are the selected facial descriptor measurements and $\alpha 1 \ldots \alpha M$ are the optimal linear combining coefficients. Likewise, if the group comprises N individuals, the complex indicator of group aggression level can be expressed as $CG = \beta 1 \cdot P1 + \beta 2 \cdot P2 + \ldots + \beta N \cdot PN$, where $\beta 1 \ldots \beta N$ are the optimal linear combining coefficients for the group. Furthermore, in the combined group model, the individuals may be ordered in a variety of ways. For example, the principal indicators of individual aggression levels $P1 \ldots PN$ may be rearranged in descending numerical order $P'1 \ldots P'N$, with $P'1$ corresponding to the most aggressive individual. In other embodiments, the principal indicators of individual aggression levels $P1 \ldots PN$ may be rearranged based on the ordered values of another principal indicator (e.g., dominance). In any case, each optimal coefficient $\beta i$ may be selected, at least in part, based on the position within the ordered group. This would allow, for example, coefficients $\beta i$ to be selected to emphasize the characteristics of the most aggressive and/or submissive individuals in the group.

Group dynamics and group characteristics among a group of individuals can be predicted in various other ways known to persons skilled in the art. For example, methods may be employed that are analogous to the Hartree—Fock equation, which is commonly used to predict the behavior of the electrons in an atom. Alternately, a computational method based on a NETLOGO model can be used. An advantage of this approach is that factors other than the behavioral traits predicted from the facial descriptor measurements can be incorporated. Such factors may include the estimated activity level and the resulting number of interaction between individuals in a group, as well as environmental factors.

Furthermore, computational models based on vector spaces may be employed in any of the above methods related to predicting characteristics of individuals, pairs of individuals, or groups of individuals. Conceptually, such a computational model would be based on assigning a measurement (or combination of measurements, such as an indicator described above) to an axis (or vector) in a multi-dimensional space and determining a point in this space as an "optimum." In other words, such embodiments would identify the continuous range of values for each of the facial measurements (or combinations of facial measurements) and the specific value on each that is the optimum for a specific characteristic of interest. Subsequently, a performance or suitability measure could be determined for one or more individuals (or pairs or groups) of interest based on the distance (e.g., Euclidean distance) between the values of the axis variables for the individuals of interest and the corresponding optimum value previously determined In such cases, a larger distance generally indicates lower performance or suitability of the individual of interest.

The various computational methods illustrated by exemplary FIGS. 11 through 19 have been described herein as generating predictors of one or more characteristic, with each predictor comprising a single value such as a number, a percentile, a z-score, etc. However, persons of ordinary skill will understand that no model is capable of perfectly predicting a characteristic of a specific individual, especially if the specific individual was not part of the data set from which the model was derived. Consequently, any of the prediction models described herein may also comprise prediction intervals used to show a range of values surrounding the predicted value. The width of the prediction intervals for a particular predictor depends on both the variability of the data underlying the model and the degree of confidence required in the prediction (e.g., 95% confidence level). In some embodiments, the confidence level for a predictor of a particular characteristic may be determined, for example, based on the facial measures and environmental factors related to that characteristic. For example, predictors that comprised measurements of facial features correlating with capacities for self-reflection, learning, and/or flexibility would require larger intervals due to the effect of these traits on the actual characteristic being predicted.

Persons of ordinary skill in the art would understand that any of these computational methods may be embodied in various combinations of hardware and software. For instance, the computations may be carried out by a specialized or general-purpose digital computer, such as a laptop, desktop, tablet, smartphone, workstation, etc. Moreover, this hardware may be programmed to carry out such computations in various ways, such as by programs written in human-readable languages such as C, C++, etc. and compiled into machine-readable code for execution. Alternately, the methods may be expressed in the particular language of a specialized computational software package, such as Matlab, which are further interpreted and/or compiled into machine-readable code.

Figure 9:
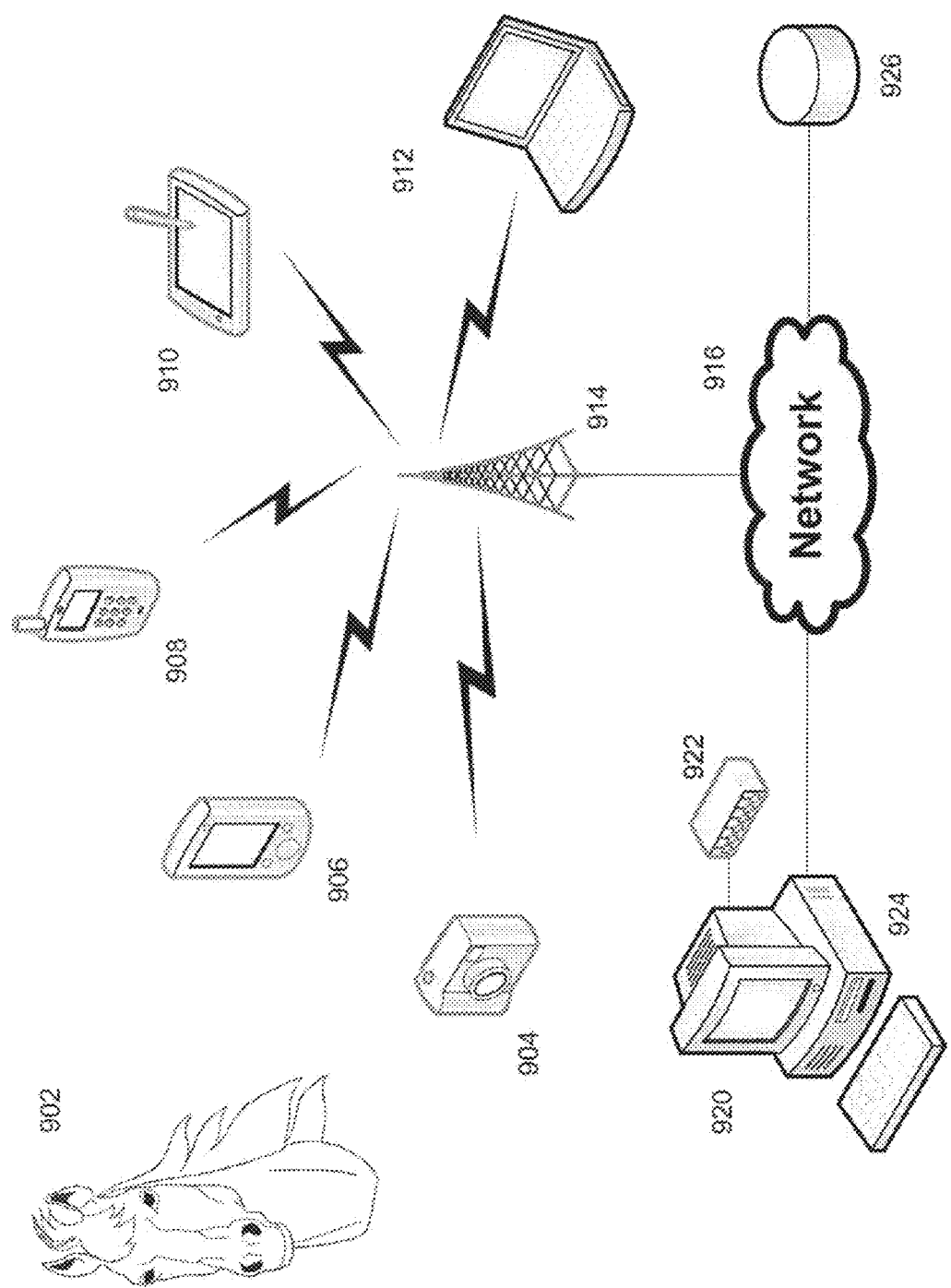
FIG. 9 shows a system that can be used to implement any of the methods of the present disclosure.

For example, FIG. 9 shows various hardware and software embodiments of a system according to embodiments of the present disclosure. Various hardware devices—such as digital camera 904, smartphone 906, cellular phone 908, tablet computer 910, and laptop computer 912—may be used to capture a digital image of an individual of interest, such as the exemplary horse 902. The image-capturing device may then store the image in a memory operably connected to a digital computer. This may be carried out in various ways as illustrated in FIG. 9. For example, the image capturing device may transmit the image through network 916 via wireless access point 914 to digital computer 920, which may be a desktop computer, server, workstation, or the like. Moreover, wireless access point 914 may be a cellular base station, wireless LAN access point, Bluetooth access point, or any other wireless connection known to persons of ordinary skill in the art. Likewise, network 916 may be a local- or wide-area, public or private network, or any combination thereof, including an intranet and/or the Internet.

In other embodiments, the image capturing device transfers the captured digital image to digital computer 920 through a wired connection 922, such as a Universal Serial Bus (USB) connection. In yet other embodiments, the captured image(s) may be transferred by removing a memory card from the image capturing device and inserting it into memory card reader 924 of digital computer 920, which may copy the captured images to other memory accessible by or operably connected to digital computer 920. Also within the spirit and scope of the present disclosure, the image capturing device may transfer the image, via methods described above or otherwise well known in the art, to devices other than digital computer 920, such as tablet computer 910. In such embodiments, further processing according to the methods describe above will occur, for example, in tablet computer 910 rather than in digital computer 920. Similarly, the image capturing device may transfer the image to network storage unit 926 that is accessible via network 916, e.g., cloud storage. Network storage unit 926 may be configured to be accessible by some or all of the other devices shown in FIG. 9.

In other embodiments, further processing according to the methods described above also may take place in the image capturing device itself. For example, tablet computer 910 may be used to capture images of individuals of interest, store the images in memory accessible or operably connected to it (including, for example, network storage unit 926), and then execute one or more software applications embodying one or more methods described above. Specific measurements or processed data from the image capturing device may also be communicated to a central computer or central location.

Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

What is claimed is:

1. A method for predicting a characteristic relating to a type of individual for an individual of the type, comprising:
   measuring, using a computer, two or more metrics from reference points on a digital image representing the individual of the type;
   calculating, using the computer, a resultant using the two or more measured metrics and a predetermined mathematical formula for the individual;
   predicting, using the computer, a performance characteristic of the individual that may be influenced by social interactions using the calculated resultant from the predetermined mathematical formula for the individual and data about a group of individuals of the same type as the individual and who share social connections with the individual; and
   presenting the predicted performance characteristic of the individual.

2. The method of claim 1 wherein the data about the group of individuals is calculated using the predetermined mathematical formula.

3. The method of claim 2 further comprising:
   obtaining the digital image representing the individual; and
   assigning the reference points on the obtained digital image.

4. A non-transitory computer readable medium comprising a set of instructions for determining a social compatibility of an individual with a group that, when executed by a processor comprising a computing device, causes the computing device to:
   store one or more digital images representing an individual in a memory;
   annotate the one or more digital images with a plurality of reference points;
   compute one or more metrics related to the individual using the plurality of reference points using a predetermined mathematical function; and
   predict the social compatibility of the individual with other individuals in a group of socially connected individuals based on the one or more metrics related to the individual, indicators of characteristics related to the other individuals in the group, and one or more environmental factors.

5. The non-transitory, computer-readable medium of claim 4, further comprising instructions that, when executed by the processor, causes the computing device to:

store the one or more digital images representing the individual in a memory operably connected to the computing device;

annotate the one or more digital images with at least a portion of the plurality of reference points.

6. The non-transitory, computer-readable medium of claim 4:

wherein the instructions that, when executed by the processor, cause the computing device to predict the compatibility of the individual comprise instructions that, when executed by the processor, cause the computing device to compute one or more compatibility indicators based on the one or more individual indicators; and further comprising instructions that, when executed by the processor, cause the computing device to provide at least a portion of the one or more compatibility indicators to an output device.

7. The non-transitory, computer-readable medium of claim 4, wherein predicting the social compatibility of the individual is further based on one or more additional metrics than the one or more metrics used to compute the one or more individual indicators.

8. A system for predicting one or more socially influenced characteristics of a group of socially connected individuals of the same type, comprising:

at least one processor;

at least one memory, operably connected to the at least one processor and configured to store data and software code that, when executed by the at least one processor, causes the system to:

for each of the individuals comprising the group, store one or more digital images representing the individual in the at least one memory;

annotate the one or more digital images with a plurality of reference points;

compute one or more metrics using the plurality of reference points using predetermined mathematical functions;

predicting one or more characteristics of each of the individuals comprising the group based on the one or more metrics; and predicting one or more socially influenced performance characteristics of a group of socially connected individuals based on the predicted one or more characteristics of each of the individuals comprising the group and one or more environmental factors.

9. The computerized system of claim 8, wherein the at least one memory further comprises software code that, when executed by the at least one processor, causes the system to: for each of the individuals, store the one or more digital images representing the individual in a memory operably connected to the digital computer; and annotate the one or more digital images representing the individual with at least a portion of the plurality of reference points.

10. The computerized system of claim 8, wherein the at least one memory further comprises software code that, when executed by the at least one processor, causes the system to provide data related to the one or more characteristics of the group to an output device.

11. A non-transitory computer readable medium comprising a set of instructions for predicting one or more socially influenced characteristics of a group of socially connected individuals of the same type that, when executed by a processor comprising a computing device, causes the computing device to:

for each of the individuals comprising the group, store one or more digital images representing the individual in at least one memory;

annotate the one or more digital images with a plurality of reference points;

compute one or more metrics using the plurality of reference points using predetermined mathematical functions;

predicting one or more characteristics of each of the individuals comprising the group based on the one or more metrics; and predicting one or more characteristics of a group of socially connected individuals based on the predicted one or more characteristics of each of the individuals comprising the group and one or more environmental factors.

12. The non-transitory, computer-readable medium of claim 11, further comprising instructions that, when executed by the processor, causes the computing device to: for each of the individuals, store the one or more digital images representing the individual in a memory operably connected to the computing device; and annotate the one or more digital images representing the individual with at least a portion of the plurality of reference points.

13. The non-transitory, computer-readable medium of claim 11, further comprising instructions that, when executed by the processor, causes the computing device to provide data related to the one or more characteristics of the group to an output device.

* * * * *